(12) United States Patent
Kani et al.

(10) Patent No.: US 12,186,817 B2
(45) Date of Patent: Jan. 7, 2025

(54) SLIDING CUTTING MACHINE

(71) Applicant: MAKITA CORPORATION, Anjo (JP)

(72) Inventors: Toshiyuki Kani, Anjo (JP); Yukinori Suzuki, Anjo (JP); Yuki Miwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 59 days.

(21) Appl. No.: 17/535,033

(22) Filed: Nov. 24, 2021

(65) Prior Publication Data
US 2022/0168828 A1 Jun. 2, 2022

(30) Foreign Application Priority Data

Dec. 2, 2020 (JP) ................................. 2020-200070
Oct. 15, 2021 (JP) ................................. 2021-169375

(51) Int. Cl.
B23D 47/02 (2006.01)
B23D 45/04 (2006.01)

(52) U.S. Cl.
CPC ........... B23D 47/02 (2013.01); B23D 45/044 (2013.01); B23D 45/048 (2013.01);
(Continued)

(58) Field of Classification Search
CPC .... B23D 45/048; B23D 47/02; B23D 45/044; B27B 5/29; Y10T 83/7705; Y10T 83/7697; Y10T 83/8773
See application file for complete search history.

(56) References Cited

U.S. PATENT DOCUMENTS 1,703,179 A * 2/1929 Skolnik .................... B27C 9/02
30/477
4,452,117 A * 6/1984 Brickner .............. B23D 45/024
83/581
(Continued)

FOREIGN PATENT DOCUMENTS

CN 102343462 A 2/2012
DE 202015000495 U1 2/2015
(Continued)

OTHER PUBLICATIONS

EP-1935543-A1 English translation; Jun. 2008; Albrecht Hans-Peter.*

Primary Examiner — Laura M Lee
(74) Attorney, Agent, or Firm — J-TEK LAW PLLC; Jeffrey D. Tekanic; Scott T. Wakeman

(57) ABSTRACT

A sliding cutting machine (1) includes: at least one slide bar (51) having an elongated shape; a slide base (17) slidably mounted on the at least one slide bar (51); and a cutting-machine main body (10) mounted on the slide base (17) such that it is movable in an up-down direction relative to the slide base (17). The cutting-machine main body (10) includes: an output shaft (27) that extends in an axial direction orthogonal to an extension direction of the at least one slide bar (51) and on which a cutting tool (11) is mounted; and an electric motor (21) disposed between the cutting tool (11) and the at least one slide bar (51), as viewed along the extension direction of the at least one slide bar (51), while the output shaft (27) is rotating and the cutting tool (11) is vertical.

26 Claims, 28 Drawing Sheets

(52) U.S. Cl.
CPC ........ *Y10T 83/7697* (2015.04); *Y10T 83/7705* (2015.04); *Y10T 83/8773* (2015.04)

(56) References Cited

U.S. PATENT DOCUMENTS

| | | | |
|---|---|---|---|
| 4,817,581 A * | 4/1989 | Trentadue | B28D 1/044 |
| | | | 83/578 |
| 5,437,214 A | 8/1995 | Sasaki et al. | |
| 5,482,026 A * | 1/1996 | Russell | B23D 47/02 |
| | | | 125/13.01 |
| 5,582,089 A | 12/1996 | Sasaki et al. | |
| 5,660,094 A | 8/1997 | Sasaki et al. | |
| 5,839,339 A | 11/1998 | Sasaki et al. | |
| 5,850,698 A * | 12/1998 | Hurn | B27B 9/00 |
| | | | 30/377 |
| 5,870,939 A | 2/1999 | Matsubara | |
| 6,532,853 B1 | 3/2003 | Kakimoto et al. | |
| 7,854,187 B2 | 12/2010 | Liu et al. | |
| 7,997,177 B2 | 8/2011 | Ushiwata et al. | |
| 8,127,650 B2 * | 3/2012 | Ushiwata | B23D 45/048 |
| | | | 83/487 |
| 8,561,513 B2 | 10/2013 | Ushiwata et al. | |
| 9,649,703 B2 * | 5/2017 | Chiu | B23D 45/046 |
| 9,662,724 B1 | 5/2017 | Knight | |
| 9,833,849 B2 | 12/2017 | Knight | |
| 10,099,301 B2 | 10/2018 | Chiang et al. | |
| 10,144,144 B2 * | 12/2018 | Firth | B23D 47/02 |
| 10,322,459 B1 | 6/2019 | Chang | |
| 11,027,344 B2 * | 6/2021 | Kani | B23D 47/00 |
| 2005/0016631 A1 * | 1/2005 | Zhang | B23Q 9/00 |
| | | | 144/287 |
| 2005/0235791 A1 | 10/2005 | Ushiwata et al. | |
| 2005/0257656 A1 * | 11/2005 | Shibata | B23D 45/044 |
| | | | 83/581 |
| 2006/0011036 A1 | 1/2006 | Ushiwata et al. | |
| 2007/0175305 A1 | 8/2007 | Svetlik et al. | |
| 2009/0107316 A1 | 4/2009 | Thomas | |
| 2009/0133559 A1 * | 5/2009 | Sargeant | B27G 19/04 |
| | | | 409/182 |
| 2009/0235796 A1 | 9/2009 | Kani et al. | |
| 2010/0050446 A1 * | 3/2010 | Heflin | B27B 9/04 |
| | | | 30/388 |
| 2011/0209593 A1 | 9/2011 | Kani et al. | |
| 2013/0160628 A1 | 6/2013 | Chiu | |
| 2016/0318108 A1 | 11/2016 | Gonzalez et al. | |
| 2018/0133817 A1 | 5/2018 | Yamamura | |
| 2018/0161891 A1 * | 6/2018 | Nishikawa | B23D 45/048 |
| 2018/0290327 A1 * | 10/2018 | Goto | B25F 5/02 |
| 2018/0311861 A1 * | 11/2018 | Yu | B23D 59/006 |
| 2019/0262961 A1 | 8/2019 | Izbinski | |
| 2019/0314908 A1 | 10/2019 | Aoyama et al. | |
| 2020/0055131 A1 | 2/2020 | Kani et al. | |
| 2021/0023636 A1 * | 1/2021 | Chiang | B23D 45/048 |
| 2021/0039177 A1 | 2/2021 | Yamamura et al. | |
| 2021/0053129 A1 | 2/2021 | Suzuki et al. | |
| 2021/0129241 A1 * | 5/2021 | Van Bergen | B23D 45/048 |
| 2022/0168828 A1 * | 6/2022 | Kani | B23D 45/048 |
| 2022/0314348 A1 * | 10/2022 | Yu | B27B 5/207 |

FOREIGN PATENT DOCUMENTS

| | | | |
|---|---|---|---|
| EP | 1579938 A2 | 9/2005 | |
| EP | 1579938 B1 | 10/2007 | |
| EP | 1935543 A1 * | 6/2008 | ......... B23D 45/048 |
| JP | H0444322 Y2 | 10/1992 | |
| JP | H0671602 A | 3/1994 | |
| JP | H09136215 A | 5/1997 | |
| JP | H09207023 A | 8/1997 | |
| JP | H09277118 A | 10/1997 | |
| JP | H1134002 A | 2/1999 | |
| JP | H1148029 A | 2/1999 | |
| JP | 2002200602 A | 7/2002 | |
| JP | 2005279933 A | 10/2005 | |
| JP | 2006044220 A | 2/2006 | |
| JP | 2007083610 A | 4/2007 | |
| JP | 2009066718 A | 4/2009 | |
| JP | 2009226529 A | 10/2009 | |
| JP | 2010058229 A | 3/2010 | |
| JP | 4483488 B2 | 6/2010 | |
| JP | 4795097 B2 | 10/2011 | |
| JP | 2012066366 A | 4/2012 | |
| JP | 5096805 B2 | 12/2012 | |
| JP | 2015150633 A | 8/2015 | |
| JP | 2018075692 A | 5/2018 | |
| JP | 2018089867 A | 6/2018 | |
| WO | 2011012084 A1 | 2/2011 | |
| WO | WO-2014150859 A1 * | 9/2014 | ............ B23D 45/04 |
| WO | 2018088412 A1 | 5/2018 | |

* cited by examiner

SLIDING CUTTING MACHINE

CROSS-REFERENCE

The present application claims priority to Japanese patent application serial number 2020-200070 filed on Dec. 2, 2020, and to Japanese patent application serial number 2021-169375 filed on Oct. 15, 2021, the contents of both of which are hereby fully incorporated by reference.

TECHNICAL FIELD

The present invention generally relates to sliding cutting machines (e.g., benchtop cutting machines), such as a sliding compound miter saw (e.g., a dual-bevel sliding compound miter saw), that are used to cut a workpiece made of, for example, wood or the like.

BACKGROUND ART

Such a sliding cutting machine typically comprises, for example, one or more elongated slide bars (or slide poles) and a slide base (carriage), which is mounted on the slide bar(s) and is movable (slidable) along the slide bar(s). A cutting-machine main body is mounted (e.g., pivotably mounted) on the slide base. The cutting-machine main body comprises an electric motor and a cutting tool (e.g., a miter saw blade or circular saw blade), which is rotated by the electric motor. The cutting-machine main body is supported by the slide base such that it is movable (pivotable) in an up-down direction, which intersects an extension direction of the slide bar(s), relative to the slide base. By moving the cutting-machine main body toward a workpiece, which is placed downward thereof, the cutting tool can cut into the workpiece. In addition, the cutting-machine main body also may be moved (slid) along the extension direction of the slide bar thereby moving the cutting tool in parallel to the extension direction of the slide bar(s) relative to the workpiece. By moving the cutting tool relative to the workpiece in this manner, the workpiece also can be cut in a horizontal direction (i.e. along the extension direction of the slide bar(s)).

So as to not hinder the movement of the cutting tool, the slide bar(s) is (are) disposed rightward of a right-side surface of the cutting tool or leftward of a left-side surface of the cutting tool, as viewed by a user who is located (e.g., standing) on the near (front) side of the sliding cutting machine. The miter saw described in US 2005/0235791 comprises slide bars, which extend beside (rightward) of a right-side surface of the cutting tool. A motor housing, which houses the electric motor, is disposed upward of the cutting tool and is disposed such that it protrudes leftward, which is the side opposite the slide bars with respect to the cutting tool. Therefore, when the user attempts to visually confirm the cutting location of the cutting tool relative to the workpiece, it is possible that the region that protrudes leftward of the motor housing will obstruct visibility of the workpiece and cutting location. In this case, the user might have to lower his/her head in order to visually confirm the cutting location.

The cutting device described in US 2020/0055131 comprises slide bars that extend beside (leftward) of a left-side surface of the cutting tool. A motor housing that houses an electric motor is disposed rightward of the cutting tool and is disposed with a tilted attitude in the state in which the cutting tool is vertical. More specifically, the motor housing tilts upward as it extends rightward away from the cutting tool, as viewed from the near (front) side of the cutting device. Therefore, when the user attempts to visually confirm the cutting location of the cutting tool relative to the workpiece, it is possible that the slide bars, which are located leftward of the cutting tool, will obstruct visibility. In this case as well, the user might have to lower his/her head to visually confirm the cutting location.

SUMMARY

In the known sliding cutting machines described above, there is room for improvement with regard to the visibility of the cutting location of the cutting tool.

According to one aspect of the present disclosure, a sliding cutting machine (e.g., a benchtop cutting machine such as a sliding compound miter saw) may comprise: one or more slide bars (slide poles), which (each) has an elongate shape, e.g., extending in a front-rear direction; a slide base, which is mounted on the slide bar(s) and is movable (e.g., slidable) along the slide bar(s); and a cutting-machine main body, which is mounted on the slide base such that it is movable (e.g., pivotable) in an up-down direction relative to the slide base (and the slide bar(s)). The cutting-machine main body comprises: an output shaft, which extends in an axial direction orthogonal to an extension direction of the slide bar(s) and on which a cutting tool (e.g., a miter saw blade or circular saw blade) is mountable; and an electric motor, which is located between the cutting tool and the slide bar(s), viewed along the extension direction of the slide bar(s) (e.g., from the front when the miter angle of the cut is set to) 0°, in the state in which the output shaft is caused to rotate and the cutting tool is vertical. Hereinafter, the expression "the cutting tool is vertical" is intended to mean that the cutting tool extends within a plane that is vertical (perpendicular) to a horizontally extending surface (e.g., a turntable surface) of the sliding cutting machine.

In such an aspect of the present disclosure, the slide bar(s) and the electric motor are disposed on one side-surface side (e.g., the right-side-surface side) of the cutting tool. Consequently, the sliding cutting machine can be provided such that no structural element protrudes on the other side-surface side (e.g., the left-side-surface side) of the cutting tool. Thereby, the visibility of the cutting location of the cutting tool on the other side-surface side of the cutting tool can be improved.

DETAILED DESCRIPTION OF THE EMBODIMENTS

Figure 1:
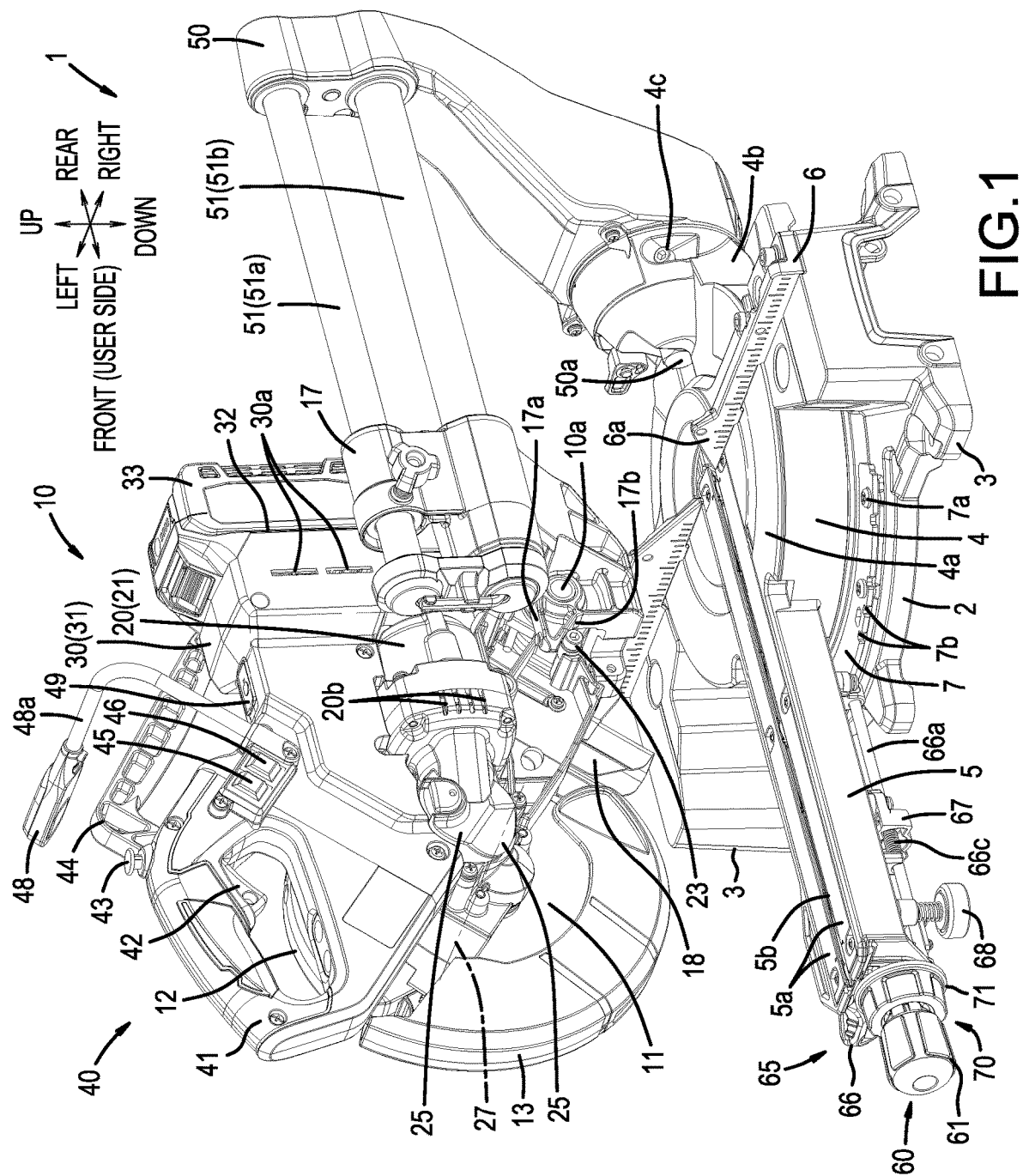
FIG. 1 is an overall oblique view, viewed from the right, of a sliding cutting machine according to a first embodiment of the present disclosure.

According to another aspect of the present disclosure, the electric motor preferably comprises a motor shaft. The motor shaft is parallel to a side surface of a cutting tool or is tilted by 10° or less relative to the side surface of the cutting tool, as viewed from a radial direction of the motor shaft, in the state in which the cutting tool is vertical. In such an embodiment, the motor shaft can be disposed with an attitude that extends beside (in parallel to) the side surface of the cutting tool such that the electric motor can be disposed in relatively close proximity to the cutting tool. Thereby, the arrangement of the cutting tool and the electric motor can be made more compact in a direction perpendicular to the extension direction of the slide bar(s) (e.g., in the left-right direction when a miter angle is set to 0°) such that the cutting-machine main body can be made more compact in the direction perpendicular to the extension direction of the slide bar(s).

In addition or in the alternative, according to another aspect of the present disclosure, the center of the electric motor (e.g., a longitudinal center of the electric motor and/or a rotational axis of a rotor of the electric motor) is preferably disposed at a location that is 30%-50% of the distance from the cutting tool to the slide bar(s) in a surface-normal direction of the cutting tool, with the cutting tool as the starting point. In such an embodiment, the center of the electric motor is disposed closer to the cutting tool than to the slide bar(s) such that the center of gravity of the cutting-machine main body in the left-right direction can be brought into closer proximity to the cutting tool. Thereby, when the cutting tool is caused to cut the workpiece by moving (pivoting) the cutting-machine main body downward, the reaction force that the cutting tool receives from the workpiece and the twisting moment caused by the intrinsic weight of the cutting-machine main body can be made smaller.

In addition or in the alternative, according to another aspect of the present disclosure, the slide bar(s) preferably comprise(s) only one slide bar or a plurality of slide bars provided (extending) in parallel. The one slide bar or at least one of the plurality of slide bars is positioned such that it overlaps the electric motor, as viewed in an axial direction of the output shaft when the cutting-machine main body is at (has been pivoted to) its bottom dead center (lower limit). In such an embodiment, when the cutting-machine main body is at the bottom dead center, the electric motor can be disposed at a relatively low location and the amount by which the electric motor protrudes upward can be curtailed. Thereby, a sliding cutting machine can be made compact in this respect as well. In addition, when the cutting-machine main body has been tilted in the left-right direction and caused to cut into the workpiece (i.e. a bevel cut is performed), this design prevents an upper portion of the electric motor from obstructing the visibility of the cutting location.

In addition or in the alternative, according to another aspect of the present disclosure, the at least one slide bar is preferably located at the lowest location of the plurality of bars. In such an embodiment, the electric motor can be disposed in the vicinity of the lowermost point at which it is possible for the electric motor to be disposed. Consequently, the amount by which the electric motor protrudes upward can be kept to a minimum, which design further aids in making the sliding cutting machine more ergonomic and compact.

In addition or in the alternative, according to another aspect of the present disclosure, the slide bars include a first bar, which is located most upward, and a second bar, which is located most downward. When the diameter of the first slide bar is given as a [mm], the diameter of the second slide bar is given as b [mm], the center-to-center distance between the first slide bar and the second slide bar is given as c [mm], and the diameter of the cutting tool is given as d [mm], the following relation is satisfied:

$$(a/2 + b/2 + c) \times 2 < d < (a/2 + b/2 + c) \times 3.5.$$

In such an embodiment, the plurality of bars can fit compactly within the extent of a length that is shorter than half the diameter of the cutting tool in an up-down direction. Moreover, the distance in the up-down direction, which includes (spans) all of the plurality of bars, is larger than 2/7 times the diameter of the cutting tool. Consequently, the plurality of bars can be provided such that they have sufficient strength to be capable of supporting the cutting-machine main body. Thus, both compactness and support strength of the slide structure of the cutting-machine main body can be achieved at the same time.

In addition or in the alternative, according to another aspect of the present disclosure, when the workpiece is to be cut by the cutting tool, the cutting-machine main body is preferably also slid in a travel (e.g., substantially horizontal) direction relative to the slide bar(s). The electric motor also preferably comprises the motor shaft. When the cutting-machine main body is located at the bottom dead center, the motor shaft is disposed with (at) a tilt angle that tilts upward as it extends in the travel direction. When the cutting-machine main body is located at the bottom dead center, the amount by which the electric motor protrudes downward can be kept to the minimum, thereby enabling the sliding cutting machine to be made more compact in the up-down direction.

In addition or in the alternative, according to another aspect of the present disclosure, the tilt angle of the motor shaft is preferably 30°-60° relative to a horizontal line when the cutting-machine main body is located at the bottom dead center. In such an embodiment, a motor housing, which houses the electric motor, can be prevented from making contact with the workpiece. Consequently, the workpiece can be suitably cut using the relatively compact sliding cutting machine.

In addition or in the alternative, according to another aspect of the present disclosure, the motor shaft is preferably parallel to a (the) horizontal line or has a tilt angle of 10° or less relative to the horizontal line when the cutting-machine main body is located at its top dead center (upper limit). In such an embodiment, the amount by which the electric motor protrudes upward or downward can be curtailed. Thereby, when confirming the cutting location of the cutting tool, this design prevents or at least substantially reduces an obstruction to visibility.

In addition or in the alternative, according to another aspect of the present disclosure, the sliding cutting machine preferably further comprises a manipulatable handle configured/adapted to be used to move the cutting-machine main body relative to the slide bar(s). The center of the manipulatable handle is located either in a virtual plane, which includes the cutting tool, or between the slide bar and the cutting tool, viewed from the front in the state in which the cutting tool is vertical. In such an embodiment, the center (longitudinal center) of the slide bar(s) and the manipulatable handle can be brought into closer proximity with one another in the left-right direction. Consequently, when a user grasps the manipulatable handle and causes the cutting tool to cut into the workpiece, the twisting moment of the cutting-machine main body relative to the slide bar can be made smaller. Furthermore, the center of the cutting tool and the center of the manipulatable handle can be brought into closer proximity with one another in the direction perpendicular to the extension direction of the slide bar(s) (e.g., in the left-right direction). Consequently, when the user grasps the manipulatable handle and causes the cutting tool to cut into the workpiece, the reaction force that the cutting tool receives from the workpiece and the twisting moment caused by the manipulation (pressing) force with which the manipulatable handle is manipulated (pressed) can be made smaller.

In such an aspect of the present disclosure, the center of the manipulatable handle is preferably disposed at a location that is 30%-70% of the distance from the cutting tool to the slide bar(s) in the surface-normal direction of the cutting tool, with the cutting tool as the starting point. In such an embodiment, the center of the manipulatable handle is disposed at a location at which it is not spaced too far apart from both the cutting tool and the slide bar(s). Consequently, the twisting moment of the cutting-machine main body that acts between the cutting tool and the manipulatable handle can be made smaller. Moreover, flexure of the slide bar caused by the manipulation force with which the manipulatable handle is manipulated can be reduced.

In addition or in the alternative, according to another aspect of the present disclosure, the sliding cutting machine preferably further comprises a bottom-dead-center stopper, which restricts (blocks) movement of the cutting-machine main body downward of (past) the bottom dead center. The center of the bottom-dead-center stopper is located between the slide bar(s) and the cutting tool, as viewed from the front of the sliding cutting machine, in the state in which the cutting tool is vertical. Accordingly, the center of the bottom-dead-center stopper and the distance of the slide bar can be made shorter. When the cutting-machine main body has descended to the bottom dead center, the bottom-dead-center stopper receives the reaction force. Consequently, because the distance has been shortened, the twisting moment of the cutting-machine main body relative to the slide bar(s) caused by the reaction force can be made smaller.

In such an aspect of the present disclosure, the center of the bottom-dead-center stopper is preferably disposed at a location that is 30%-70% of the distance from the cutting tool to the slide bar(s) in the surface-normal direction of the cutting tool, with the cutting tool as the starting point. In such an embodiment, the center of the bottom-dead-center stopper is disposed at a location at which it is not spaced too far apart from both the cutting tool and the slide bar(s). Consequently, the reaction force received by the bottom-dead-center stopper and the twisting moment of the cutting-machine main body that acts against the slide bar can be made smaller, and shaking of the cutting tool caused by the twisting moment can be reduced.

In addition or in the alternative, according to another aspect of the present disclosure, the sliding cutting machine preferably further comprises a (the) manipulatable handle configured/adapted to be used to move the cutting-machine main body relative to the slide bar(s). The sliding cutting machine also preferably comprises a movable cover, which covers a portion of the cutting tool and is movable relative to the cutting-machine main body.

The sliding cutting machine also preferably comprises a carrying handle configured/adapted to be used to carry the sliding cutting machine; the carrying handle is preferably a structural element separate (discrete) from the manipulatable handle. The carrying handle straddles and extends across the region in which the movable cover is movable. In such an embodiment, the carrying handle can be disposed in a compact manner such that it does not obstruct the visibility of the cutting location and can be disposed such that it does not hinder the operation of the movable cover.

In addition or in the alternative, according to another aspect of the present disclosure, the sliding cutting machine preferably further comprises a power-transmission shaft, which is disposed in a power-transmission path that (i) extends in a direction that intersects the motor shaft of the electric motor and (ii) extends from the motor shaft to the cutting tool. The sliding cutting machine comprises a gear, which is mounted on the motor shaft or the power-transmission shaft, and a gear housing, which houses the gear. The gear housing has a first opening, through which the motor shaft passes, and a second opening, through which the power-transmission shaft passes and that opens in a direction that intersects the direction in which the first opening opens. The gear housing is configured as one component, i.e. as one integral component that has no seam between connected parts. In such an embodiment, the gear housing houses at least a portion of the motor shaft, at least a portion of the power-transmission shaft, and the gear, all of which extend in mutually different directions, and is formed compactly. Thereby, the cutting-machine main body can be made compact in the left-right direction and also in a front-rear direction. In addition, by virtue of being configured as one component, the strength of the gear housing can be increased.

In such an aspect of the present disclosure, the gear housing preferably supports one set of gears that couple the motor shaft and the power-transmission shaft, and the one set of gears preferably includes at least one bevel gear. Accordingly, the power of the at least one bevel gear can be transmitted to the power-transmission shaft, which extends along the left-right direction from the motor shaft extending along the front-rear direction. Consequently, the gear housing, which supports the at least one bevel gear can be formed compactly in the left-right direction and also in the front-rear direction.

In addition or in the alternative, according to another aspect of the present disclosure, the cutting-machine main body preferably has at least one air-exhaust port, which is disposed at the same front-rear location as the electric motor and forward of the electric motor and opens rearward. An air-exhaust draft, after it has cooled the electric motor, is discharged from the air-exhaust port. In such an embodiment, discharge of the air-exhaust draft toward the user, who is located forward of the sliding cutting machine, can be reduced. Consequently, scattering of chips, sawdust, etc. toward the user can be reduced. In addition, when the cutting-machine main body is tilted in the left-right direction and a bevel cut is to be performed, discharge of the air-exhaust draft toward the workpiece, which is located downward of the electric motor, can be reduced. Consequently, it is possible to reduce the amount of chips, sawdust, etc. that are blown onto the workpiece.

In such an aspect of the present disclosure, the air-exhaust draft discharged from the air-exhaust port preferably flows parallel to and in the reverse direction of a cooling draft while the electric motor is being cooled. Furthermore, an air-intake port is preferably disposed rearward of the electric motor. In such an embodiment, the intake of chips, sawdust, etc. suspended in the vicinity of the air-intake port into the air-intake port can be reduced. Moreover, if the air-exhaust draft is designed to flow parallel to and in the reverse direction of the cooling draft that flows along the axial direction of the electric motor, the air-exhaust draft will be discharged such that it is not spaced too far apart in the up-down direction or the left-right direction from the motor housing, which houses the electric motor. Thereby, the scattering of chips, sawdust, etc., onto the workpiece can be further reduced.

In addition or in the alternative, according to another aspect of the present disclosure, the sliding cutting machine preferably further comprises a controller, which is configured/adapted to control the output (e.g., rotational speed) of the electric motor. Preferably, the controller is disposed such that, when the cutting-machine main body is located at (the) bottom dead center, the controller is located upward of the electric motor. In such an embodiment, the controller can be disposed such that the cutting-machine main body is more compact in the left-right direction. Furthermore, the amount by which the controller protrudes downward can be reduced. Consequently, when the cutting-machine main body is located at the bottom dead center, a controller housing, which houses the controller, can be prevented from making contact with the workpiece.

In addition or in the alternative, according to another aspect of the present disclosure, the sliding cutting machine preferably comprises a (the) controller, which is configured/adapted to control the output (e.g., rotational speed) of the electric motor. The controller is preferably disposed such that it overlaps the electric motor in the left-right direction when the cutting-machine main body is located at the bottom dead center. In such an embodiment, the controller and the electric motor can be disposed more compactly in the left-right direction.

In addition or in the alternative, according to another aspect of the present disclosure, the sliding cutting machine preferably further comprises a fan, which is rotated by the electric motor and generates a draft that cools the electric motor, and a (the) controller, which is configured/adapted to control the output (e.g., rotational speed) of the electric motor. The controller is cooled using the draft generated by the fan. Accordingly, in such an embodiment, both the electric motor and the controller can be efficiently cooled using the fan.

A first representative, non-limiting detailed embodiment of the present disclosure will now be explained, with reference to FIGS. 1-20. This first embodiment illustrates by example a sliding cutting machine 1 (e.g., a benchtop cutting machine), which is also known as a sliding compound miter saw or more specifically as a dual-bevel sliding compound miter saw. As shown in FIG. 1, the cutting machine 1 comprises a base 2, which is placed on a table, a bench, the floor, or the like, a turntable (turn base) 4 for placing the workpiece thereon (i.e. for supporting the workpiece during a cutting operation), and a cutting-machine main body 10. The turntable 4 is supported, upward of the base 2, such that it is rotatable (pivotable) in the horizontal direction about a rotary spindle 2a (refer to FIG. 10) relative to the base 2. The cutting-machine main body 10 is provided upward of the turntable 4. A substantially discoidal (e.g., circular) cutting tool 11, such as a miter saw blade (e.g., a carbide-tipped miter saw blade or circular saw blade), is supported in a rotatable manner by the cutting-machine main body 10. The user typically performs a cutting operation while standing on the near (front) side of the cutting machine 1. In the explanation below, the up, down, left, and right directions of the members and structural elements are defined with the user as a reference. With regard to the front-rear direction of the members and the structural elements, the near side is defined as the front side, as viewed from the standpoint of the user.

Figure 2:
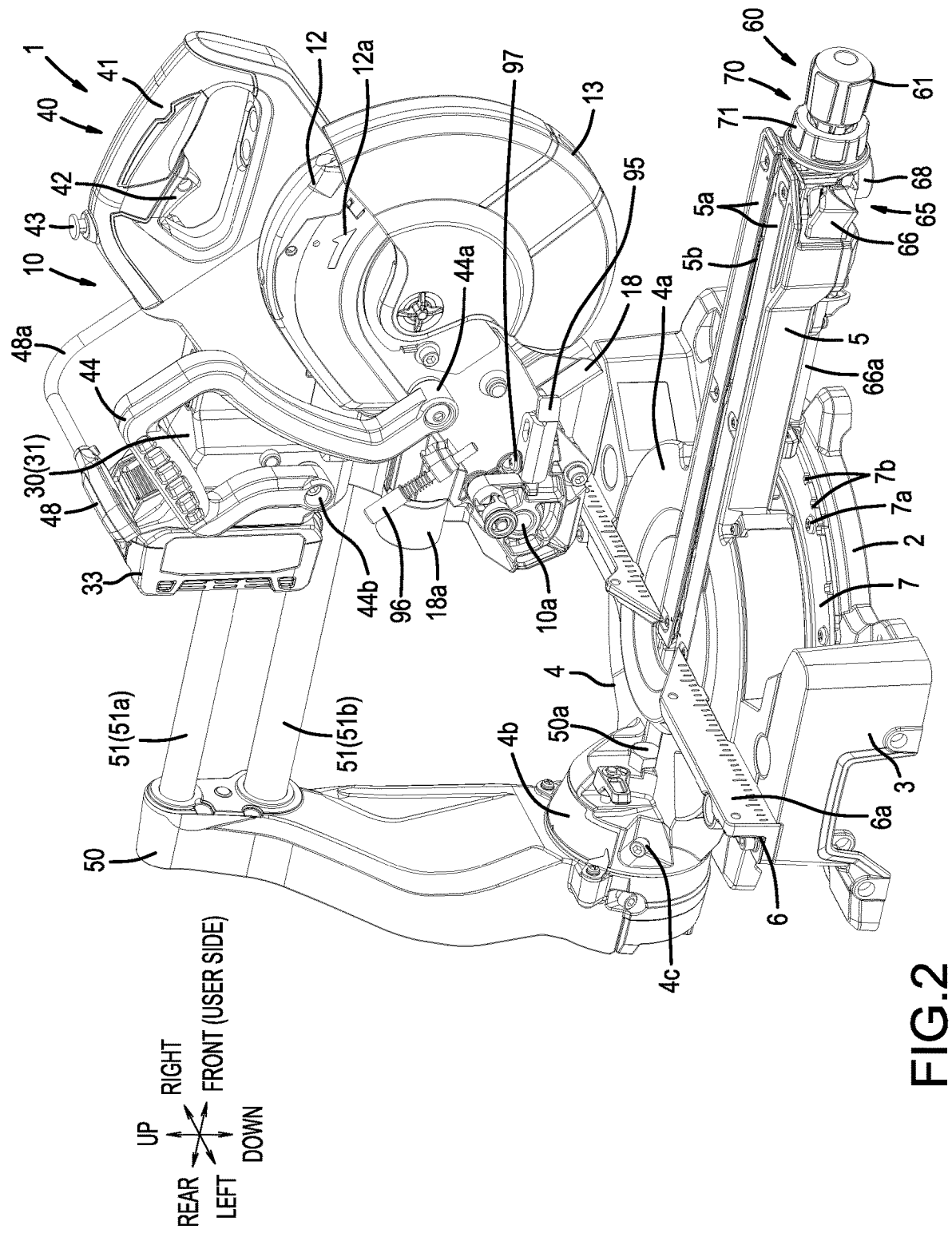
FIG. 2 is an overall oblique view, viewed from the left, of the sliding cutting machine.
Figure 3:
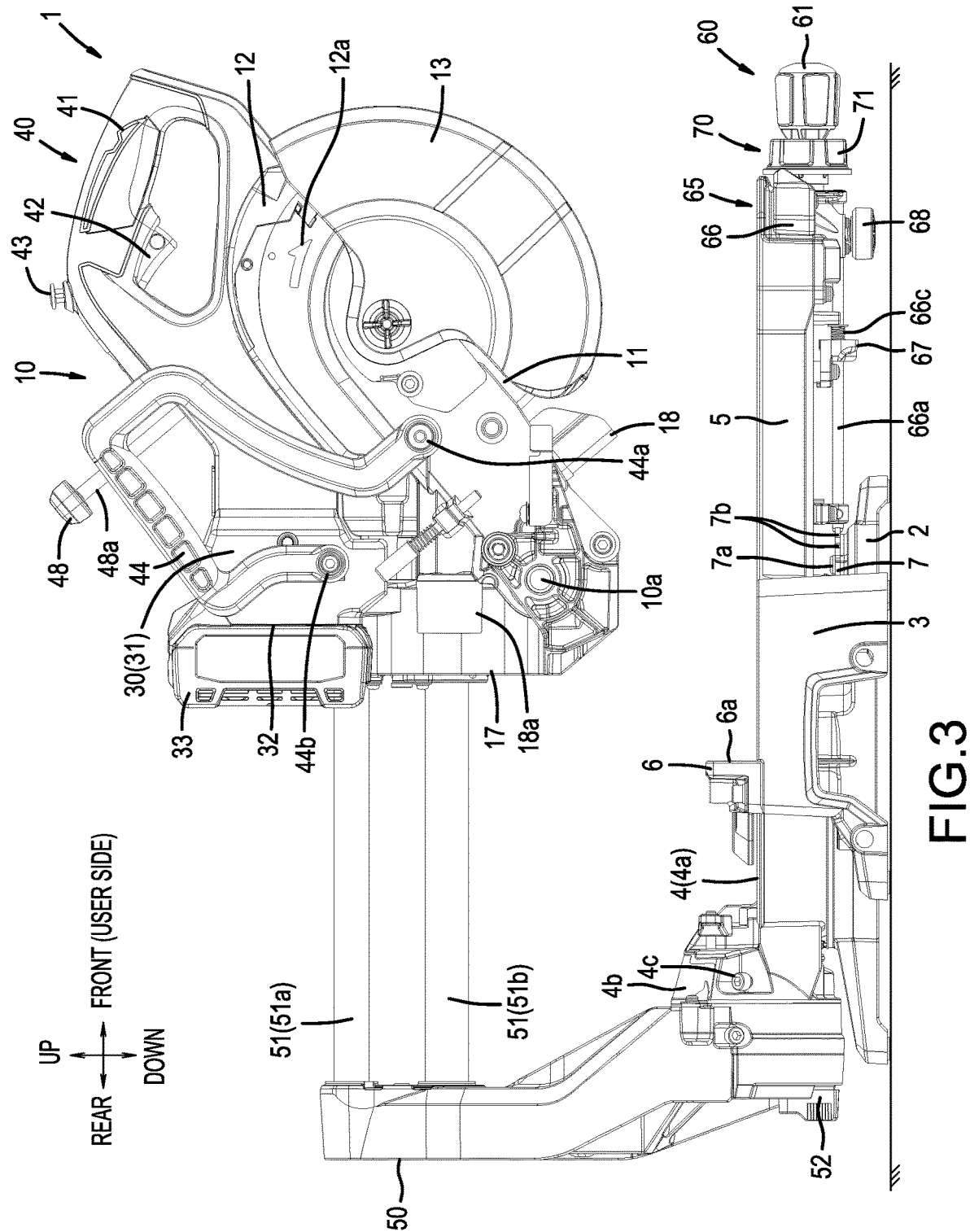
FIG. 3 is a left view of the sliding cutting machine in the state in which the cutting-machine main body is located at top dead center.

As shown in FIGS. 2 and 3, the turntable 4 is substantially circular in plan view, and a table upper surface 4a thereof extends horizontally. The turntable 4 has a center of rotation at the center of its substantially discoidal shape and is rotatable in a horizontal plane relative to the base. The base 2 further comprises two auxiliary tables (sub bases) 3 that are respectively disposed on the left and right sides of the turntable 4, wherein the heights of upper surfaces of the auxiliary tables 3 are the same as the height of the table upper surface 4a. That is, the upper surface of the auxiliary tables 3 is flush with the upper surface of the turntable 4. The turntable 4 comprises a table-extension part (extension arm) 5, which extends along the cutting-plane direction of the cutting tool 11. Kerf boards 5a are provided at the upper surface of the turntable 4 and the upper surface of the table-extension part 5. A slot 5b is provided at the center of the kerf boards 5a and has a notch shape extending along a cutting plane of the cutting tool 11.

As shown in FIG. 1, an adjustment bolt 68, which supports the table-extension part 5 from below, is provided on a lower portion of the table-extension part 5. The adjustment bolt 68 is supported by the table-extension part 5 and is movable up and down by screwing (rotating) it into or out of the table-extension part 5. By moving the adjustment bolt 68 up or down, the lower end of the adjustment bolt 68 can be brought into contact with a placement surface of the base 2. That is, the adjustment bolt 68 can adjust the height of the table-extension part 5, so that the table-extension part 5 is directly supported by the placement surface, on which the base 2 is placed, thereby reducing or eliminating rattling of the table-extension part 5 during a cutting operation.

As shown in FIGS. 1 and 3, a positioning fence 6, which has a wall shape extending in the left-right direction and extending upward, is provided upward of the turntable 4 and the auxiliary tables 3. The positioning fence 6 is supported by the left and right auxiliary tables 3. A positioning surface 6a, which is a front surface of the positioning fence 6, is located along a vertical plane through which the center of rotation of the turntable 4 passes. When the workpiece is placed on the turntable 4, it is pushed into contact with the positioning surface 6a, and is thereby positioned in the front-rear direction.

As shown in FIGS. 1 and 3, a miter-scale plate 7, which has an arcuate shape, is provided in a substantially half-circumferential region of a front portion of the base 2. The miter-scale plate 7 is provided such that it extends horizontally and downward of the table upper surface 4a. A plurality of groove-shaped positioning recesses 7b is provided in the miter-scale plate 7 and respectively extend in radial directions. The positioning recesses 7b are respectively provided at prescribed angular intervals in the circumferential direction of the miter-scale plate 7. A tip portion of a positioning pin 66a, which is described below, is configured to enter into each of the positioning recesses 7b, i.e. when the positioning pin 66a is aligned with a particular positioning recess 7b. The miter-scale plate 7 is fixed to the base 2 by fixing screws 7a. The fixing screws 7a are inserted into elongated holes in the base 2. The angle between the positioning fence 6 and the cutting tool 11 can be finely adjusted by loosening the fixing screws 7a and moving the miter-scale plate 7 in the left-right direction.

For example, if the positioning pin 66a is in the state in which it is inserted in the positioning recessed part 7b at the right-angle position, then the right angle between the cutting tool 11 and the positioning fence 6 can be minutely (finely) adjusted. This adjustment is performed principally in the product manufacturing process.

Figure 5:
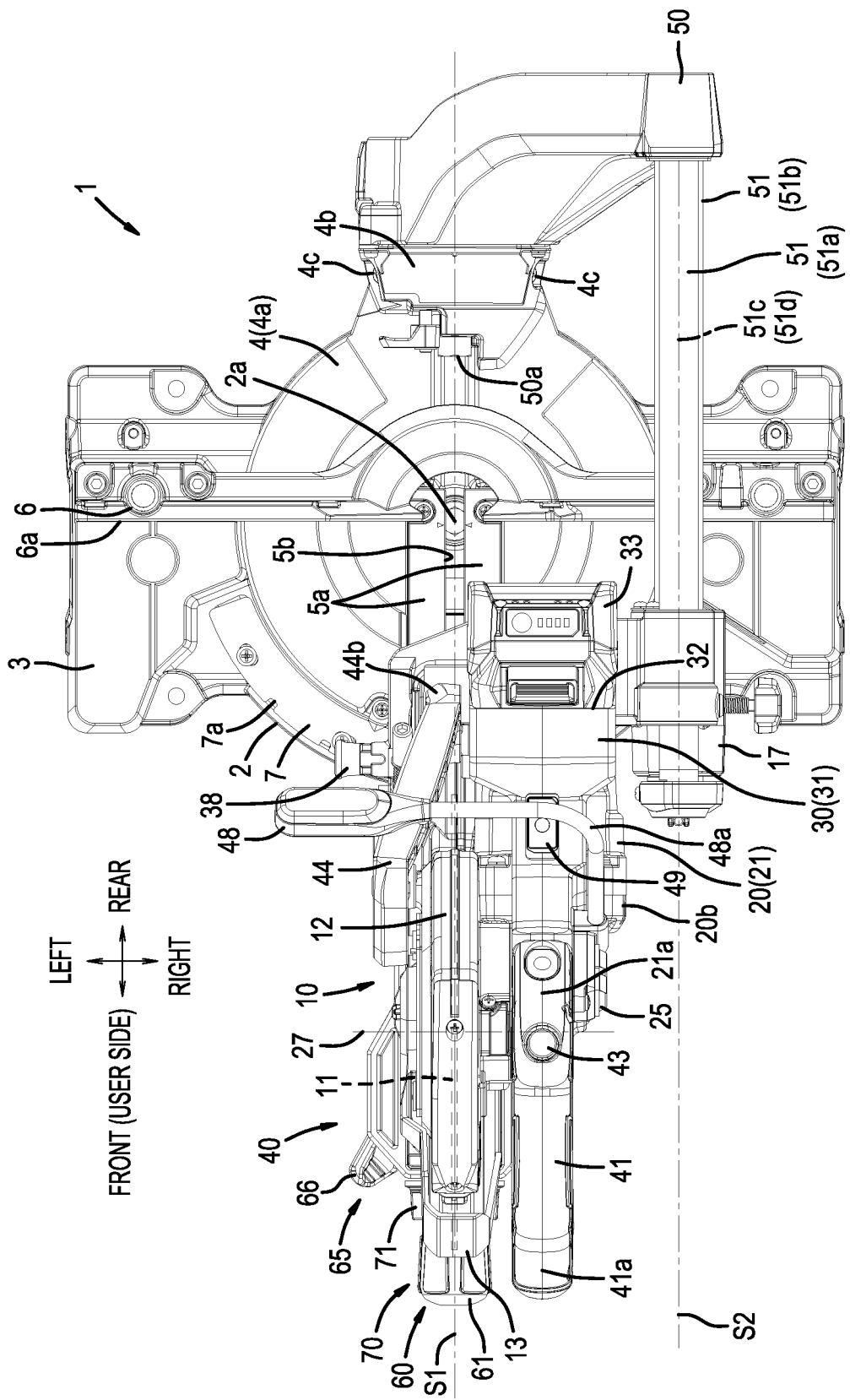
FIG. 5 is a plan view of the sliding cutting machine in the state in which the cutting-machine main body is located at the top dead center.
Figure 6:
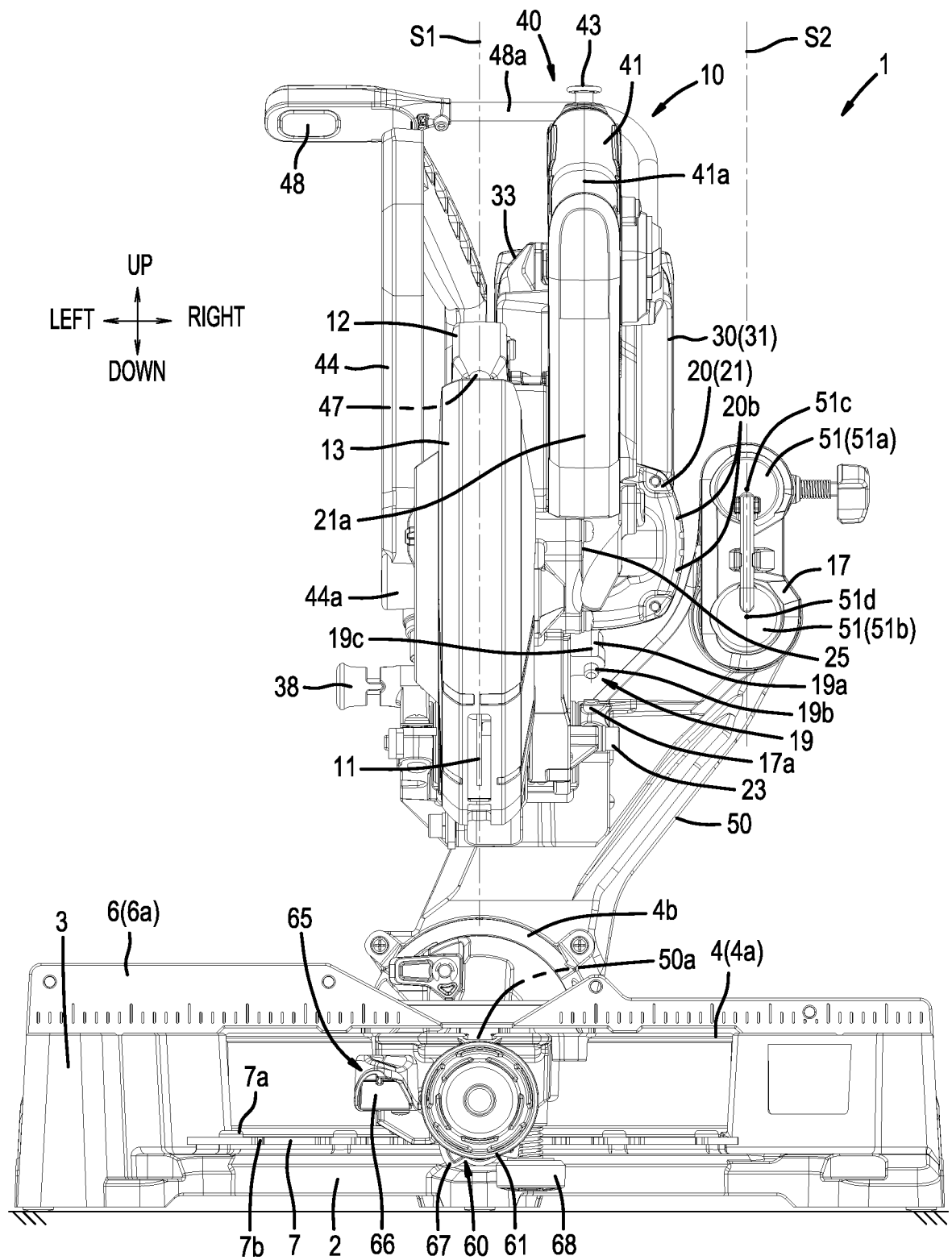
FIG. 6 is a front view of the sliding cutting machine in the state in which the cutting-machine main body is located at the top dead center.
Figure 19:
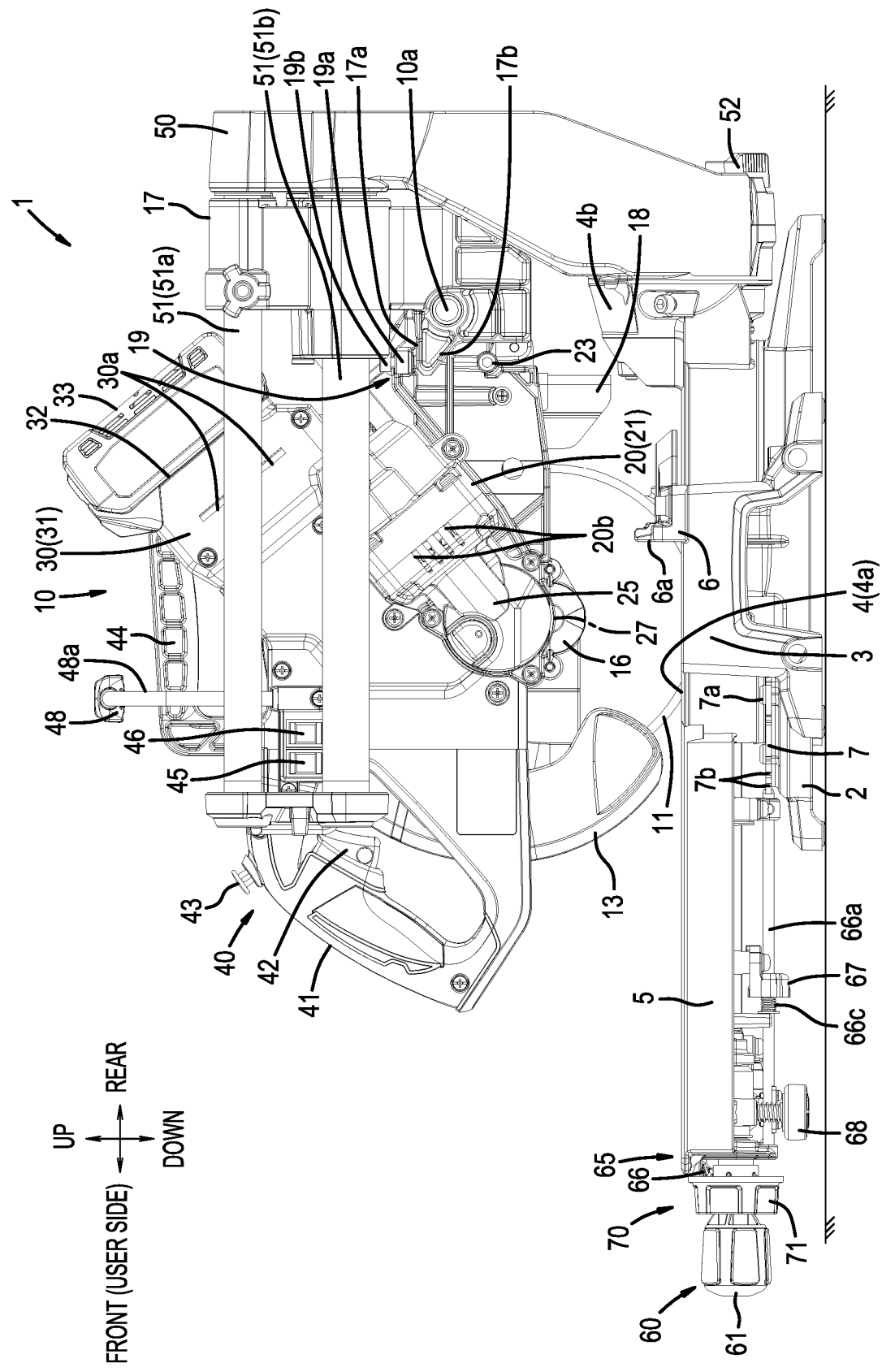
FIG. 19 is a right view of the sliding cutting machine in the state in which the cutting-machine main body has been moved rearward and is located at the bottom dead center.
Figure 20:
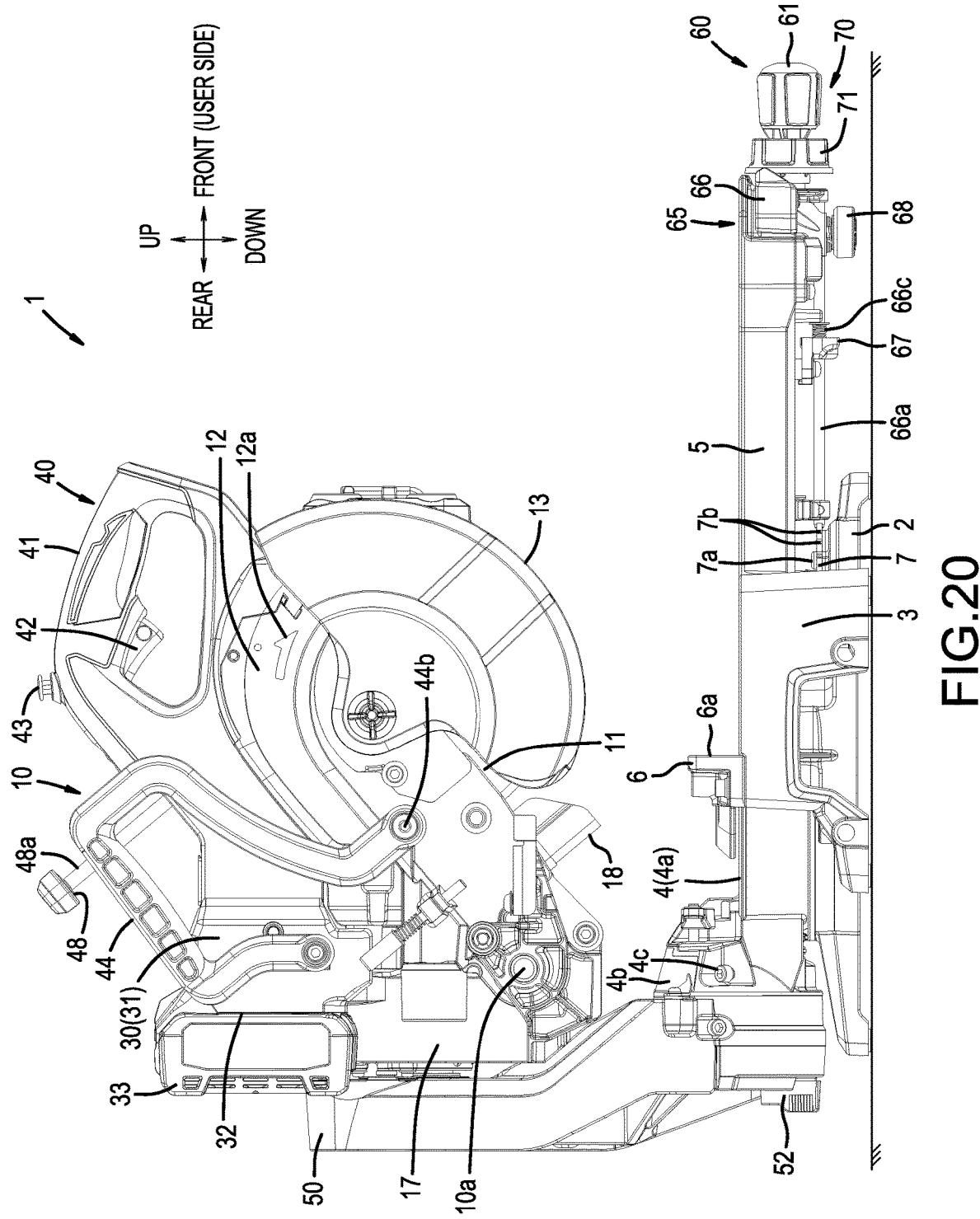
FIG. 20 is a left view of the sliding cutting machine in the state in which the cutting-machine main body has been moved rearward and is located at the top dead center.

As shown in FIGS. 1 and 6, a main-body support arm 50, which extends substantially upward, is provided rearward of the turntable 4. The main-body support arm 50 is supported such that it is tiltable in the left-right direction relative to the turntable 4 about a left-right tilting pivot 50a extending in the front-rear direction. As can be seen, e.g., in FIGS. 5 and 15 (in which the support arm 50 is positioned such that the cutting tool 11 is vertical), the main-body support arm 50 is inclined (bent, curved) such it extends rightward as it extends upward. Thus, as shown in FIGS. 19, 20, the main-body support arm 50 has a shape such that, when a below-described slide base 17 is moved toward the rear end of below-described slide bars 51, the main-body support arm 50 does not block or impeded a movable range of a battery (battery pack, battery cartridge) 33, which is mounted on a battery-mount part 32 of the cutting-machine main body 10.

Elongate slide bars (slide poles) 51, which extend beside the cutting plane of the cutting tool 11 and extend along parallel horizontal lines, are provided at (extend in a cantilever manner from) an upper portion of the main-body support arm 50. The slide bars 51 are preferably cylinder-shaped with an aspect ratio greater than 10:1, and optionally may be hollow to reduce weight. The slide bars 51 comprise a first bar 51a, which is upward, and a second bar 51b, which is downward, both being provided parallel in the up-down direction. The slide base (carriage) 17 is mounted on the first bar 51a and the second bar 51b so as to be slidable in the front-rear direction relative to the first and second bars 51a, 51b. The cutting-machine main body 10 is coupled (attached) to the slide base 17 leftward thereof. Consequently, the cutting-machine main body 10 is located leftward of the first bar 51a and the second bar 51b when the cutting tool 11 is vertical. By sliding the slide base 17 in the front-rear direction, a workpiece (e.g., a wide workpiece) that is placed on the turntable 4 can be cut.

Figure 13:
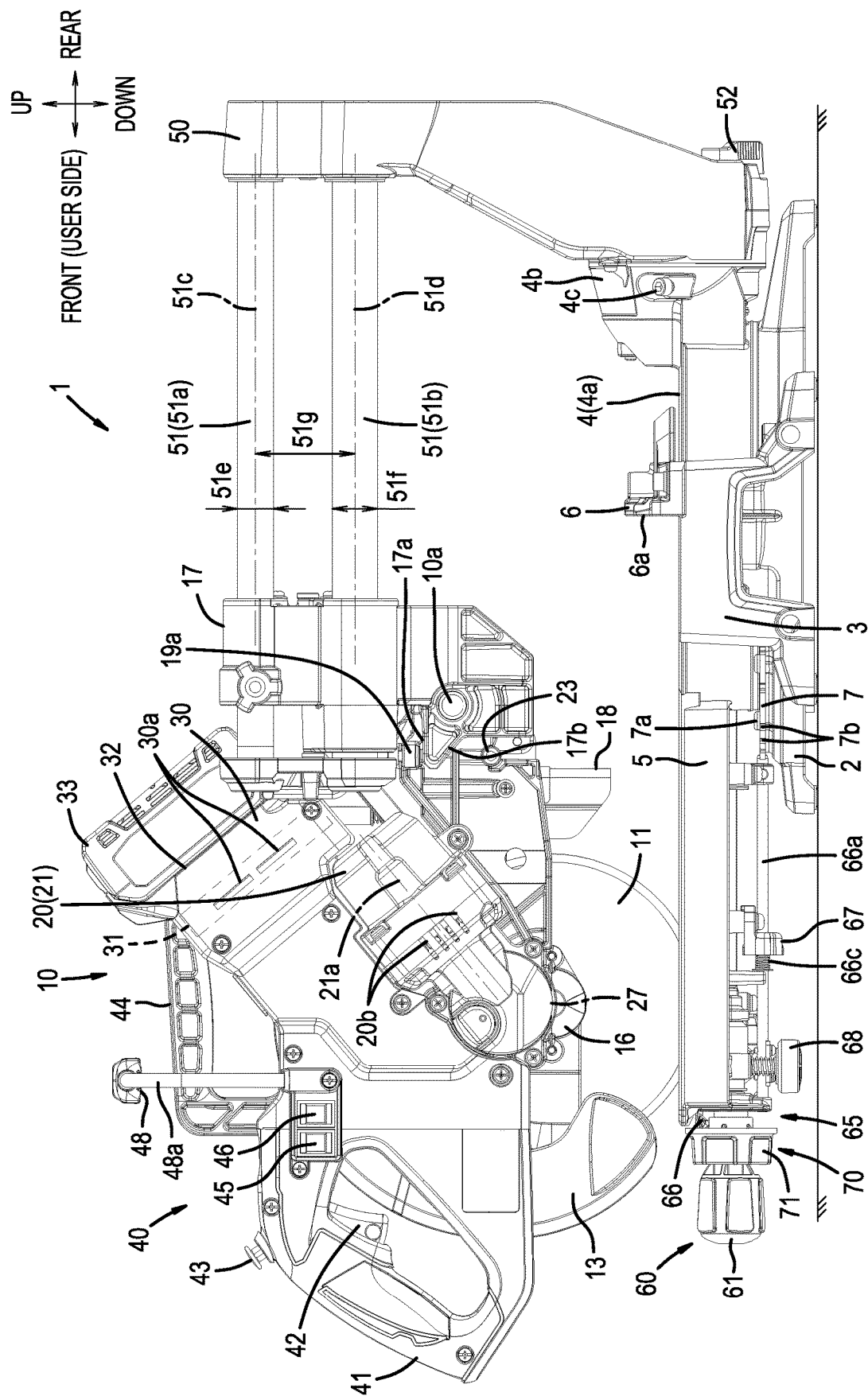
FIG. 13 is a right view of the sliding cutting machine in the state in which the cutting-machine main body is located at bottom dead center.

As shown in FIGS. 5, 6 and 13, the first bar 51a is formed in a circular-cylinder shape having a diameter 51e of, for example, 20 mm. The second bar 51b is formed in a circular-cylinder shape having a diameter 51f that is larger than the diameter 51e, for example, 25 mm. A center 51c of the first bar 51a and a center 51d of the second bar 51b extend in the front-rear direction parallel to one another. The location of the center 51c of the first bar 51a and the location of the center 51d of the second bar 51b in the left-right direction are, for example, the same location. It is noted that a virtual plane that passes through the center of the base metal (plane) of the cutting tool 11 in the thickness direction and extends in the same direction as the base metal of the cutting tool 11 is represented as a first virtual plane S1. A virtual plane through which the center 51c of the first bar 51a and the center 51d of the second bar 51b pass is represented as a second virtual plane S2. The first virtual plane S1 and the second virtual plane S2 are, for example, parallel. The distance (minimum distance) between the first virtual plane S1 and the second virtual plane S2 is, for example, 115 mm. The center 51c of the first bar 51a and the center 51d of the second bar 51b are disposed spaced apart by a center-to-center distance 51g of, for example, 55 mm in the up-down direction. The diameters 51*e*, 51*f* and the center-to-center distance 51*g* are set such that the relation below (Equation 1) is satisfied, wherein the diameter 51*e* is given as a [mm], the diameter 51*f* is given as b [mm], the center-to-center distance 51*g* is given as c [mm], and the diameter of the cutting tool 11 is given as d [mm]. For example, in an embodiment in which a cutting tool 11 having a diameter of, for example, 190 mm is mounted on the cutting machine 1, the diameters 51*e*, 51*f* and the center-to-center distance 51*g* are set such that 54 mm<(a/2+b/2+c)<95 mm.

$$(a/2 + b/2 + c) \times 2 < d < (a/2 + b/2 + c) \times 3.5 \qquad \text{Equation 1}$$

Figure 12:
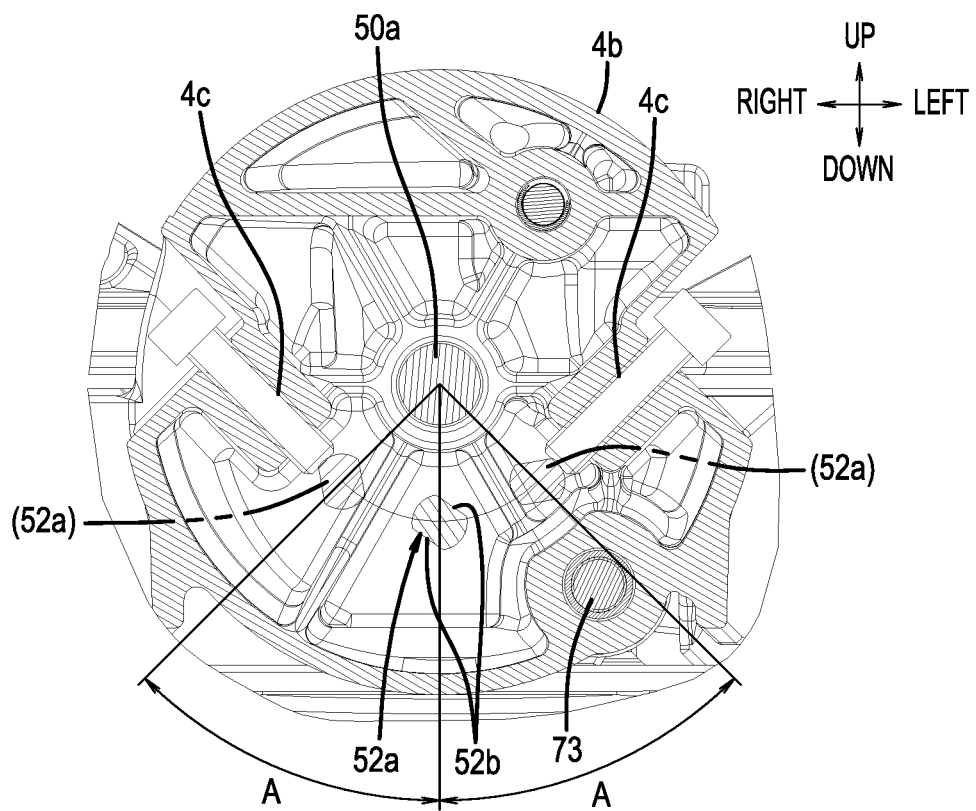
FIG. 12 is a cross-sectional auxiliary view taken along line XII-XII in FIG. 10 and is a longitudinal, cross-sectional view of an arm-support part and a main-body support arm.

As shown in FIG. 12, an arm-support part 4*b* comprises left and right tilt-stopper bolts 4*c*, i.e. bolts for finely adjusting the bevel angle range of the cutting tool 11. The tips of the tilt-stopper bolts 4*c* protrude into the interior of the arm-support part 4*b*. The amount of protrusion of the tilt-stopper bolts 4*c* can be adjusted by rotating the tilt-stopper bolts 4*c* about their axes using a hexagonal-rod spanner (hex (Allen) wrench) or the like. This adjustment is performed principally in the product manufacturing process.

Figure 10:
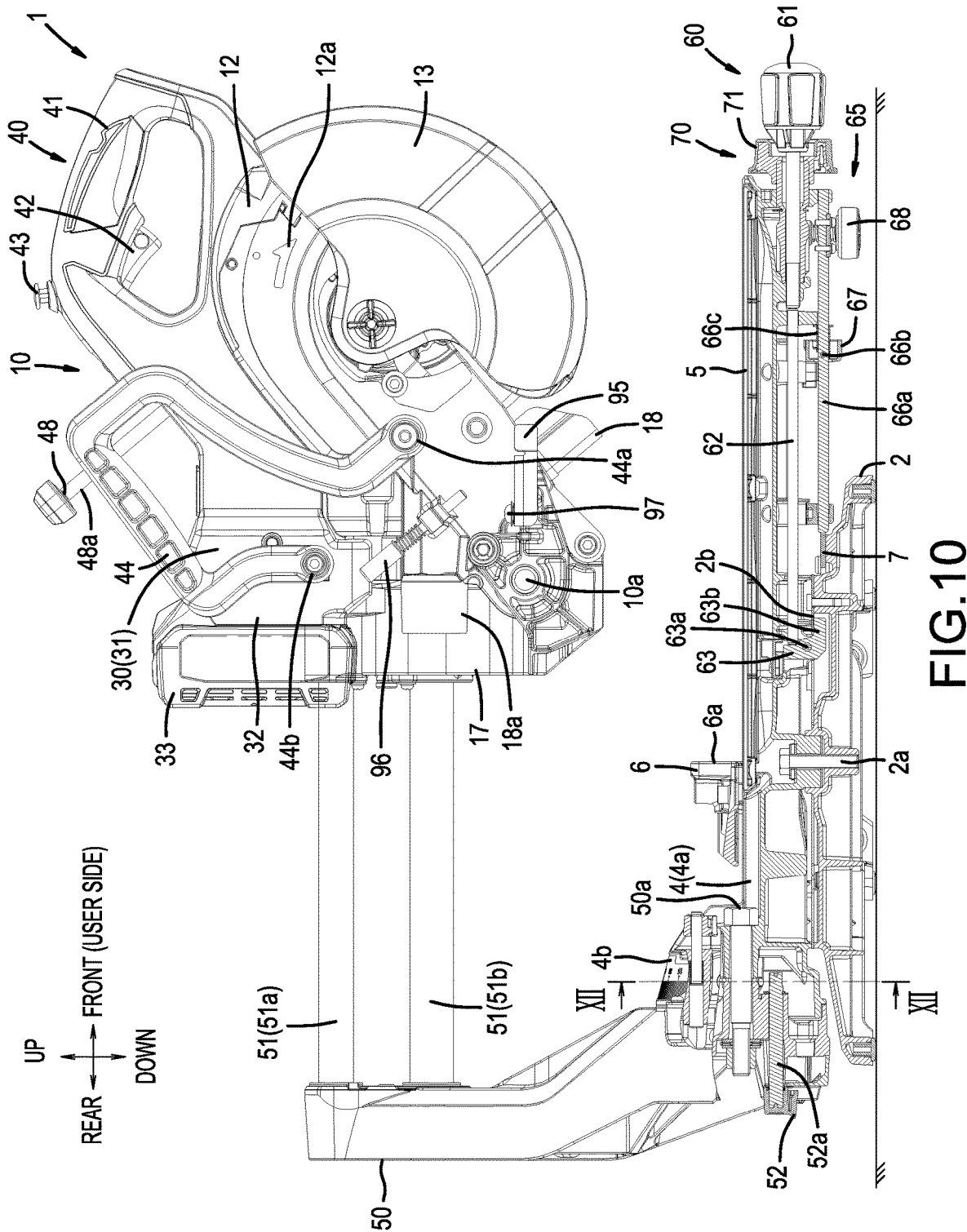
FIG. 10 is a left view that includes a partial, longitudinal, cross-sectional view of the sliding cutting machine.

As shown in FIGS. 10 and 12, a maximum-tilt-angle changing lever 52 is provided on a rear-side lower portion of the main-body support arm 50. The maximum-tilt-angle changing lever 52 comprises a lever shaft 52*a*, which extends parallel to and forward of the left-right tilting pivot 50*a*. The lever shaft 52*a* has a circular-column shape. A width-across-flats part 52*b*, which is formed as two flats parallel to the axial direction and with a positional relationship that is axially symmetric, is provided on the front portion of the lever shaft 52*a*. By maximally tilting the main-body support arm 50 left and right, the front portion of the lever shaft 52*a* makes contact with the respective tilt-stopper bolts 4*c*. By manually rotating the maximum-tilt-angle changing lever 52 about the axis of the lever shaft 52*a*, the region (peripheral portion) of the lever shaft 52*a* that makes contact with the tilt-stopper bolts 4*c* changes.

As shown in FIGS. 10 and 12, the main-body support arm 50 can be tilted in the left-right direction to angles A, at which the lever shaft 52*a* makes contact with either the left or right tilt-stopper bolt 4*c*. When one of the tilt-stopper bolts 4*c* contacts a portion of the lever shaft 52*a* that is arcuate in cross section, the cutting tool 11 can be tilted to a maximum of, for example, 45° in the left-right direction. On the other hand, when one of the tilt-stopper bolts 4*c* contacts the width-across-flats part 52*b* of the lever shaft 52, the cutting tool 11 can be tilted to a maximum of, for example, 46° in the left-right direction. By tilting the cutting tool 11 left and right, a so-called bevel cut can be made on the workpiece placed on the turntable 4.

Figure 14:
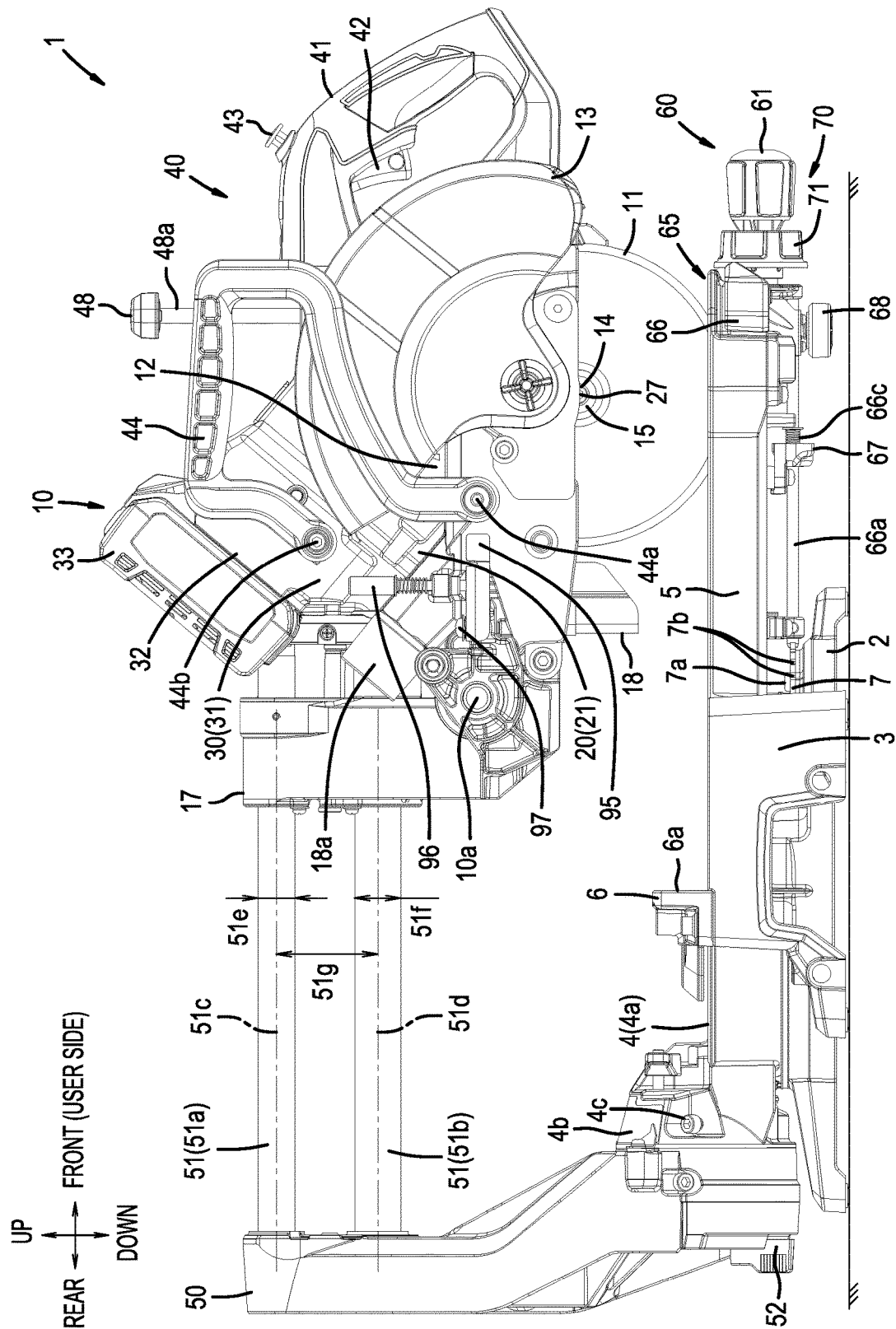
FIG. 14 is a left view of the sliding cutting machine in the state in which the cutting-machine main body is located at the bottom dead center and a movable cover has been moved upward.

As shown in FIGS. 3 and 14, the cutting tool 11 is mounted on the cutting-machine main body 10 in a rotatable manner such that the cutting plane extends along the front-rear direction when the turntable 4 is positioned at the miter angle of 0°. The cutting-machine main body 10 has, rearward of the cutting tool 11, an up-down swing pivot 10*a*, whose axial direction extends in the left-right direction. The cutting-machine main body 10 is configured/adapted to swing (pivot) in the up-down direction relative to the slide base 17 about the up-down swing pivot 10*a*. By tilting (pivoting) the cutting-machine main body 10 downward toward the turntable 4, the cutting tool 11 can cut into the workpiece placed on the turntable 4. With regard to the pivotal range (swing angle) of the cutting-machine main body 10 in the up-down direction, if the bottom dead center (lower pivot limit) is set to 0°, then the top dead center (upper pivot limit) is 40°. In other words, the cutting-machine main body 10 is capable of swinging (pivoting) over an angular range of 40°.

As shown in FIGS. 2, 3 and 14, the cutting-machine main body 10 comprises a fixed cover 12 and a movable cover 13. The fixed cover 12 covers an upper-side half circumference range of the cutting tool 11 from both the left and right sides and outward in the radial direction. An outline arrow 12*a*, which indicates the rotational direction of the cutting tool 11, is displayed on a left-side portion (shell) of the fixed cover 12. The movable cover 13 is capable of covering a lower-side half circumferential range of the cutting tool 11. The movable cover 13 rotates in conjunction with up and down swinging (pivoting) movement of the cutting-machine main body 10, thereby opening (exposing) and closing (covering) the lower-side half circumference of the cutting tool 11. More specifically, when the cutting-machine main body 10 is swung (pivoted) upward, the movable cover 13 rotates in the closed-position direction (clockwise direction in FIG. 3). Thereby, the lower-side half circumference range of the cutting tool 11 is covered. On the other hand, when the cutting-machine main body 10 is swung (pivoted) downward, the movable cover 13 rotates in the open-position direction (counterclockwise direction in FIG. 14). Thereby, the lower-side half circumference range of the cutting tool 11 is exposed, and the workpiece placed on the turntable 4 can be cut.

Figure 7:
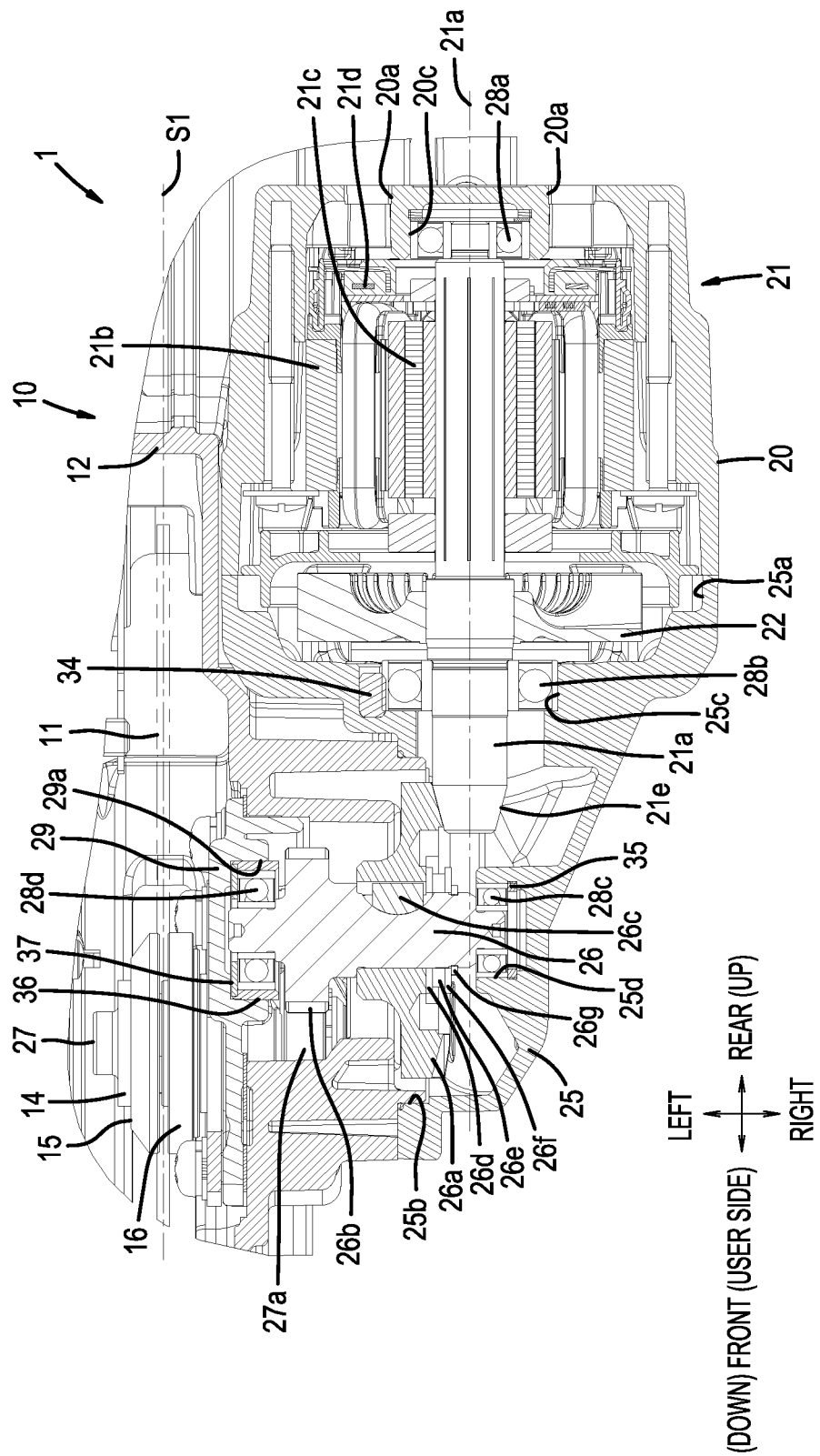
FIG. 7 is a cross-sectional auxiliary view taken along line VII-VII in FIG. 4 and is a transverse, cross-sectional view of the cutting-machine main body.

As shown in FIG. 7, the cutting tool 11 is fixedly (but removably) mounted on an output shaft 27, which extends in the left-right direction and is supported in a rotatable manner by the cutting-machine main body 10. The cutting tool 11 is mounted on the output shaft 27 by tightening a fixing screw 14 while the center of rotation of the cutting tool 11 is sandwiched by an outer flange 15 and an inner flange 16.

As shown in FIG. 2, a dust-collecting guide (dust guide) 18 is provided on the lower side of a rear portion of the fixed cover 12. The dust-collecting guide 18 extends generally in the up-down direction and the front-rear direction and has a wall shape that in plan view substantially has a C shape that is open forward. The dust-collecting guide 18 reduces the amount chips, sawdust, etc., which are generated by the cutting of the workpiece, that is scattered rearward of the cutting tool 11 and to both the left and right sides. An upper portion of the dust-collecting guide 18 communicates with a dust-discharge port 18*a*, which extends rearward from a rear portion of the cutting-machine main body 10. By connecting a dust-collecting hose (dust-extraction hose), which is connected to a dust collector (dust extractor/vacuum), to the dust-discharge port 18*a*, chips, etc., that scatter around the dust-collecting guide 18 can be transmitted (suctioned) to the dust collector.

As shown in FIGS. 6 and 19, a bottom-dead-center stopper 19 is provided on a right-side portion of the cutting-machine main body 10. The bottom-dead-center stopper 19 comprises a protruding part 19*a*, which is mounted on a right-side surface of the fixed cover 12 and protrudes rightward, and a bolt (adjusting screw) 19*b*, which passes through the protruding part 19*a* in the up-down direction. A through hole, in which a female thread is formed in the up-down direction, is provided on the protruding part 19*a*. The bolt 19*b* is screwed into that through hole with an attitude in which a screw point of the bolt 19*b* is downward and a screw head of the bolt 19*b* is upward. A synthetic resin that impedes loosening of the bolt 19*b* is preferably applied to a screw thread of the bolt 19*b*. By changing the screw-in location (depth) of the bolt 19*b*, the height of the screw point of the bolt 19*b* changes. The screw-in location (depth) of the bolt 19*b* is changed by inserting a hexagonal-rod spanner (hex (Allen) wrench) into a hexagonal hole of a head portion and then rotating the hexagonal-rod spanner. Thereby, the location of the bottom dead center (lower pivot limit) of the cutting-machine main body 10 can be finely adjusted. The bottom-dead-center stopper 19 is located between the side surface of the cutting tool 11 and the slide bars 51 in the left-right direction. A bottom-dead-center-stopper contact part 17*a*, which makes contact with the screw point of the bolt 19*b* of the bottom-dead-center stopper 19 when the cutting-machine main body 10 is lowered to the bottom dead center, is provided on the front surface of the slide base 17.

As shown in FIGS. 2, 10 and 14, a groove-depth adjustment screw (bolt) 96 is provided on the left side of a rear portion of the fixed cover 12. A release lever 95 is provided adjacent to the groove-depth adjustment screw 96. The release lever 95 is coupled to the slide base 17 so that it is tiltable in the left-right direction about the rear end of the release lever 95. The release lever 95 is tiltable, about a tilting spindle 97, between an initial position, at which the release lever 95 follows the fixed cover 12 and extends in the front-rear direction, and a released position, at which the front end of the release lever 95 is spaced apart leftward from the fixed cover 12. A recessed portion, into which the lower end of the groove-depth adjustment screw 96 can enter, is provided in the upper surface of the release lever 95. The lower end of the groove-depth adjustment screw 96 can enter the recessed portion from above while the release lever 95 is located at the initial position. Consequently, while the release lever 95 is located at the initial position, the cutting-machine main body 10 can descend to the bottom dead center at which the lower end of the groove-depth adjustment screw 96 enters the recessed portion and at which the bottom-dead-center stopper 19 makes contact with the bottom-dead-center-stopper contact part 17*a*. On the other hand, while the release lever 95 is located at the released position, the lower end of the groove-depth adjustment screw 96 makes contact with the upper surface of the release lever 95 and cannot enter the recessed portion of the release lever 95. Consequently, while the release lever 95 is located at the released position, the bottom dead center of the cutting-machine main body 10 is set to a location that is higher than the bottom dead center set by the bottom-dead-center stopper 19 (i.e., to a location at which the lower end of the cutting tool 11 becomes upward of the table upper surface 4*a*). The groove-depth adjustment screw 96 has a male-thread shape extending in the up-down direction. The groove-depth adjustment screw 96 is coupled via a screw structure to the fixed cover 12 such that the groove-depth adjustment screw 96 is movable in the up-down direction. By manually rotating the groove-depth adjustment screw 96, the height of the lower end of the groove-depth adjustment screw 96 relative to the fixed cover 12 moves up or down depending on the direction of rotation. For example, a knurl may be formed on the head portion of the groove-depth adjustment screw 96. In addition, no synthetic resin for impeding loosening of the screw 96 is applied to the male-thread portion of the groove-depth adjustment screw 96. Consequently, the groove-depth adjustment screw 96 can be manually rotated by hand, i.e. without the need for a tool. However, a hexagonal hole also may be formed in an end surface of the head portion of the groove-depth adjustment screw 96. In this case, it is also possible to rotate the screw 96 using a hexagonal-socket spanner (hex (Allen) wrench).

As shown in FIGS. 6 and 19, the bottom-dead-center-stopper contact part 17*a* is planar and is provided on an upper surface of a projecting portion that protrudes forward from the front surface of the slide base 17. Thus, the bottom-dead-center-stopper contact part 17*a* prevents the cutting-machine main body 10 from descending downward of (past) the bottom dead center (lower pivot limit). Furthermore, a top-dead-center stopper 23 is provided on a lower portion of a right-side surface of the fixed cover 12, which is downward of the bottom-dead-center stopper 19. The top-dead-center stopper 23 is formed as a sleeve that is made of rubber and is screw fastened to the fixed cover 12. A top-dead-center-stopper contact part 17*b* is provided in a plane and is provided on a lower surface of the above-mentioned projecting portion. When the top-dead-center stopper 23 contacts the top-dead-center-stopper contact part 17*b*, the cutting-machine main body 10 is positioned at its top dead center (upper pivot limit).

As shown in FIG. 6, a center 19*c* of the bottom-dead-center stopper 19, which protrudes in the up-down direction, is located rightward of the cutting tool 11 and is located leftward of the slide bars 51 when the cutting tool 11 is vertical and the cutting-machine main body 10 is located at its top dead center. The center 19*c* is preferably disposed at a location that is 30%-70% of the distance, with the cutting tool 11 as the starting point, from the cutting tool 11 rightward in the surface-normal direction of the cutting tool 11 to the center 51*c* of the first bar 51*a* (or the center 51*d* of the second bar 51*b*), for example, at a location that is 42% of the aforementioned distance. The distance (minimum distance) from the first virtual plane S1 to the center 19*c* is, for example, 48 mm. In an embodiment in which the distance (minimum distance) from the first virtual plane S1 to the second virtual plane S2 is 115 mm, 48 mm/115 mm=42%.

Figure 4:
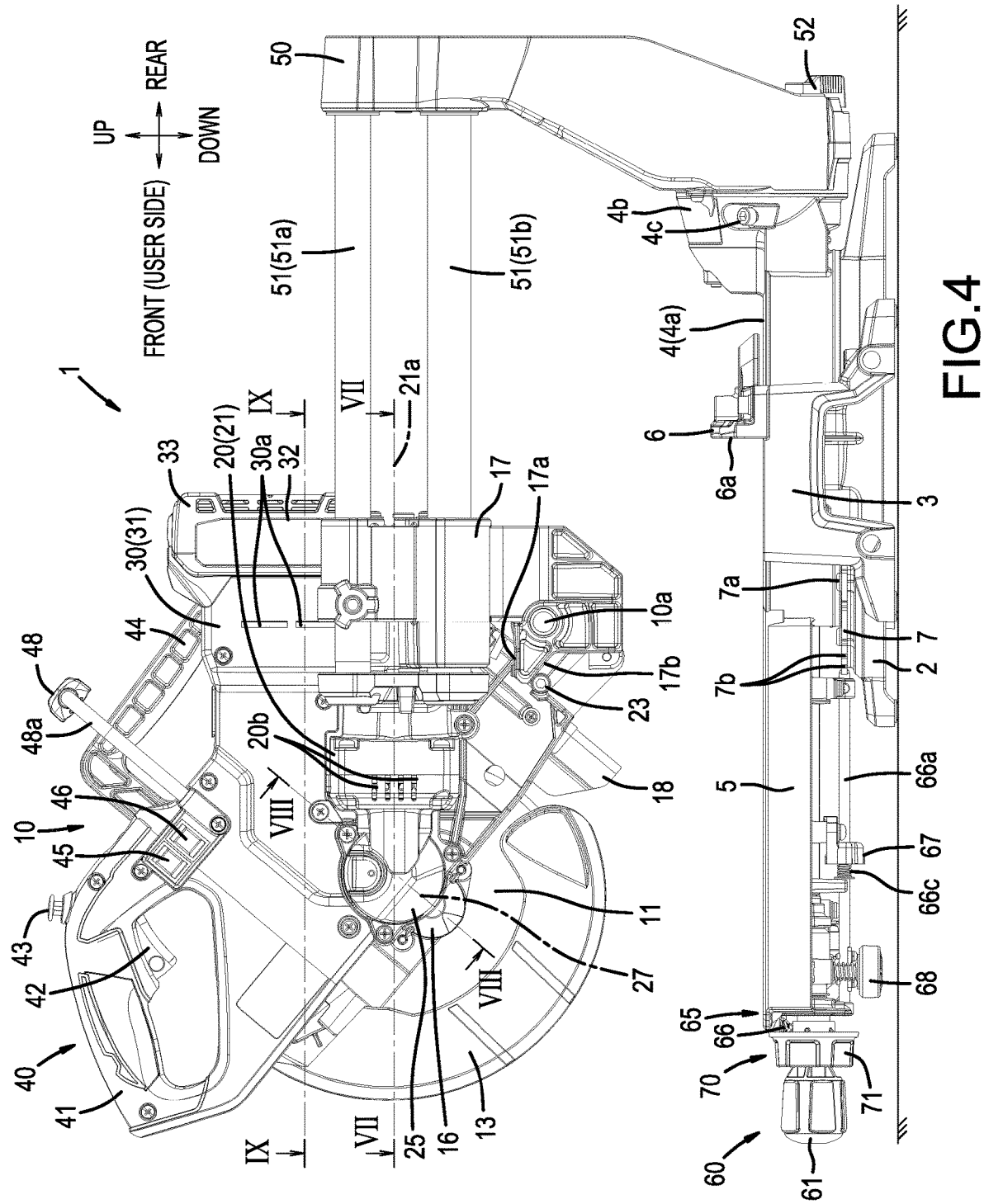
FIG. 4 is a right view of the sliding cutting machine in the state in which the cutting-machine main body is located at the top dead center.

As shown in FIGS. 4 and 5, the cutting-machine main body 10 comprises a motor housing 20 that is rightward of the fixed cover 12 and the movable cover 13 and is leftward of the slide bars 51. The motor housing 20 has a substantially circular-cylinder shape extending in the front-rear direction. The motor housing 20 houses an electric motor 21. The up-down location of the electric motor 21 is a location at which it overlaps the second bar 51*b*, in side view, when the cutting-machine main body 10 is located at its bottom dead center and the cutting tool 11 is vertical (refer to FIG. 13). The electric motor 21 is housed such that a motor shaft 21*a* extends along the longitudinal direction of the motor housing 20, which has a substantially circular-cylinder shape.

As shown in FIG. 7, the motor shaft 21*a* extends parallel to the side surface of the cutting tool 11. Viewed from the extension direction of the cutting tool 11 and from the radial direction of the motor shaft 21*a*, the angle formed by the motor shaft 21*a* relative to the side surface of the cutting tool 11 preferably is −10° to 0° to 10° (with respect to parallel (0°) to the cutting tool, the angle of the motor shaft 21*a* on an opposite side to the drive-side bevel gear 21 is indicated as being set to minus, when tilted leftward, or plus, when tilted rightward). As long as this angle is within the above-noted angular range, it suffices merely to modify the axial angles of the meshing bevel gears, and therefore a major change in the design concept, such as the addition of components, is unnecessary.

As shown in FIG. 4, the motor shaft 21*a* preferably tilts within the range of −10° to 0° to 10° with respect to a horizontal line when the cutting tool 11 is vertical and the cutting-machine main body 10 is located at its top dead center (with respect to a horizontal line (0°), the angle of the motor shaft 21a on an opposite side to the gear is indicated as being set to minus, when tilted downward, or plus, when tilted upward). The motor shaft 21a according to the present embodiment is parallel to a horizontal line when the cutting-machine main body 10 is located at the top dead center. At the top dead center, the entirety of the motor shaft 21a is disposed downward of the central axis of the first bar 51a of the slide bar 51 and upward of the central axis of the second bar 51b. In addition, the entirety of the motor shaft 21a is disposed downward of the lower end of the first bar 51a of the slide bar 51 and is disposed upward of the upper end of the second bar 51b. Thereby, the motor shaft 21a can be made more compact in the up-down direction.

As shown in FIG. 13, when the cutting-machine main body 10 is located at its bottom dead center, the motor shaft 21a tilts upward as the opposite-gear side goes rearward. The tilt angle thereof is 40° relative to a horizontal line. The motor shaft 21a tilts in a range of 30°-60° relative to the horizontal line and more preferably tilts in a range of 35°-45° when the cutting tool 11 is vertical and the cutting-machine main body 10 is located at the bottom dead center (its lowermost pivot limit). Thereby, this aspect of the design also enables the motor shaft 21a to be made more compact in the up-down direction.

As shown in FIG. 6, the motor shaft 21a, which is the center of the electric motor 21 (in particular, the rotational axis of the motor shaft 21a), is located rightward of the cutting tool 11 and is located leftward of the slide bars 51 when the cutting tool 11 is vertical and the cutting-machine main body 10 is located at its top dead center (its uppermost pivot limit). The motor shaft 21a is preferably disposed at a location that is 30%-50% of the distance from the cutting tool 11 to the center 51c of the first bar 51a (or the center 51d of the second bar 51b) rightward in the surface-normal direction of the cutting tool 11, with the cutting tool 11 as the starting point, and, for example, is disposed at a location that is 39% of the aforementioned distance. The distance (minimum distance) from the first virtual plane S1 to the motor shaft 21a is, for example, 45 mm. In an embodiment in which the distance from the first virtual plane S1 to the second virtual plane S2 is 115 mm, 45 mm/115 mm=39%.

In the electric motor 21 as shown, e.g., in FIG. 7, a DC brushless motor is used. The motor shaft 21a is supported such that it is rotatable about its axis with an attitude that extends along the longitudinal direction of the motor housing 20. A stator 21b of the electric motor 21 is supported in a non-rotatable manner on an inner-circumferential surface of the motor housing 20. A rotor 21c of the electric motor 21 is disposed in the interior of the stator 21b. The rotor 21c is connected to the motor shaft 21a and thus is rotatable together with the motor shaft 21a. The rotational angle of the rotor 21c is detected by a sensor board 21d, which is provided on an opposite-gear-side end portion of the inner-circumferential surface of the motor housing 20.

As shown in FIG. 7, air-intake ports 20a, which are configured to take in outside air, are provided on a rear surface (opposite-gear-side end surface) of the motor housing 20 in the extension direction of the motor shaft 21a. A fan 22 is mounted forward (on the gear side) of the electric motor 21 in the extension direction of the motor shaft 21a, such that the fan 22 is rotatable integrally with the motor shaft 21a. When the electric motor 21 is started and the fan 22 rotates, a cooling draft is introduced from the air-intake ports 20a into the motor housing 20. The introduced cooling draft flows forward toward the fan 22 in the extension direction of the motor shaft 21a. The cooling draft that flows in the axial direction of the fan 22 curves outward in the radial direction of the fan 22. As shown in FIG. 1, air-exhaust ports 20b, which are configured to discharge the cooling draft from the interior of the motor housing, are provided on a gear-side, right-side portion of the motor housing 20 in the motor-shaft direction of the motor housing 20. The cooling draft from the air-exhaust ports 20b, which are located outward in the radial direction of the fan 22, is discharged. Thus, the electric motor 21 is cooled by the cooling draft that flows through the interior of the motor housing 20.

As shown in FIG. 7, a gear housing 25 is coupled to a front portion of the motor housing 20 in the extension direction of the motor shaft 21a. The gear housing 25 is also coupled to a right-side surface of the fixed cover 12. A first opening 25a, which opens toward the opposite-gear side in the motor-shaft direction, is provided in the rear portion of the gear housing 25 in the extension direction of the motor shaft 21a. A second opening 25b, which opens leftward, is provided in the left-side portion of the gear housing 25. The first opening 25a and the second opening 25b communicate through (via) the interior of the gear housing 25. The first opening 25a is tightly fixed to the motor housing 20, e.g., in a bell-and-spigot joint structure or a faucet/spigot-joint structure. A mounting part of the motor housing 20 and a hole part 20c are the same component, and thereby their coaxiality is highly accurate. The first opening 25a and the mounting part of the motor housing 20 are both circular shapes and have circularity of high accuracy. The second opening 25b is tightly fixed to the fixed cover 12 in a bell-and-spigot joint structure or a faucet/spigot-joint structure. The second opening 25b and the mounting part of the fixed cover 12 both have circular shapes and have circularity of high accuracy.

As shown in FIG. 7, the gear housing 25 houses an intermediate shaft 26. The intermediate shaft 26 extends in a direction perpendicular (e.g., the left-right direction) to a side surface of the cutting tool 11 and is supported in the gear housing 25 in a rotatable manner about its axis. A speed-reduction gear 26b is formed, as an integral component, on the left side of the intermediate shaft 26. A follower-side bevel gear 26a is inserted, as a transition fitting, on the right side of the intermediate shaft 26 and is movable in the axial direction. The follower-side bevel gear 26a and the intermediate shaft 26 are rotationally locked by a key 26c. Furthermore, a first steel washer 26d, a rubber ring 26e, and a second steel washer 26f, are provided on the right side of the follower-side bevel gear 26a. A ring stop 26g is mounted on the rubber ring 26e, which is sandwiched by the first and second steel washers 26d, 26f, such that the ring stop 26g becomes sandwiched in the axial direction.

As shown in FIG. 7, a front portion (in the extension direction) of the motor shaft 21a passes through the first opening 25a and enters the interior of the gear housing 25. A drive-side bevel gear 21e is mounted, integrally with the motor shaft 21a, on the front portion of the motor shaft 21a. The drive-side bevel gear 21e meshes with the follower-side bevel gear 26a. The rotational power (speed) output by the motor shaft 21a is decelerated and transmitted, via the meshing of the drive-side bevel gear 21e and the follower-side bevel gear 26a, to the intermediate shaft 26, which extends in a substantially perpendicular direction to the motor shaft 21a.

As shown in FIG. 7, a first bearing 28a and a second bearing 28b are press fitted onto the motor shaft 21a. An inner ring of the first bearing 28a is press fitted onto a rear end in the extension direction of the motor shaft 21a, and an outer ring of the first bearing 28a is press fitted into the hole part 20c of the inner-side rear end of the motor housing 20. The inner ring of the second bearing 28b is press fitted onto the front portion in the extension direction of the motor shaft 21a, and the outer ring of the second bearing 28b is press fitted into a hole part 25c of the gear housing 25. A rubber pin 34 is press fitted between the second bearing 28b and the hole part 25c. The rubber pin 34 dampens impacts, vibration, and the like.

As shown in FIG. 7, a third bearing 28c is press fitted onto the right end of the intermediate shaft 26, and a fourth bearing 28d is press fitted to the left end of the intermediate shaft 26. The outer ring of the third bearing 28c is press fitted into a hole part 25d of the gear housing 25. A urethane washer 35 is provided rightward in the axial direction of the third bearing 28c. The outer ring of the fourth bearing 28d is press fitted into a hole part 29a of a bearing box 29 via a component in which a rubber ring 36 and a steel washer 37 are integrated. The urethane washer 35 and the rubber ring 36 dampen impacts, vibration, and the like. Because the second bearing 28b and the third bearing 28c are respectively positioned by the hole parts 25c, 25d provided within the gear housing 25, the locations of the motor shaft 21a and the intermediate shaft 26 can be made highly accurate. For this reason as well, the meshing between the drive-side bevel gear 21e and the follower-side bevel gear 26a also can be made highly accurate.

Figure 8:
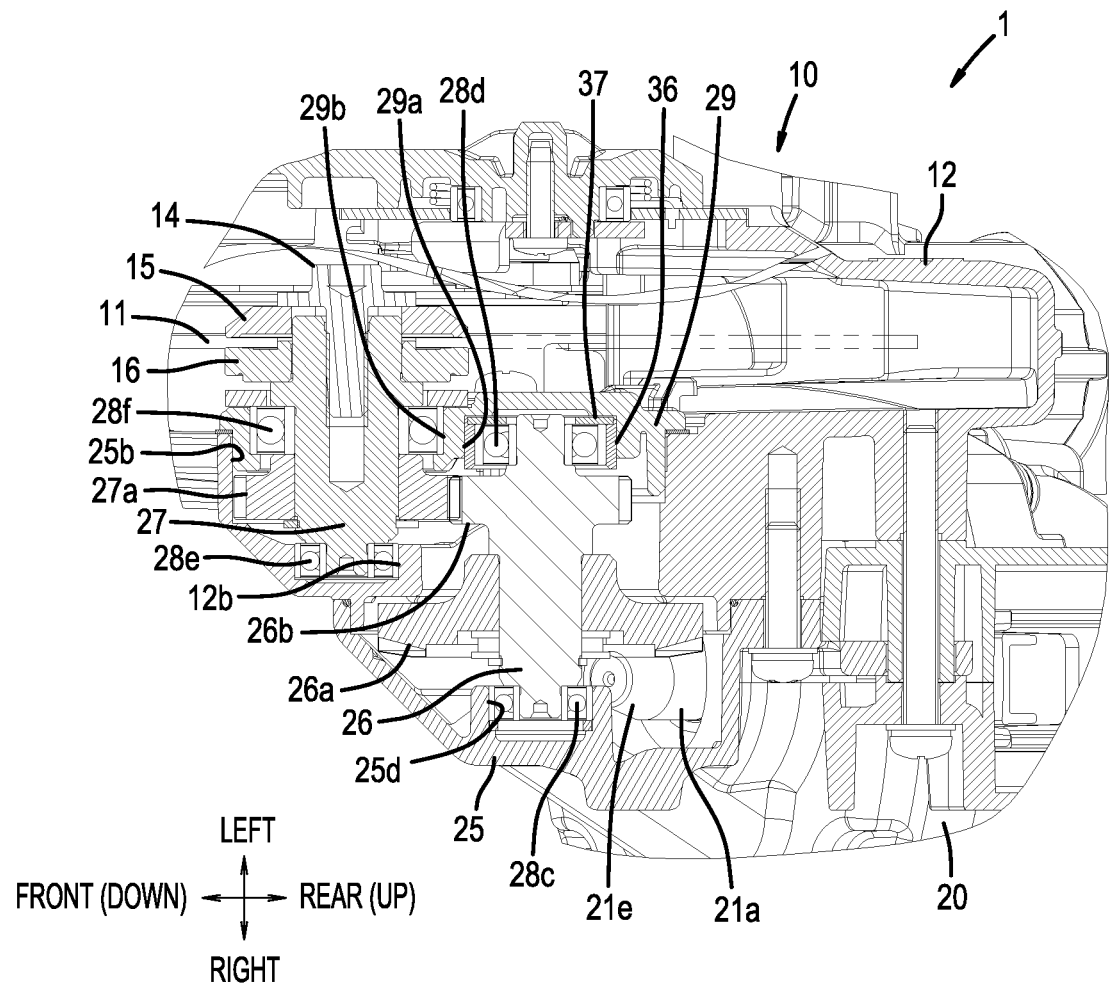
FIG. 8 is a cross-sectional auxiliary view taken along line VIII-VIII in FIG. 4 and is a cross-sectional view of the cutting-machine main body.

As shown in FIGS. 7 and 8, a fifth bearing 28e is provided on the right side of the output shaft 27, and an outer ring of the fifth bearing 28e is press fitted into a hole part 12b of the fixed cover 12. A sixth bearing 28f is provided on the left side of the output shaft 27, and an outer ring of the sixth bearing 28f is press fitted into a hole part 29b of the bearing box 29. The output shaft 27 is disposed downward of the intermediate shaft 26 with an attitude that is parallel to the intermediate shaft 26. On the right end of the output shaft 27, a speed-reduction gear 27a, which is a separate component, is mounted by being press fitted with the output shaft 27. The speed-reduction gear 26b and the speed-reduction gear 27a mesh with one another. The rotational power (speed) output by the intermediate shaft 26 is decelerated and transmitted to the output shaft 27 via the meshing of the speed-reduction gear 26b and the speed-reduction gear 27a. The intermediate shaft 26 and the output shaft 27 are disposed along the power-transmission path from the motor shaft 21a to the cutting tool 11 and correspond to a power-transmission shaft according to the present disclosure. Thus, the rotational power (speed) output by the motor shaft 21a is decelerated and transmitted to the output shaft 27, and thereby the cutting tool 11 rotates.

Figure 9:
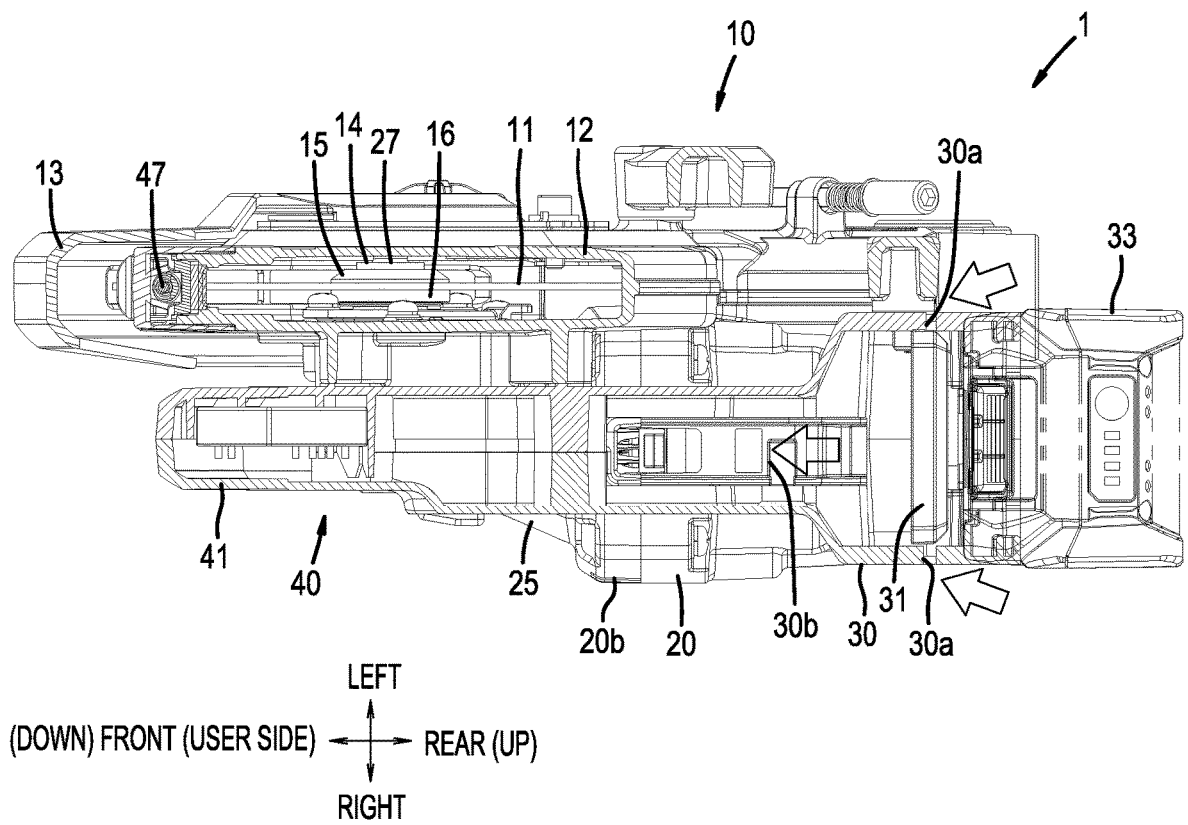
FIG. 9 is a cross-sectional auxiliary view taken along line IX-IX in FIG. 4 and is a transverse, cross-sectional view of the cutting-machine main body.

As shown in FIGS. 1 and 9, a rectangular-box-shaped controller housing 30 is coupled to a rear portion of the motor housing 20. A controller 31 is provided in the controller housing 30. The controller 31 has a case, which is a shallow, substantially rectangular parallelepiped, and a control board, which is housed within the case and is resin molded. The controller 31 is housed in the controller housing 30 with an attitude such that its longitudinal direction extends along the up-down direction and thickness direction (direction in which the shortest side of the case extends) extends along the front-rear direction. The controller 31 includes, in principle, a control circuit for controlling the operation of the electric (brushless) motor 21, a drive circuit, an auto-stop circuit, and other related components. The control circuit comprises a microcontroller (CPU, memory, etc.) that transmits control signals to the drive circuit for energizing the electric motor 21 based on rotational position information concerning the rotor of the electric motor 21. The drive circuit has a plurality of FETs that switch electric currents from the battery 33 to the electric motor 21 based on the control signals received from the control circuit. If conditions indicating a possible over-discharged state or a possible excessive current state of the battery 33 are detected, the auto-stop circuit cuts off the supply of electric power to the electric motor 21 such that an over-discharged state or an excessive current state does not occur.

As shown in FIGS. 1 and 9, air-intake ports 30a, which are configured/adapted to take in outside air, are provided in left- and right-side portions of the controller housing 30. The interior of the controller housing 30 communicates with the interior of the motor housing 20 via a communication opening 30b. The communication opening 30b is disposed forward of the air-intake ports 30a and the controller 31 and forward of the air-intake ports 20a in the extension direction of the motor shaft 21a. When the electric motor 21 is started and the fan 22 (refer to FIG. 7) rotates, negative pressure arises around the communication opening 30b owing to the cooling draft that flows in the interior of the motor housing 20. Thereby, as indicated by an outlined arrow in FIG. 9, in the interior of the controller housing 30 as well, a cooling draft flows in from the air-intake ports 30a and toward the communication opening 30b. Thus, the controller 31 is cooled using the cooling draft generated by the rotation of the fan 22.

As shown in FIGS. 4 and 5, the battery-mount part 32 is provided at a rear portion of the controller housing 30 at the top dead center. A mount surface of the battery-mount part 32 faces rearward and extends substantially perpendicular to the longitudinal direction of the motor housing 20. The battery (battery pack, battery cartridge) 33, which has a substantially rectangular-box shape, can be mounted on the battery-mount part 32 by being slid from above to below. In addition, the battery 33 can be removed from the battery-mount part 32 by sliding it from below to above; the battery 33 contains, for example, a plurality of lithium-ion battery cells having a total output voltage of 36 V or higher. The battery 33 can be repeatedly removed from the battery-mount part 32 and charged using a battery charger. The battery 33 can be used as a power supply with a variety of other cordless power tools driven by a rechargeable battery, such as a screwdriver, an electric drill, and the like.

As shown in FIGS. 1 and 6, the cutting-machine main body 10 comprises a handle part 40, which is rightward of the side surface of the cutting tool 11 and leftward of the slide bars 51 when the cutting tool 11 is vertical. A central plane of a manipulatable handle 41 in the left-right direction and a central plane of the battery-mount part 32 in the left-right direction are coplanar. In addition, the motor shaft 21a is located coplanar with the central plane of the manipulatable handle 41 in the left-right direction. The manipulatable handle 41, which has a loop shape that extends beside the side surface of the cutting tool 11, is provided on the front portion of the handle part 40. A switch lever 42 is provided on the inner-circumference side of the manipulatable handle 41. The user can pull the switch lever 42 with his/her finger while grasping the manipulatable handle 41. When the switch lever 42 is pulled, the electric motor 21 starts and the cutting tool 11 rotates. A lock-off button 43 is provided on an upper portion of the manipulatable handle 41. When the lock-off button 43 is pressed, it becomes possible to pull the switch lever 42 to energize the electric motor 21. Thereby, an unintentional starting of the electric motor 21 is avoided.

As shown in FIG. 6, the center 41a of the manipulatable handle 41 in the left-right direction is located rightward of the first virtual plane S1 when the cutting tool 11 is vertical and the cutting-machine main body 10 is located at its top dead center. In addition, the center 41a is located leftward of the slide bars 51 when the cutting tool 11 is vertical and the cutting-machine main body 10 is located at its top dead center. The center 41a is preferably disposed at a location that is 30%-70% of the distance (minimum distance) from the first virtual plane S1 to the center 51c of the first bar 51a (or the center 51d of the second bar 51b) rightward in the surface-normal direction of the first virtual plane S1, with the first virtual plane S1 as the starting point, and, for example, is disposed at a location that is 39% of the aforementioned distance. The distance (minimum distance) from the first virtual plane S1 to the center 41a is, for example, 45 mm. In an embodiment in which the distance (minimum distance) from the first virtual plane S1 to the second virtual plane S2 is 115 mm, 45 mm/115 mm=39%.

As shown in FIG. 1, switches 45, 46 are provided on the right-side portion of the handle part 40. By pressing the switch 45, the light from a laser-light device 47 (refer to FIG. 9), which is for aligning with a line marked on the workpiece, can be switched ON and OFF. The laser light is in the form of a colored (usually red) line on the to-be-cut surface and serves as an indicator when the cutting tool 11 is being aligned with the line marked on the workpiece. By pressing the switch 46, the illuminating light from an illumination device 48, which is provided upward of the cutting-machine main body 10, can be switched ON and OFF. The illumination device 48 is supported by an arm 48a, which extends from an upper portion of the handle part 40. The illuminating light from the illumination device 48 brightly illuminates the vicinity of the portion of the workpiece that is to be cut by the cutting tool 11.

As shown in FIG. 1, the handle part 40 can be installed such that a communication adapter 49 is inserted rearward of the manipulatable handle 41. The communication adapter 49 can communicate wirelessly with other accessory equipment. The start operation, the stop operation, and the like of the accessory equipment can be linked with the cutting machine 1 via wireless communication. For example, operation of a dust collector (dust extractor/vacuum), which is a separate device from the cutting machine 1, can be operatively linked with the cutting machine 1 via the communication adapter 49.

Figure 15:
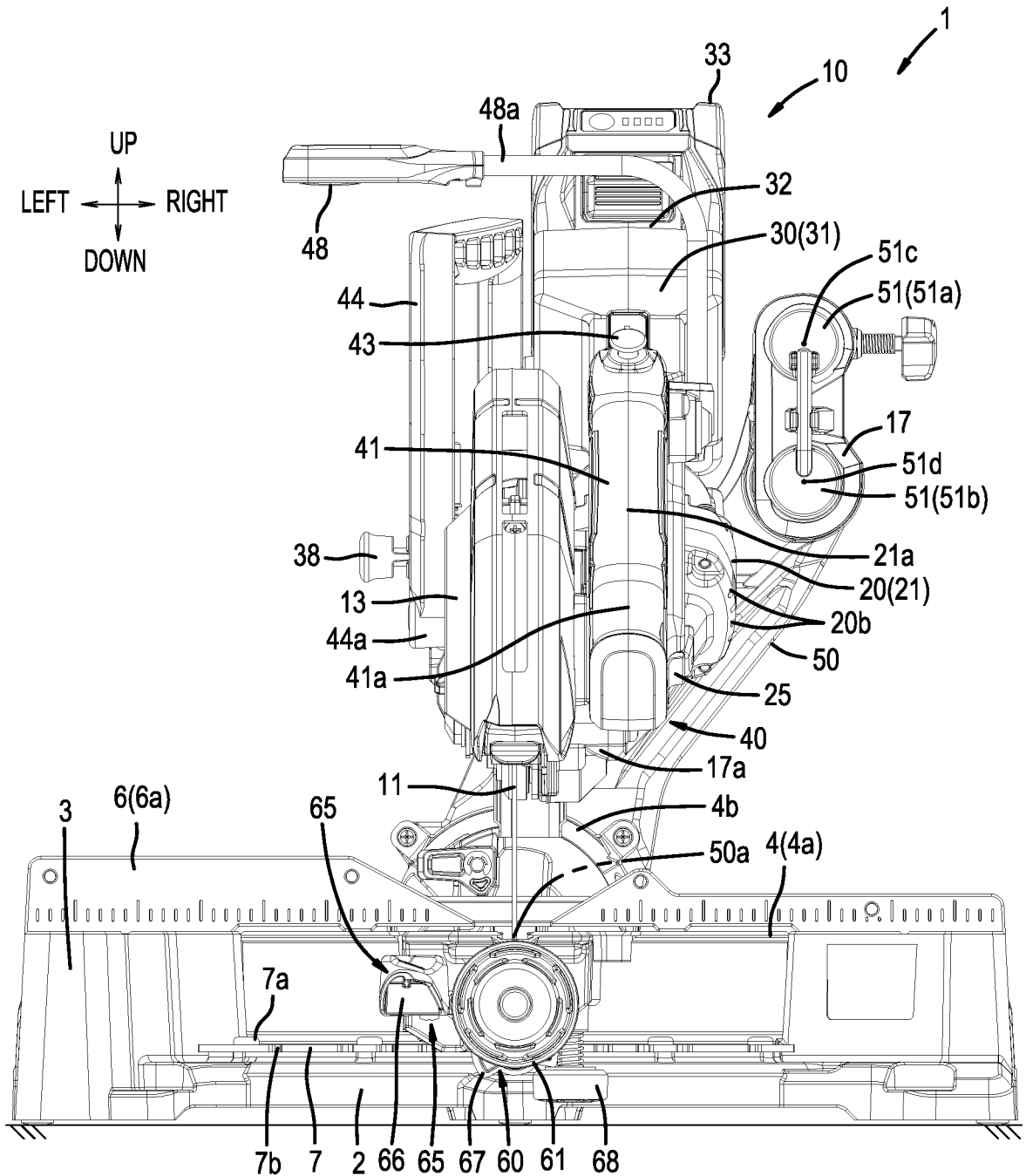
FIG. 15 is a front view of the sliding cutting machine in the state in which the cutting-machine main body is located at the bottom dead center.

As shown in FIGS. 2, 14 and 15, the handle part 40 comprises a carrying handle 44, which is rearward of the manipulatable handle 41. The carrying handle 44 comprises a first coupling part 44a on one end and a second coupling part 44b on the other end. The first coupling part 44a is coupled to a left-side portion of the fixed cover 12 and is disposed rearward of the region in which the movable cover 13 is movable. The second coupling part 44b is coupled to a left-side portion of the controller housing 30. The carrying handle 44 extends forward from the first coupling part 44a and faces a left side of the movable region of the movable cover 13. Furthermore, the carrying handle 44 extends such that it goes rightward as it extends rearward, spanning above the movable region of the movable cover 13, and is coupled to the second coupling part 44b. The carrying handle 44, together with the fixed cover 12, the motor housing 20, and the controller housing 30, forms a loop shape. The longitudinal direction of the carrying handle 44 extends substantially along the front-rear direction and substantially in the horizontal direction in the state in which the cutting-machine main body 10 has been moved to the bottom dead center.

As shown in FIGS. 5 and 15, a bottom-dead-center lock pin 38 is provided on a left-side surface of a front portion of the slide base 17. The bottom-dead-center lock pin 38 comprises a pin, which extends to in the left-right direction, and a manipulatable portion, which is provided on a left-end portion of the pin. A through hole, which extends in the left-right direction, is provided on the slide base 17. The pin of the bottom-dead-center lock pin 38 is inserted into that through hole and is movable in the left-right direction. A recessed portion is provided in the left-side surface of the fixed cover 12 along an extension line of the bottom-dead-center lock pin 38 in the state in which the cutting-machine main body 10 has been moved to the bottom dead center. By moving the bottom-dead-center lock pin 38 rightward while the cutting-machine main body 10 is at the bottom dead center, the bottom-dead-center lock pin 38 can be engaged with the recessed portion of the fixed cover 12. When the bottom-dead-center lock pin 38 is engaged with the recessed portion, the cutting-machine main body 10 is locked at the bottom dead center. While the cutting-machine main body 10 is locked at the bottom dead center, the user can carry the cutting machine 1 by grasping the carrying handle 44.

As shown in FIGS. 1 and 10, a turntable-fixing mechanism (miter angle setting mechanism) 60 is provided at a lower portion of the table-extension part 5. A grip (knob) 61 is provided at a front portion of the table-extension part 5. A circumferentially-extending portion of the grip 61 has a concave-convex (ridged) shape so that the user can easily grasp it and rotate it. In addition, the user can grasp the grip 61 to rotate (pivot) the turntable 4 in the horizontal direction about the turnable center relative to the base 2. A fixing rod 62 extends rearward of the interior of the table-extension part 5 from the grip 61. The fixing rod 62 is supported, by threaded engagement, in the interior of the table-extension part 5. The grip 61 is rotatable around its longitudinal axis such that the fixing rod 62 extending in the front-rear direction serves as an axial center. When the grip 61 is manually rotated and thus causes the fixing rod 62 to rotate about its axis, the fixing rod 62 displaces (moves forward or rearward depending on the direction of rotation of the grip 61) in the front-rear direction. By displacing the fixing rod 62 rearward and causing the rear end to engage with the base 2, the turntable 4 can be positioned at any arbitrary miter angle relative to the base 2. By displacing the fixing rod 62 forward, the positioning (fixing, latching) of the turntable 4 at the arbitrary miter angle can be released.

As shown in FIG. 10, the base 2 comprises a horizontal-plate part 2b, which extends in the horizontal direction. The horizontal-plate part 2b extends toward the rotary spindle 2a at a height substantially the same as the height of the miter-scale plate 7. A sandwiching member (locking member) 63 is provided rearward of the fixing rod 62. The sandwiching member 63 is substantially L-shaped, viewed from the left-right direction. The sandwiching member 63 comprises a rotary shaft 63a, which extends in the left-right direction in the vicinity of a substantially L-shaped folded (bent) portion. The sandwiching member 63 is supported by the table-extension part 5 such that it is rotatable (pivotable) about the rotary (pivot) shaft 63a. One end of the L shape of the sandwiching member 63 is configured to contact the rear end of the fixing rod 62. The other end of the L shape of the sandwiching member 63 comprises a sandwiching part 63b, which is configured to contact (and press against) a lower surface of the horizontal-plate part 2b.

When the fixing rod 62 shown in FIG. 10 is displaced rearward and makes contact with the sandwiching member 63, the sandwiching member 63 rotates (pivots) about the rotary shaft 63a. Thereby, the sandwiching part 63b is displaced upward and makes contact with the lower surface of the horizontal-plate part 2b and, together with the table-extension part 5, sandwiches the horizontal-plate part 2b. Thereby, the sandwiching member 63 of the table-extension part 5 becomes non-movable in the left-right direction relative to the horizontal-plate part 2b. As a result, the table-extension part 5 and the turntable 4 become rotationally locked (immovable) relative to the base 2. When the fixing rod 62 is displaced forward, the force that pushes the sandwiching member 63 rearward becomes small (or disappears). At this time, when the sandwiching member 63 rotates (pivots) about the rotary shaft 63a, the sandwiching part 63b displaces downward. When the sandwiching part 63b displaces downward, the sandwiching of the horizontal-plate part 2b by the sandwiching member 63 and the table-extension part 5 is released.

As shown in FIGS. 2 and 3, a positive-lock mechanism 65 is provided on a lower portion of the table-extension part 5. By using the positive-lock mechanism 65, the turntable 4 can be positioned at prescribed (predetermined) miter angles, which respectively correspond to the positioning recesses 7b provided in the miter-scale plate 7. The positive-lock mechanism 65 comprises a lock-release lever 66 and the positioning pin 66a. The lock-release lever 66 is provided on a left-side portion of a front portion of the table-extension part 5. The positioning pin 66a is provided on a lower portion of the table-extension part 5 and extends in the front-rear direction along the longitudinal direction of the positioning pin 66a. The positioning pin 66a is provided at substantially the same height as the height of the miter-scale plate 7. The rear end of the positioning pin 66a is configured/adapted to enter and engage any one of the positioning recesses 7b by being displaced rearward. In addition, the rear end of the positioning pin 66a is configured/adapted to retract and disengage from the positioning recesses 7b by being displaced forward.

A front portion of the positioning pin 66a shown in FIGS. 3, 10 is coupled to the lock-release lever 66. An engaging pin 66b, which extends orthogonal to the extension direction of the positioning pin 66a, is provided on a substantially center portion of the positioning pin 66a in the front-rear direction. The engaging pin 66b makes contact with a pin-support part 67, which is provided integrally with the table-extension part 5. A lead surface (not shown), which extends helically in the front-rear direction, is provided in the interior of the pin-support part 67. The engaging pin 66b makes contact with the lead surface, and thereby rearward displacement is restricted. The positioning pin 66a is biased rearward by a compression spring 66c.

Referring FIGS. 3 and 10, when the lock-release lever 66 is pressed downward, the positioning pin 66a is rotated about its axis and the engaging pin 66b is displaced forward along the lead surface in the interior of the pin-support part 67. Consequently, the positioning pin 66a displaces forward against the biasing force of the compression spring 66c. The rear end of the positioning pin 66a, which has displaced forward, is disengaged from the positioning recesses 7b. Consequently, when the positioning (fixing, locking) of the turntable 4 is released by manually rotating the grip 61, the turntable 4 can be rotated (pivoted) freely about the turntable center in the left-right direction. When the lock-release lever 66 is pulled upward, the positioning pin 66a is rotated about its axis and the engaging pin 66b is displaced rearward along the lead surface in the interior of the pin-support part 67. The positioning pin 66a is displaced rearward by the biasing force of the compression spring 66c. The rear end of the positioning pin 66a makes contact with the outer-circumferential edge of the miter-scale plate 7. When the grip 61 is grasped and the turntable 4 is manually pivoted about the turntable center in the left or right direction, the positioning pin 66a enters one of the positioning recesses 7b, which are provided on the outer-circumferential edge of the miter-scale plate 7. Thus, the turntable 4 can be positioned (locked, fixed) at any of the locations of the prescribed miter angles, which correspond to the positioning recesses 7b.

Figure 11:
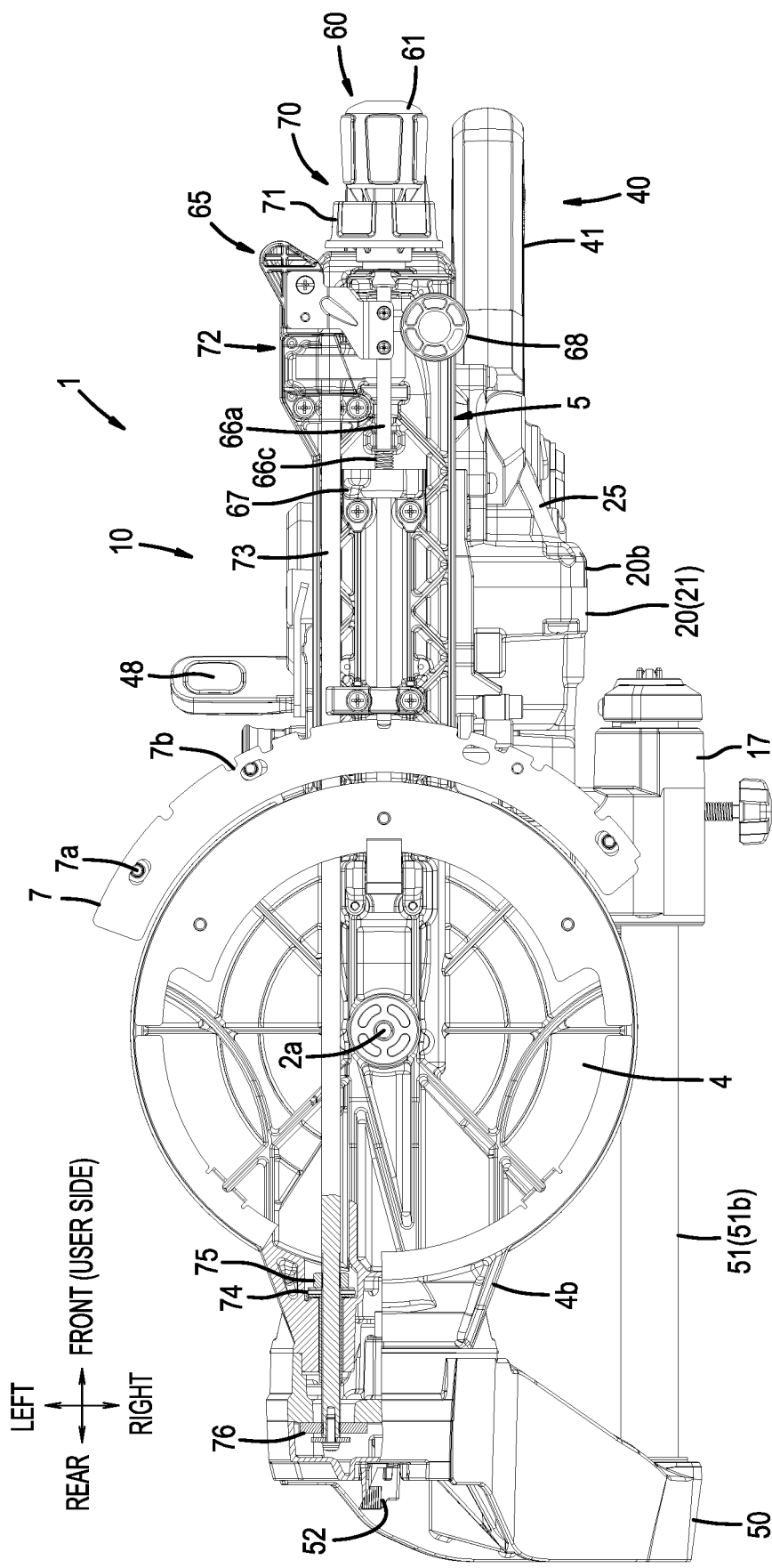
FIG. 11 is a bottom view that includes a partial, transverse, cross-sectional view of the sliding cutting machine, excluding a base.

As shown in FIG. 11, a tilt-fixing mechanism (bevel angle setting mechanism) 70, which positions and holds the main-body support arm 50 such that it is tiltable in the left-right direction, is provided on a front portion of the table-extension part 5. The tilt-fixing mechanism 70 comprises a tilt-fixing manipulatable part (rotatable collar) 71 and a transmission shaft 73. The tilt-fixing manipulatable part 71 is provided between the grip 61 and the front end of the table-extension part 5. The tilt-fixing manipulatable part 71 can be rotated about its longitudinal axis that extends in the front-rear direction. A circumferentially-extending portion of the tilt-fixing manipulatable part 71 has a concave-convex (ridged) shape whose pattern differs from the pattern of the concave-convex shape of the grip 61 so that the user can easily distinguish between the two, in order to selectively grasp and rotate the tilt-fixing manipulatable part 71. That is, when the user has grasped the tilt-fixing manipulatable part 71, the user can tactilely distinguish between the tilt-fixing manipulatable part 71 and the grip 61, thereby reducing the likelihood of unintended or inappropriate manipulation of the wrong part.

As shown in FIG. 11, the transmission shaft 73 extends in the front-rear direction along the longitudinal direction of the table-extension part 5. The transmission shaft 73 extends to the lower portion of the main-body support arm 50. The front portion of the transmission shaft 73 is coupled to the tilt-fixing manipulatable part 71 by a speed-reduction-gear part 72. The rotational power (speed) output by the tilt-fixing manipulatable part 71 is decelerated by the speed-reduction-gear part 72 and causes the transmission shaft 73 to rotate about its longitudinal axis. A thrust-needle bearing 74 and a receiving part 75 are mounted on a rear portion of the transmission shaft 73. The receiving part 75 is fixed to the transmission shaft 73 forward of the thrust-needle bearing 74. A nut 76 is mounted on the rear end of the transmission shaft 73. The nut 76 restricts rotation of the transmission shaft 73 about its axis relative to the main-body support arm 50. The thrust-needle bearing 74, the receiving part 75, and the nut 76 are arranged in the state in which they are sandwiched by the arm-support part 4b and the main-body support arm 50 in the front-rear direction.

By rotating the transmission shaft 73, which is shown in FIG. 11, about its longitudinal axis, the rear end of the transmission shaft 73 and the nut 76 are tightened. Thereby, the main-body support arm 50 and the arm-support part 4b are pressed towards one another in the front-rear direction by the axial force generated between the thrust-needle bearing 74 on one side and the receiving part 75 and the nut 76 on the other side. Thus, the main-body support arm 50 is positioned at a prescribed left-right tilt (bevel) angle relative to the arm-support part 4b. When the transmission shaft 73 is rotated in the reverse direction, the tightening of the nut 76 relative to the transmission shaft 73 loosens. Thereby, the axial force between the thrust-needle bearing 74 on the one side and the receiving part 75 and the nut 76 on the other side is released. Consequently, the main-body support arm 50 becomes tiltable to the left and right about the axis of the left-right tilting pivot 50a (refer to FIG. 10) relative to the arm-support part 4b.

Figure 16:
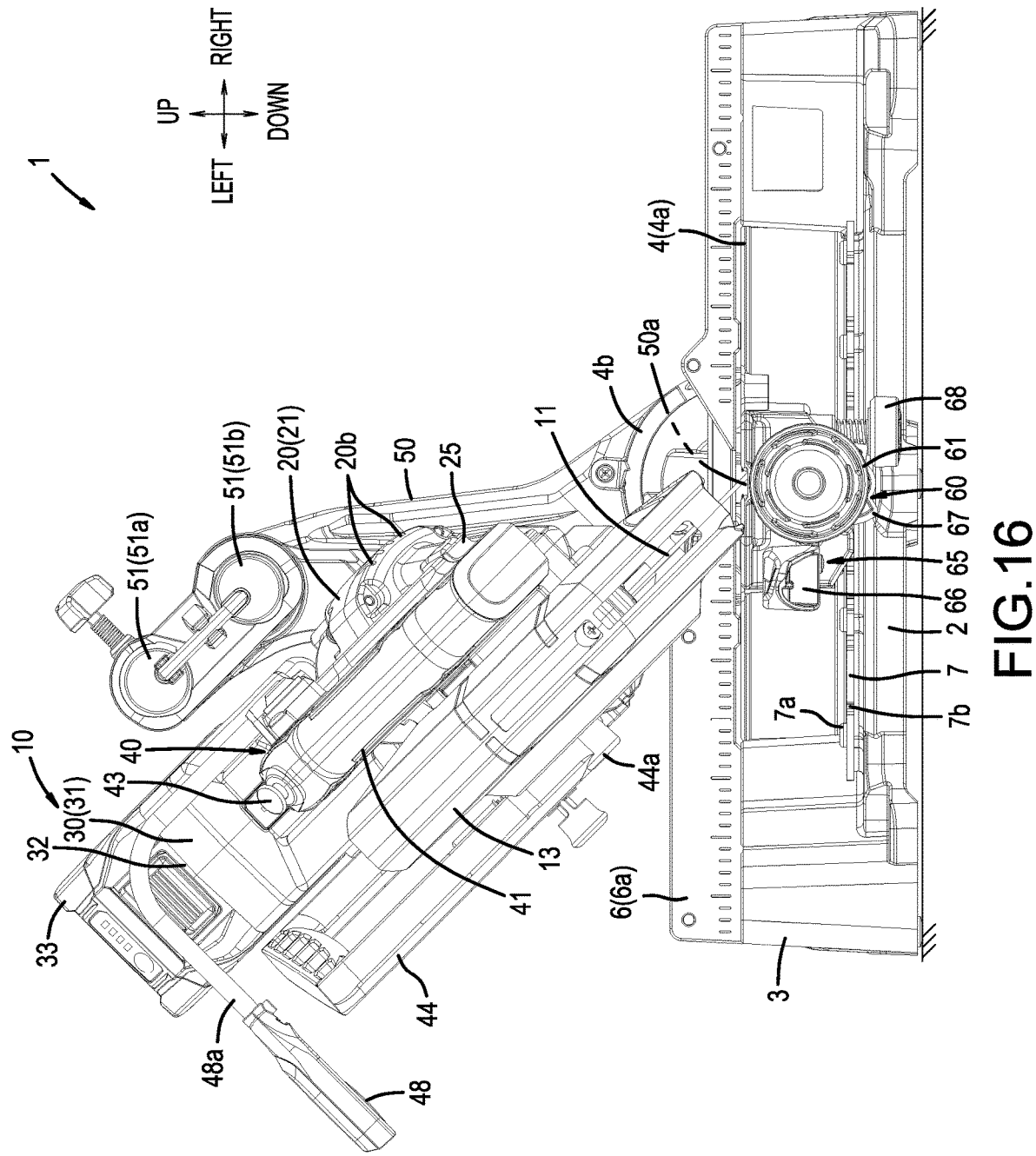
FIG. 16 is a front view of the sliding cutting machine in the state in which the cutting-machine main body has been tilted leftward.

As shown in FIG. 16, when the cutting-machine main body 10 is tilted leftward, no portion protrudes leftward of the cutting tool 11 or around a lower-side portion of the cutting tool 11 (in FIG. 16, the movable cover 13 is located around the lower side of the cutting tool 11, but in actuality is moved upward). Consequently, the cutting-machine main body 10, other than the cutting tool 11, does not contact the workpiece, and therefore even a large bevel angle cut can be performed without interference of the cutting-machine main body 10.

Figure 17:
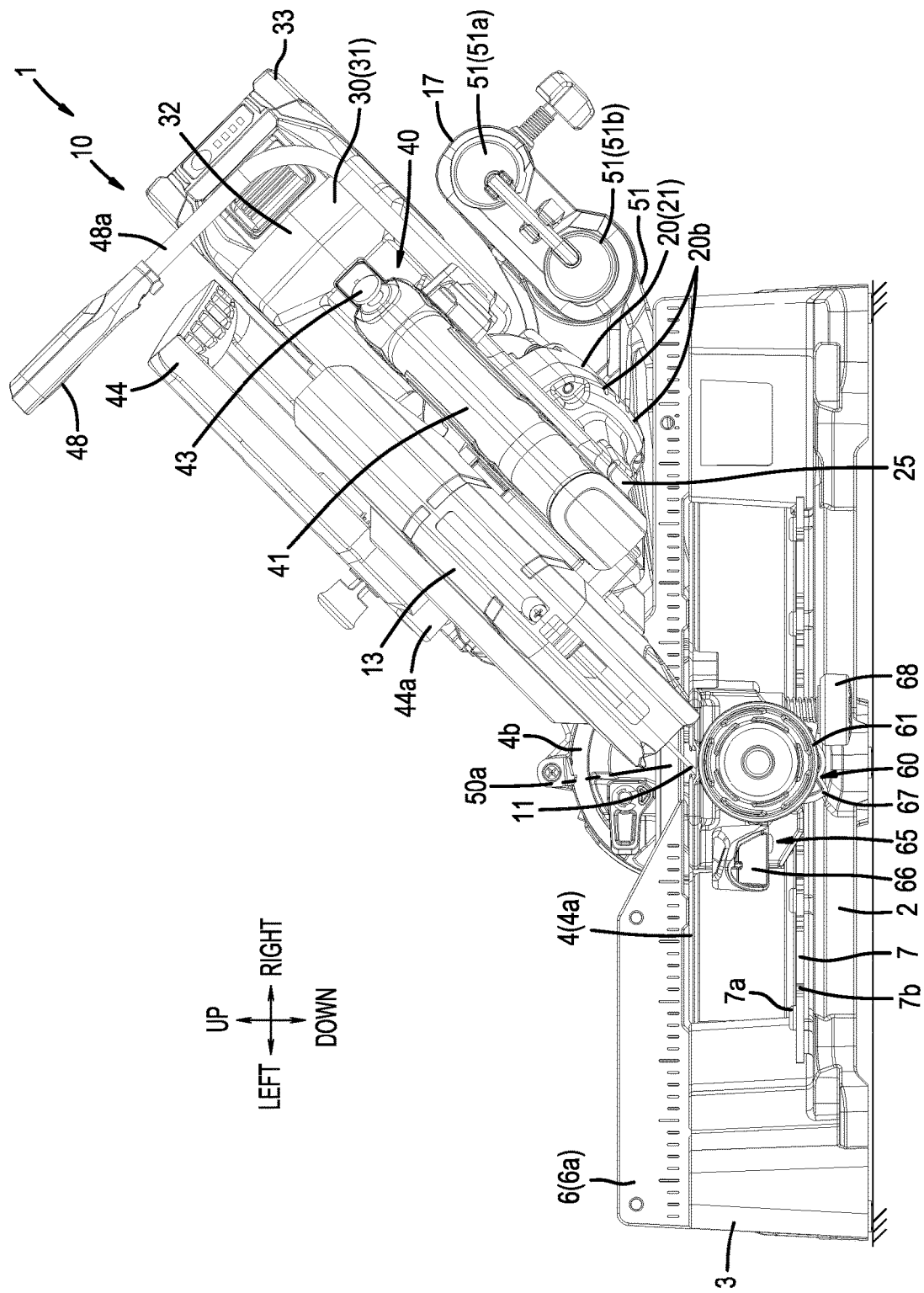
FIG. 17 is a front view of the sliding cutting machine in the state in which the cutting-machine main body has been tilted rightward.
Figure 18:
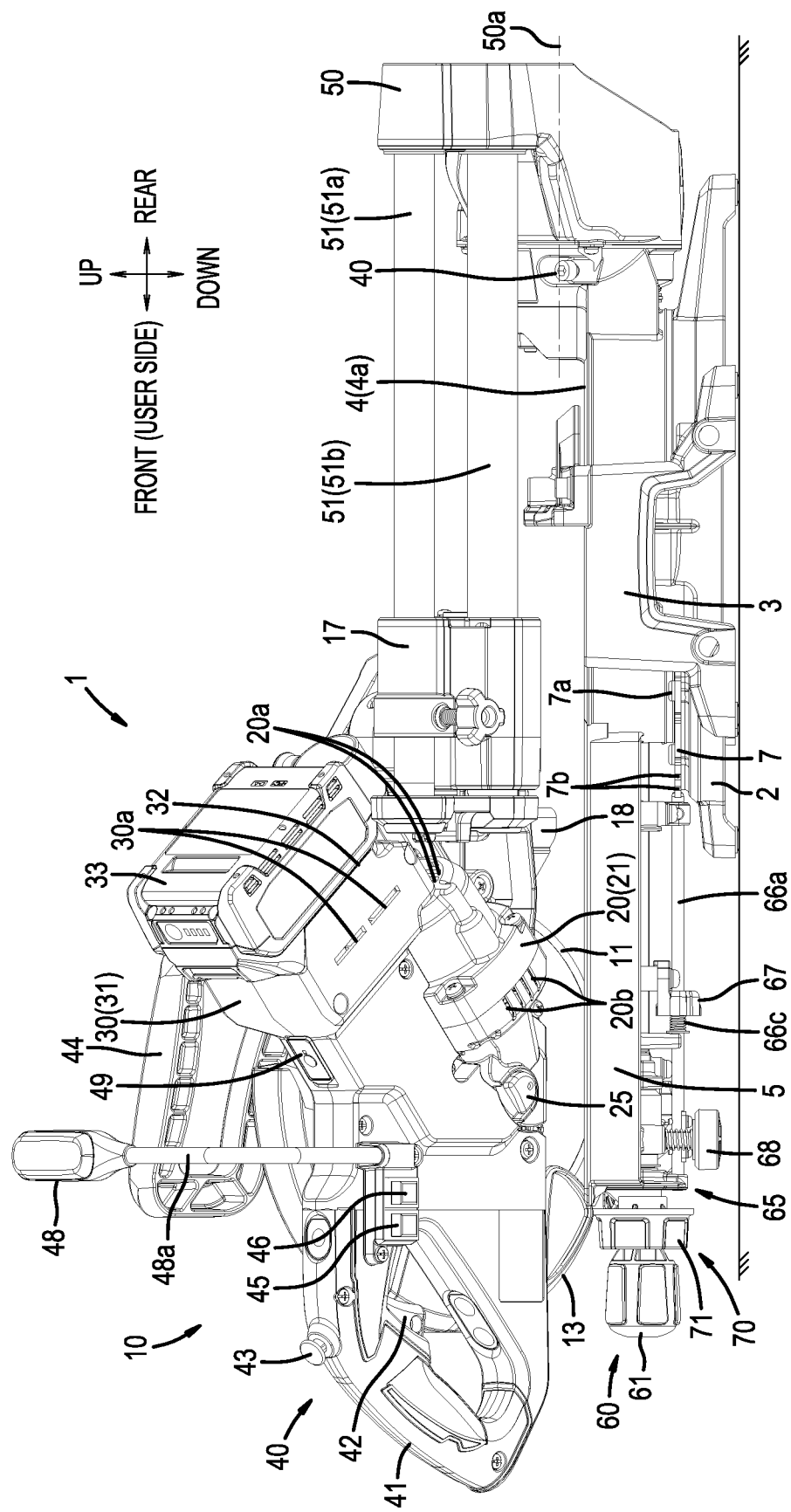
FIG. 18 is a right view of the sliding cutting machine in the state in which the cutting-machine main body has been tilted rightward.

As shown in FIGS. 17 and 18, when the cutting-machine main body 10 is tilted rightward, the motor housing 20, the gear housing 25, the controller housing 30, the handle part 40, the slide bar 51, etc. are located upward of the positioning fence 6. In other words, when the cutting-machine main body 10 is tilted rightward, no portion of the cutting-machine main body 10 protrudes rightward of the cutting tool 11 or around the lower-side portion of the cutting tool 11. Consequently, the cutting-machine main body 10, other than the cutting tool 11, does not contact the workpiece, and therefore a bevel cut can be performed without interference of the cutting-machine main body 10.

As shown in FIGS. 5 and 6, the cutting machine 1 as described above comprises: the slide bar(s) 51, which is (are) elongated and extend(s) in the front-rear direction (when the miter angle is set to 0°); the slide base 17, which is mounted on the slide bar(s) 51 and moves along the slide bar(s) 51; and the cutting-machine main body 10, which is mounted on the slide base 17 so that it is movable in the up-down direction relative to the slide base 17. The cutting-machine main body 10 comprises: the output shaft 27, which extends in the axial direction orthogonal to the extension direction of the slide bar(s) 51 and whereon the cutting tool 11 is mounted; and the electric motor 21, which is located between the cutting tool 11 and the slide bar(s) 51, as viewed from the front, in the state in which the output shaft 27 is caused to rotate and the cutting tool 11 is vertical.

Accordingly, the slide bar(s) 51 and the electric motor 21 are disposed on the right-side-surface side of the cutting tool 11. Consequently, the cutting machine 1 can be provided such that no structural element protrudes on the left-side-surface side of the cutting tool 11. Thereby, the visibility of the cutting location of the cutting tool 11 on the left-side-surface side of the cutting tool 11 can be improved.

As shown in FIG. 7, the electric motor 21 comprises the motor shaft 21a. The motor shaft 21a is parallel to a side surface of the cutting tool 11 or is tilted (inclined) by 10° or less relative to the side surface of the cutting tool 11, as viewed from the radial direction of the motor shaft 21a, in the state in which the cutting tool 11 is vertical. Accordingly, the motor shaft 21a can be disposed with an attitude that extends beside (e.g., in parallel or substantially in parallel to) the side surface of the cutting tool 11. Consequently, the electric motor 21 can be disposed in close proximity to the cutting tool 11. Thereby, the cutting tool 11 and the electric motor 21 can be disposed compactly in the left-right direction. Thus, the cutting-machine main body 10 can be made compact in the left-right direction.

As shown in FIG. 6, the center of the electric motor 21 is disposed at a location that is 30%-50% of the distance from the cutting tool 11 to the slide bar(s) 51 in the surface-normal direction of the cutting tool 11, with the cutting tool 11 as the starting point. Accordingly, the center of the electric motor 21 is disposed closer to the cutting tool 11 than to the slide bar(s) 51. Consequently, the center of gravity of the cutting-machine main body 10 in the left-right direction can be brought into close proximity to the cutting tool 11. Thereby, when the cutting-machine main body 10 is lowered and the cutting tool 11 cuts into the workpiece, the twisting moment caused by the reaction force received by the cutting tool 11 from the workpiece and caused by the intrinsic weight of the cutting-machine main body 10 can be made smaller.

As shown in FIGS. 13, 15 and 19, the slide bars 51 comprise the bars 51a, 51b, which are provided in parallel in the up-down direction. Specifically, the central (longitudinal) axis of the first bar 51a and the central (longitudinal) axis of the second bar 51b are coplanar. The plane in which the first bar 51a and the second bar 51b extend is a vertical plane. The diameter of the second bar 51b is thicker than the diameter of the first bar 51a. The distance between the lower end of the first bar 51a and the upper end of the second bar 51b is greater than the diameter of the second bar 51b. At least the one second bar 51b of the bars 51a, 51b is located such that it overlaps the electric motor 21, as viewed in the axial direction, when the cutting-machine main body 10 is at the bottom dead center. The fan 22 and the air-exhaust ports 20b are located at a location that is lower than that of the upper end of the second bar 51b. Furthermore, the fan 22 and the air-exhaust ports 20b are located at a location that is lower than that of the lower end of the second bar 51b. The switch lever 42 is located at a location that is lower than the lower end of the first bar 51a. The portion of the carrying handle 44 that is grasped is located at a location that is higher than that of the upper end of the first bar 51a. Accordingly, when the cutting-machine main body 10 is at the bottom dead center, the electric motor 21 can be disposed at a low location. Thereby, the amount by which the electric motor 21 protrudes upward is curtailed. Thereby, the cutting machine 1 becomes compact. In addition, when the cutting-machine main body 10 is tilted in either the left direction or the right direction and a bevel cut is made into the workpiece, an upper portion of the electric motor 21 does not obstruct the user's visibility of the cutting location.

As shown in FIG. 13, the second bar 51b is located at the lowest location of the two bars 51a, 51b. Accordingly, the electric motor 21 can be disposed in the vicinity of the lowermost point at which the electric motor 21 can be disposed. Consequently, the amount by which the electric motor 21 protrudes upward can be curtailed to the minimum. Thereby, the cutting machine 1 can be provided suitably and compactly.

As shown in FIG. 13, the plurality of bars includes the first bar 51a, which is located most upward, and the second bar 51b, which is located most downward. When the diameter 51e of the first bar 51a is given as a [mm], the diameter 51f of the second bar 51b is given as b [mm], the center-to-center distance 51g between the first bar 51a and the second bar 51b is given as c [mm], and the diameter of the cutting tool 11 is given as d [mm], the relation $(a/2+b/2+c) \times 2 < d < (a/2+b/2+c) \times 3.5$ is satisfied. Accordingly, the plurality of bars 51a, 51b can be fit compactly within the range of a length that is shorter than half of the diameter of the cutting tool 11 in the up-down direction. Moreover, the distance in the up-down direction that includes all the bars 51a, 51b is larger than $2/7$ times the diameter of the cutting tool 11. Consequently, the bars 51a, 51b can be provided such that they have a sufficient strength to be capable of supporting the cutting-machine main body 10. Thus, both suitable compactness and sufficient support strength of the slide structure of the cutting-machine main body 10 can be achieved at the same time.

As shown in FIG. 13, when the workpiece is cut by the cutting tool 11, the cutting-machine main body 10 may be slid in the travel (horizontal) direction relative to the slide bar(s) 51. The electric motor 21 comprises the motor shaft 21*a*. When the cutting-machine main body 10 is located at the bottom dead center, the motor shaft 21*a* is oriented with a tilt angle that tilts (inclines) upward as it extends in the travel direction. When the cutting-machine main body 10 is located at the bottom dead center, the amount by which the electric motor 21 protrudes downward can be curtailed to the minimum. Thereby, the cutting machine 1 can be made compact in the up-down direction.

As shown in FIG. 13, the tilt angle of the motor shaft 21*a* is 30°-60° relative to a horizontal line when the cutting-machine main body 10 is located at the bottom dead center. Accordingly, the motor housing 20, which houses the electric motor 21, can be prevented from making contact with the workpiece. Consequently, the workpiece can be cut suitably using the compactly-designed cutting machine 1.

As shown in FIG. 4, when the cutting-machine main body 10 is located at the top dead center, the motor shaft 21*a* is parallel to a horizontal line or has a tilt angle of 10° or less relative to a horizontal line. Accordingly, the amount by which the electric motor 21 protrudes upward or downward can be curtailed. Thereby, when confirming the cutting location of the cutting tool 11, the user's visibility is not obstructed or blocked by the cutting-machine main body 10.

As shown in FIGS. 5 and 6, the cutting machine 1 comprises the manipulatable handle 41, which is grasped when moving the cutting-machine main body 10 relative to the slide bar 51. The center 41*a* of the manipulatable handle 41 is located either in the first virtual plane 51, which includes the cutting tool 11, or between the slide bar(s) 51 and the cutting tool 11, viewed from the front, when the cutting tool 11 is vertical. Furthermore, the central plane of the manipulatable handle 41 in the left-right direction and the central plane of the battery-mount part 32 in the left-right direction are coplanar. The motor shaft 21*a* (refer to FIG. 4) is located coplanarly with the central plane of the manipulatable handle 41 in the left-right direction.

Accordingly, the slide bar(s) 51 and the center 41*a* of the manipulatable handle 41 can be brought into close proximity with one another in the left-right direction. Consequently, when the user grasps the manipulatable handle 41 to cause the cutting tool 11 to cut the workpiece, the twisting moment of the cutting-machine main body 10 relative to the slide bar 51 can be made smaller. Furthermore, the cutting tool 11 and the center 41*a* of the manipulatable handle 41 can be brought into close proximity with one another in the left-right direction. Consequently, when the user grasps the manipulatable handle 41 to cause the cutting tool 11 to cut the workpiece, the twisting moment caused by the reaction force received by the cutting tool 11 from the workpiece and caused by the manipulation force with which the manipulatable handle 41 is manipulated can be made smaller. It is noted that, using the center of the manipulatable handle 41 (the battery-mount part 32, the motor shaft 21*a*) as the starting point, the distance to the cutting tool 11 in the surface-normal direction of the cutting tool 11 preferably is shorter than the distance to the center 51*c* of the first bar 51*a* (or to the center 51*d* of the second bar 51*b*).

As shown in FIG. 6, the center 41*a* of the manipulatable handle 41 is disposed at a location that is 30%-70% of the distance from the cutting tool 11 to the slide bar(s) 51 in the surface-normal direction of the cutting tool 11, with the cutting tool 11 as the starting point. Accordingly, the center 41*a* of the manipulatable handle 41 is located at a location that is not spaced too far apart from both the cutting tool 11 and the slide bar 51. Consequently, the twisting moment of the cutting-machine main body 10 that acts between the cutting tool 11 and the manipulatable handle 41 can be made smaller. Moreover, flexure of the slide bar(s) 51 caused by the manipulation force with which the manipulatable handle 41 is manipulated can be reduced.

As shown in FIGS. 1 and 6, the cutting machine 1 comprises the bottom-dead-center stopper 19, which restricts (blocks) the cutting-machine main body 10 from moving downward of (past, beyond) the bottom dead center (lower pivot limit). The center 19*c* of the bottom-dead-center stopper 19 is located between the slide(s) bar 51 and the cutting tool 11, as viewed from the front, when the cutting tool 11 is vertical. Accordingly, the distance between the center 19*c* of the bottom-dead-center stopper 19 and the slide bar(s) 51 can be made shorter. When the cutting-machine main body 10 has descended to the bottom dead center, the bottom-dead-center stopper 19 receives a reaction force. Consequently, because the distance has been made shorter, the twisting moment of the cutting-machine main body 10 relative to the slide bar 51 caused by the reaction force can be made smaller.

As shown in FIG. 6, the center 19*c* of the bottom-dead-center stopper 19 is disposed at a location that is 30%-70% of the distance from the cutting tool 11 to the slide bar(s) 51 in the surface-normal direction of the cutting tool 11, with the cutting tool 11 as the starting point. Accordingly, the center 19*c* of the bottom-dead-center stopper 19 is located at a location at which it is not spaced too far apart from both the cutting tool 11 and the slide bar 51. Consequently, the reaction force received by the bottom-dead-center stopper 19 and the twisting moment of the cutting-machine main body 10 that acts against the slide bar 51 can be made smaller, and shaking of the cutting tool 11 caused by the twisting moment can be reduced.

As shown in FIGS. 2, 5 and 6, the cutting machine 1 comprises the manipulatable handle 41, which is grasped when moving the cutting-machine main body 10 relative to the slide bar(s) 51. The sliding cutting machine 1 comprises the movable cover 13, which covers a portion of the cutting tool 11 and is movable relative to the cutting-machine main body 10. The sliding cutting machine 1 comprises the carrying handle 44, which is grasped when carrying the sliding cutting machine 1 and is a structural element separate from the manipulatable handle 41. The carrying handle 44 spans and protrudes from the movable region (range, path) of the movable cover 13. Accordingly, the carrying handle 44 can be disposed compactly such that the visibility of the cutting location is not obstructed and can be disposed such that it does not hinder the operation (movement) of the movable cover 13.

As shown in FIGS. 7 and 8, the cutting machine 1 comprises the intermediate shaft 26 and the output shaft 27, which extend orthogonally to the motor shaft 21*a* of the electric motor 21 and are disposed in the power-transmission path from the motor shaft 21*a* to the cutting tool 11. The cutting machine 1 comprises: the gears (the drive-side bevel gear 21*e*, the follower-side bevel gear 26*a*, and the speed-reduction gears 26*b*, 27*a*), which are mounted on the motor shaft 21*a*, the intermediate shaft 26, and the output shaft 27; and the gear housing 25, which houses the gears. The gear housing 25 has: the first opening 25*a*, through which the motor shaft 21*a* passes; and the second opening 25*b*, which opens in a direction that intersects the opening direction of the first opening 25*a* and through which the intermediate shaft 26 passes. The gear housing 25 is configured as one integral component (i.e. a single component that does not have seams between respective portions thereof). Accordingly, the gear housing 25: houses at least a portion of the motor shaft 21a, at least a portion of the intermediate shaft 26, and the gears, which protrude in directions that differ from one another; and is formed compactly. Thereby, the cutting-machine main body 10 can be made more compact in the left-right direction and the front-rear direction. In addition, because the gear housing 25 is configured as one integral component, the strength of the gear housing 25 can be increased.

As shown in FIGS. 7 and 8, the gear housing 25 supports one set of gears, which couples the motor shaft 21a and the intermediate shaft 26; the one set of gears includes the drive-side bevel gear 21e and the follower-side bevel gear 26a. Accordingly, power can be transmitted by the drive-side bevel gear 21e and the follower-side bevel gear 26a, which are one set, from the motor shaft 21a, which extends along the front-rear direction, to the intermediate shaft 26, which extends along the left-right direction. Consequently, the gear housing 25, which supports the drive-side bevel gear 21e and the follower-side bevel gear 26a as one set, can be formed compactly in the left-right direction and the front-rear direction.

The cutting machine 1, as shown in FIG. 13, comprises the controller 31, which controls the output (rotational speed) of the electric motor 21. The controller 31 is located upward of the electric motor 21 when the cutting-machine main body 10 is located at the bottom dead center. Accordingly, the controller 31 can be disposed such that the cutting-machine main body 10 is more compact in the left-right direction. Furthermore, the amount by which the controller 31 protrudes downward can be reduced. Consequently, the controller housing 30, which houses the controller 31, does not contact the workpiece when the cutting-machine main body 10 is located at the bottom dead center.

The cutting machine 1, as shown in FIG. 13, comprises the controller 31, which controls the output of the electric motor 21. The controller 31 overlaps the electric motor 21 in the left-right direction when the cutting-machine main body 10 is located at the bottom dead center. Accordingly, the controller 31 and the electric motor 21 can be disposed compactly in the left-right direction.

The cutting machine 1, as shown in FIGS. 7,9, comprises: the fan 22, which is rotated by the electric motor 21 and generates a draft that cools the electric motor 21; and the controller 31, which controls the output of the electric motor 21. The controller 31 is cooled by using the draft generated by the fan 22. Accordingly, both the electric motor 21 and the controller 31 can be efficiently cooled using the fan 22.

A sliding cutting machine 80 (e.g., a benchtop cutting machine or sliding compound miter saw) according to a second embodiment of the present disclosure will now be explained, with reference to FIGS. 21-23. Instead of the controller housing 30 of the cutting machine 1 according to the first embodiment shown in FIG. 1, the cutting machine 80 comprises a controller housing 81, which has a rectangular-box shape whose longitudinal direction is in the left-right direction. In the explanation below, only the details of structural elements that differ from those in the first embodiment will be explained. It is noted that the carrying handle 44 is omitted in FIGS. 21-23 for the sake of clarity of the explanation.

Figure 21:
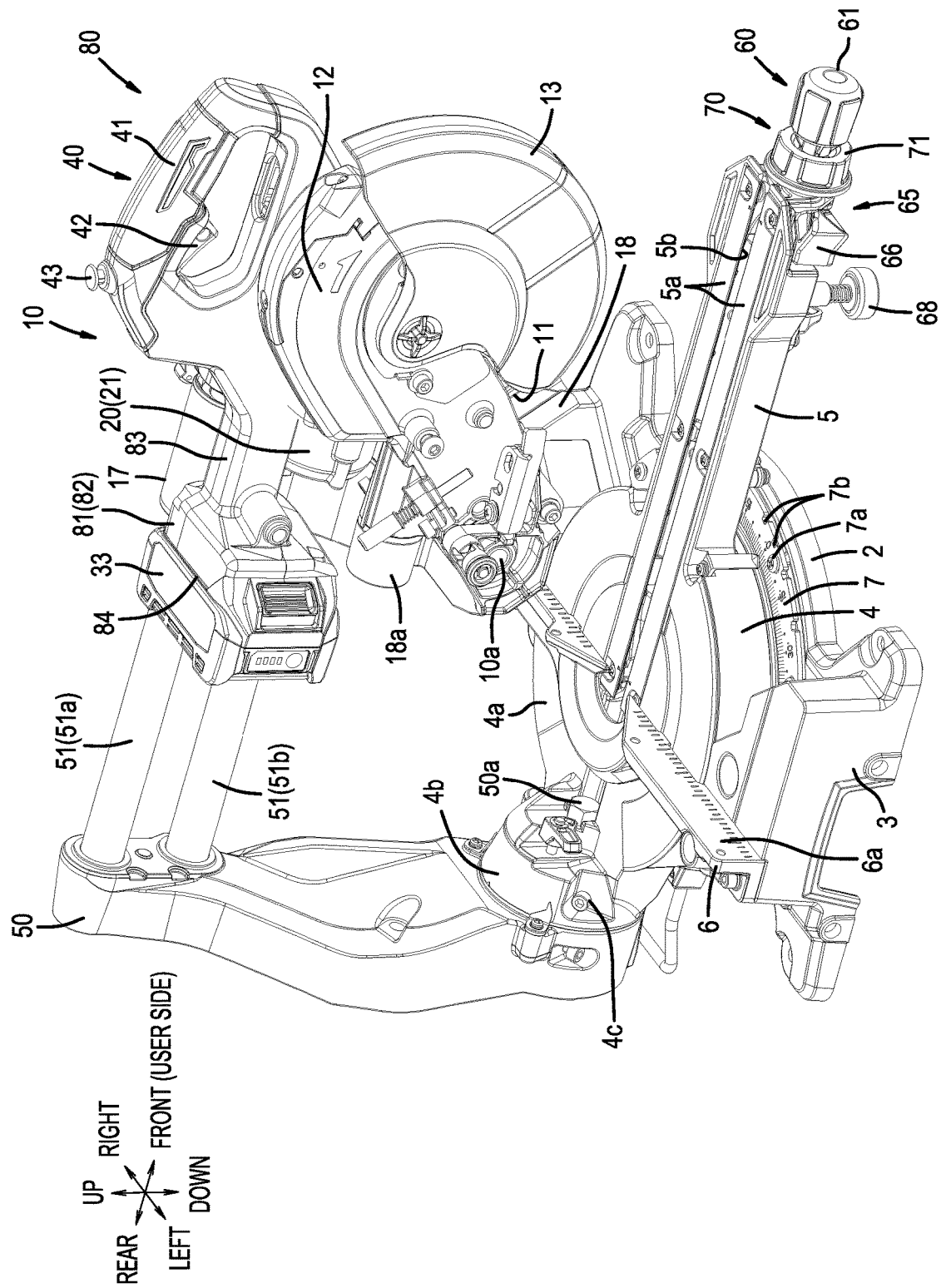
FIG. 21 is an overall oblique view, viewed from the left, of the sliding cutting machine according to a second embodiment of the present disclosure.
Figure 22:
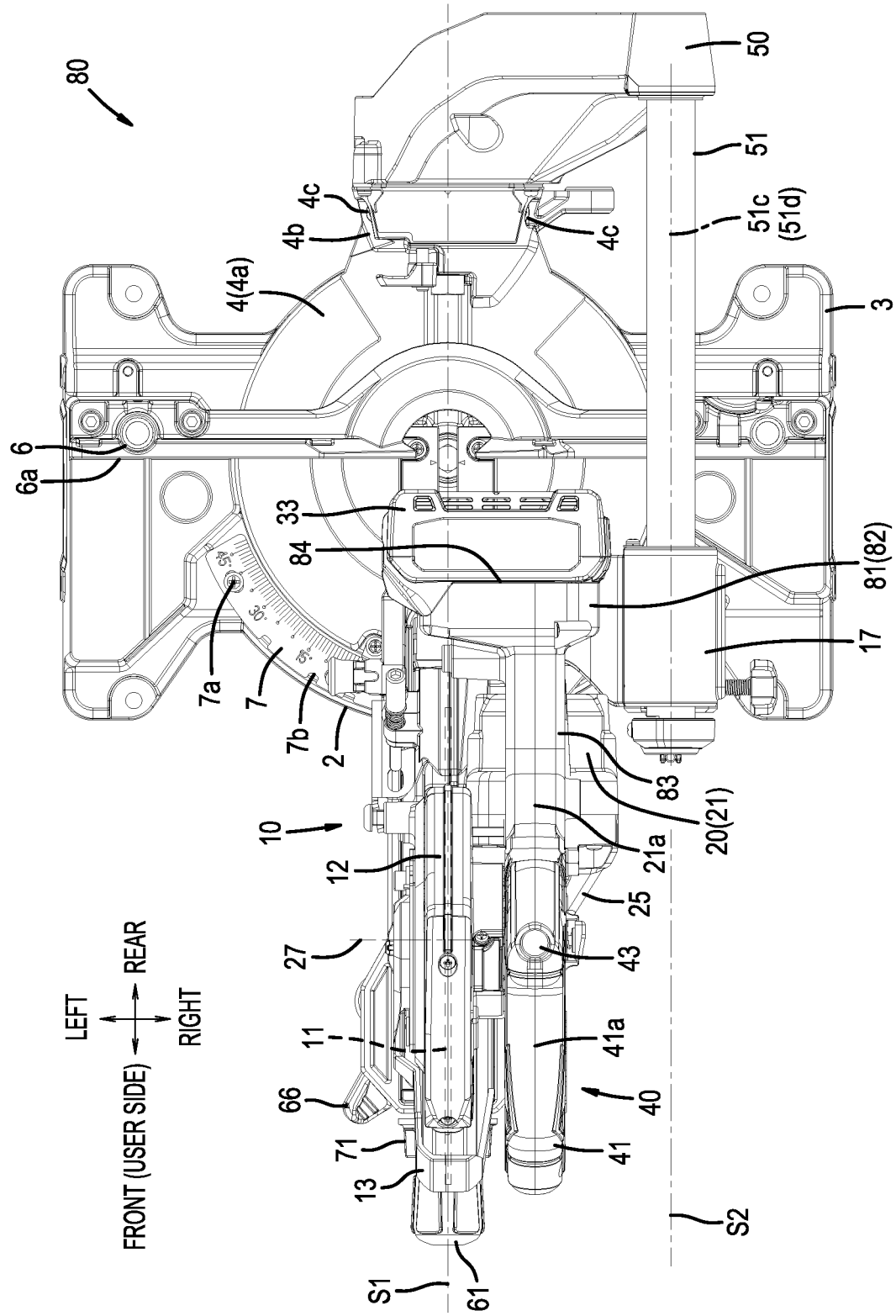
FIG. 22 is a plan view of the sliding cutting machine in the state in which the cutting-machine main body is located at the top dead center.
Figure 23:
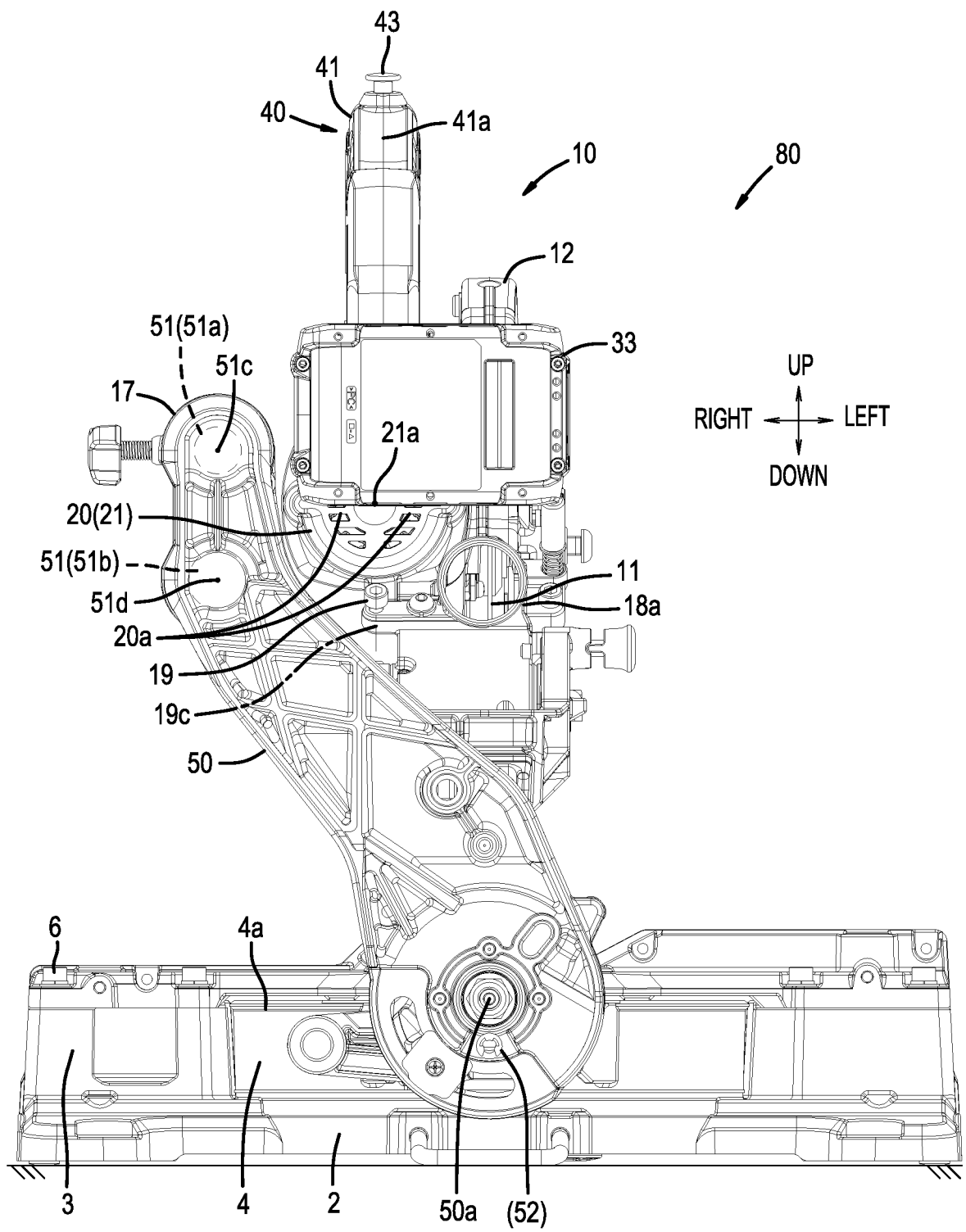
FIG. 23 is a rear view of the sliding cutting machine in the state in which the cutting-machine main body is located at the top dead center.

A controller 82, which is provided in the same manner as the controller 31 (refer to FIG. 10), is housed in the controller housing 81, which is shown in FIGS. 21 and 22. The controller 82 is housed in the controller housing 81 with an attitude such that the longitudinal direction of a case, which is substantially a shallow rectangular parallelepiped, extends along the left-right direction and such that the thickness direction (the direction in which the shortest side of the case extends) extends along the front-rear direction. The controller housing 81 is coupled to the motor housing 20 in the front-rear direction via a bridging part 83, which has a rectangular-column shape extending in the front-rear direction. The interior of the bridging part 83 is hollow and provides fluid communication between the controller housing 81 and the motor housing 20. At least one air-intake port, which is not shown, is provided on a side surface of the controller housing 81. When the electric motor 21 is started and the fan 22 (refer to FIG. 7) rotates, negative pressure arises, owing to the cooling draft that flows through the interior of the motor housing 20, in the portion in which the bridging part 83 and the motor housing 20 communicate. Thereby, the cooling draft flows from the air-intake port(s) of the controller housing 81 toward the interior of the controller housing 81 and the interior of the bridging part 83. Thus, the controller 82, which is housed in the controller housing 81, is cooled.

As shown in FIGS. 21 and 22, a battery-mount part 84 is provided on a rear portion of the controller housing 81. The mount surface of the battery-mount part 84 faces rearward. The battery 33, which substantially is a rectangular-box shape, can be mounted on the battery-mount part 84 by being slid from the left toward the right (toward the slide bar 51 side). In addition, the battery 33 can be removed from the battery-mount part 84 by sliding it from the right toward the left. As shown in FIG. 23, the main-body support arm 50 has a shape that the support arm 50 is inclined rightward as it extends upward, when the cutting tool 11 is vertical, so that the support arm 50 does not make contact with (block) the battery 33, which is mounted on the cutting-machine main body 10 or the battery-mount part 84 (refer to FIG. 21), when the cutting-machine main body 10 is moved rearward.

A sliding cutting machine 90 (e.g., a benchtop cutting machine or sliding compound miter saw) according to a third embodiment of the present disclosure will now be explained, with reference to FIGS. 24-28. The cutting machine 90 comprises a cutting-machine main body 91 instead of the cutting-machine main body 10 of the cutting machine 1 according to the first embodiment shown in FIG. 1. In the explanation below, only the details of structural elements that differ from those of the first embodiment will be explained. It is noted that the cutting-machine main body 91 is capable of sliding up and down about an up-down swing pivot 91a, and FIGS. 24-28 show the state in which the cutting-machine main body 91 is located at the bottom dead center. In addition, structural elements other than the cutting-machine main body 91 are omitted for the sake of clarity of explanation.

Figure 24:
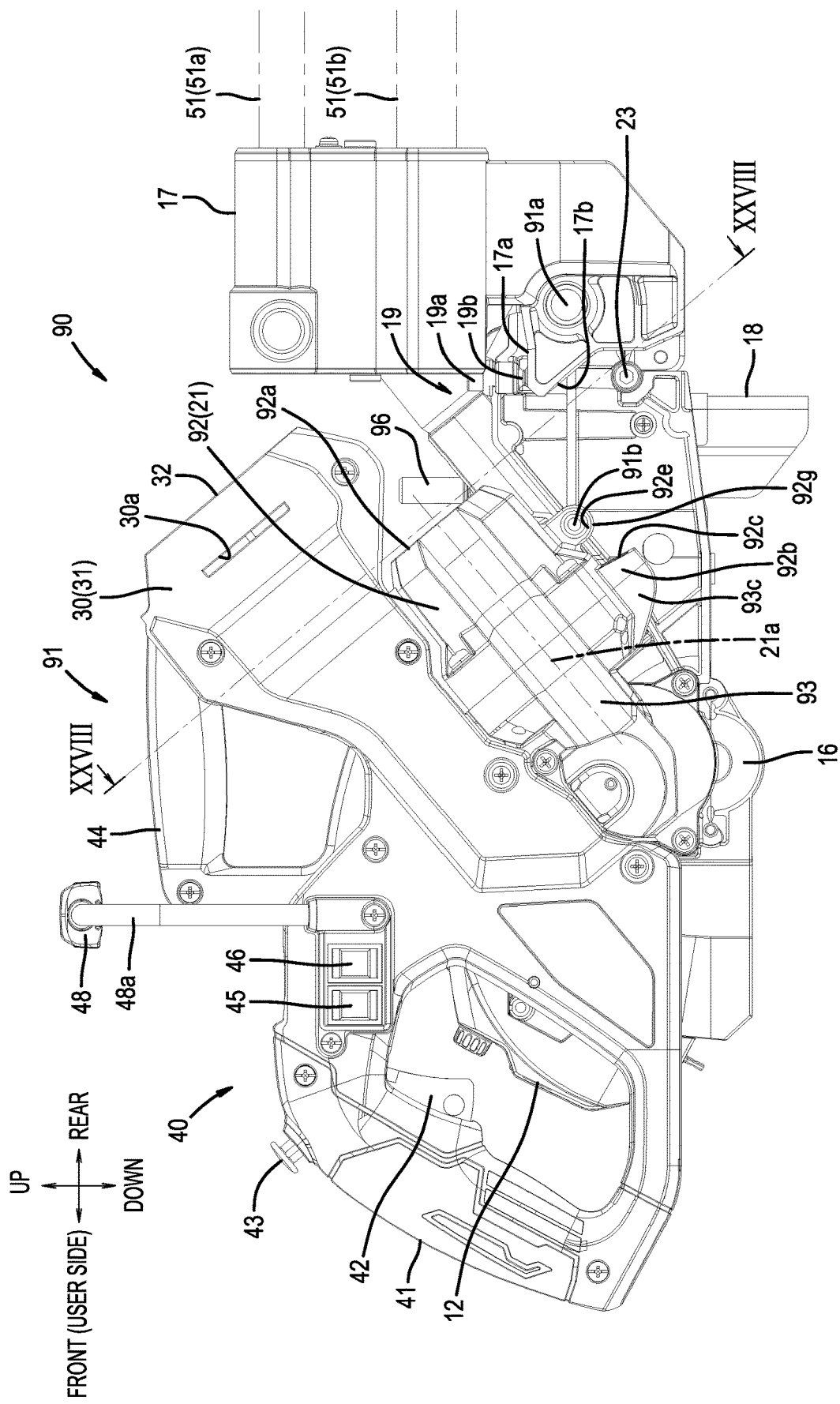
FIG. 24 is a right view that shows the state in which the cutting-machine main body of the sliding cutting machine according to a third embodiment of the present disclosure is located at the bottom dead center.

As shown in FIG. 24, the cutting-machine main body 91 comprises a motor housing 92, which houses the electric motor 21. The motor housing 92 substantially has a circular-cylinder shape extending in the front-rear direction. The motor housing 92 is located rightward of the fixed cover 12 and leftward of the slide bars 51. The up-down location of the electric motor 21, which is housed in the motor housing 92, is a location at which it overlaps the second bar 51b, in side view, when the cutting-machine main body 10 is located at the bottom dead center and the cutting tool 11 (refer to FIG. 13) is vertical. The electric motor 21 is housed such that the motor shaft 21a extends along the longitudinal direction of the substantially circular-cylinder-shaped motor housing 20.

Figure 27:
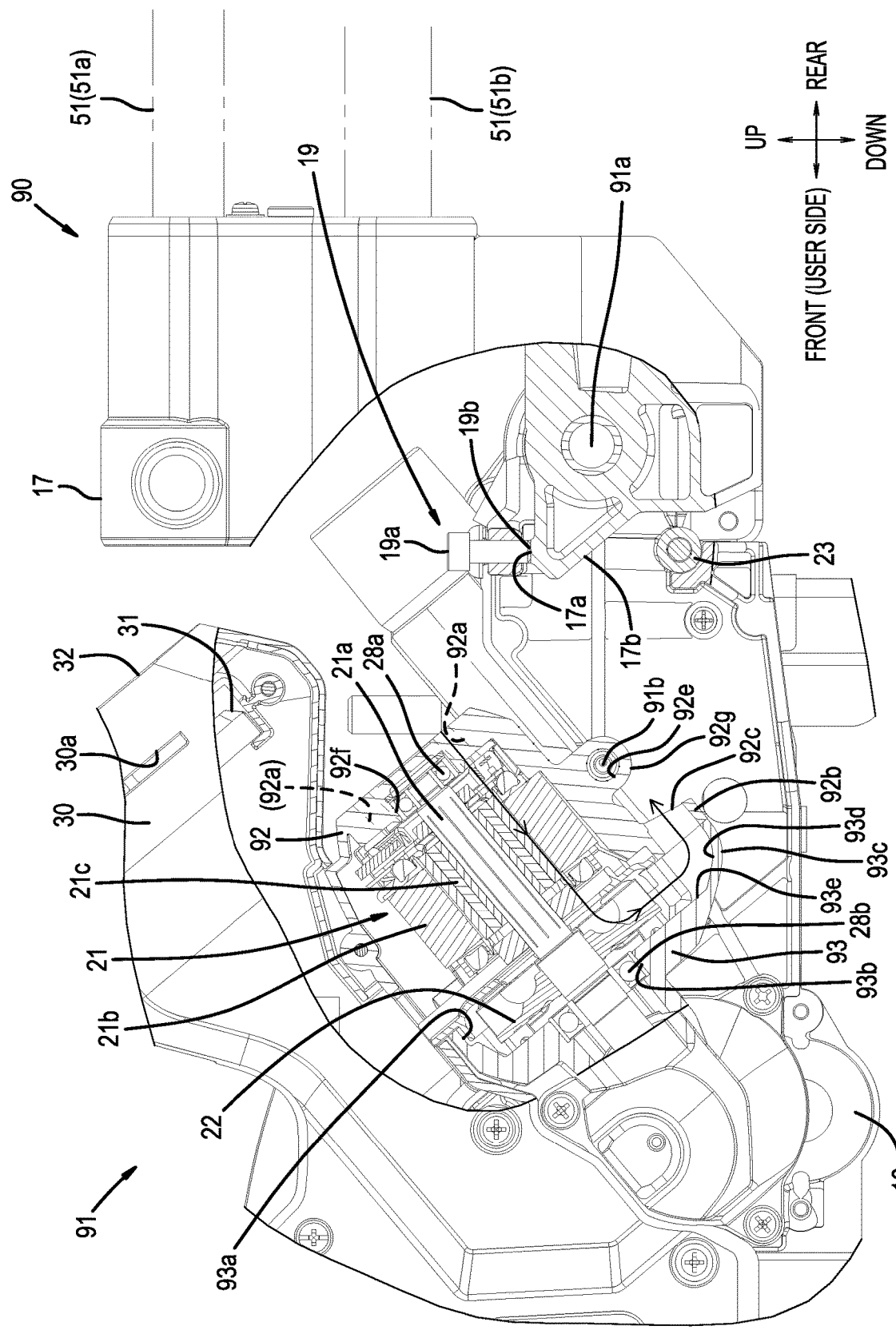
FIG. 27 is a cross-sectional auxiliary view taken along line XXVII-XXVII in FIG. 26 and is a longitudinal, cross-sectional view of a portion of a motor housing and a gear housing.
Figure 28:
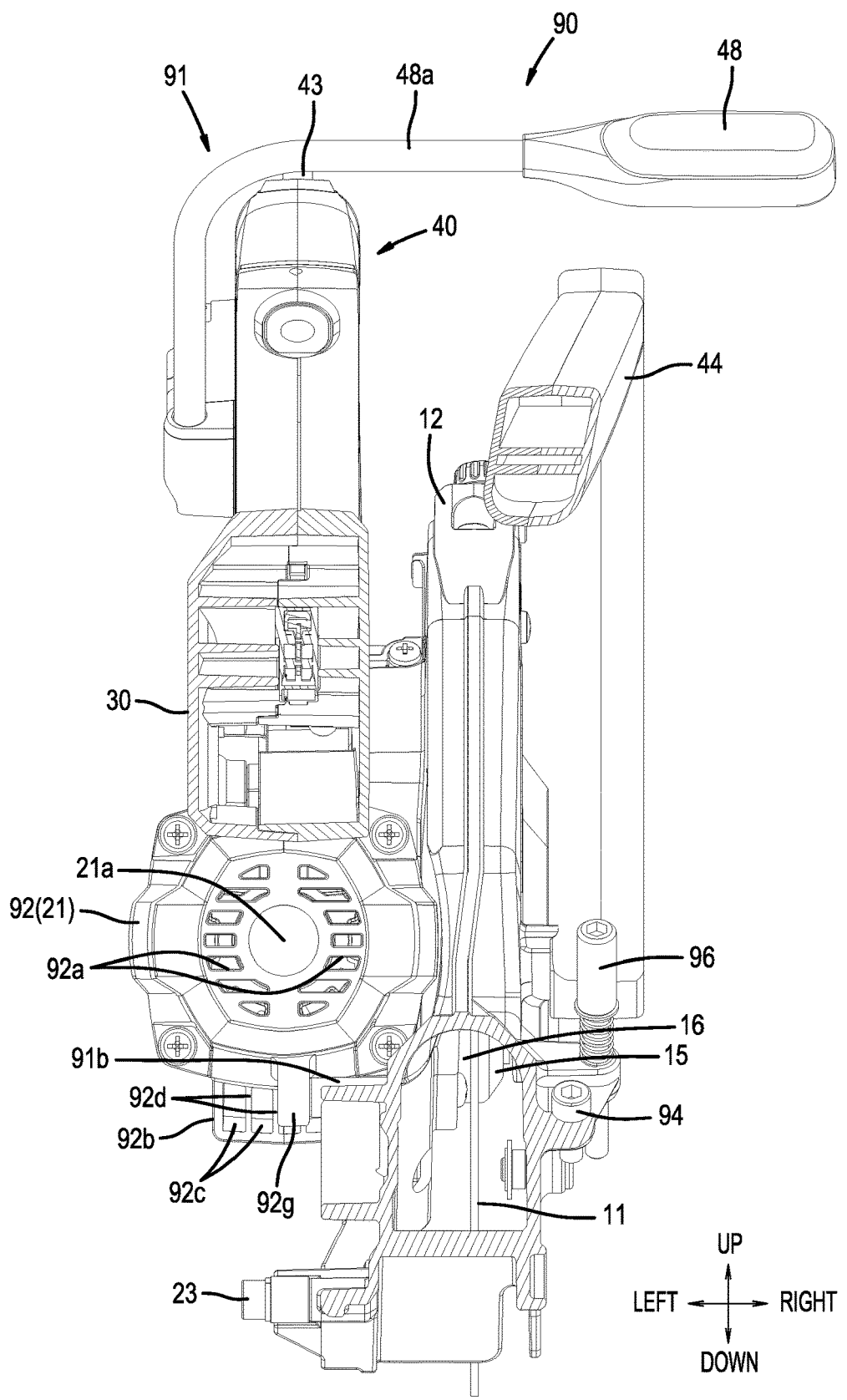
FIG. 28 is a cross-sectional auxiliary view taken along line XXVIII-XXVIII in FIG. 24 and is a longitudinal, cross-sectional view of the cutting-machine main body.

As shown in FIGS. 27 and 28, air-intake ports 92a, which are capable of taking in outside air, are provided in a rear surface of the motor housing 92 in the extension direction of the motor shaft 21a. A projection part 92b, which projects outward in the radial direction, is provided at a front-end lower portion of the motor housing 92. The projection part 92b is formed in a tube shape that is spaced apart from the housing space of the electric motor 21 and has a hollow interior that extends in parallel to an axial direction of the motor shaft 21a. Rear-end openings of the tube-shaped projection part 92b are used as air-exhaust ports 92c of the motor housing 92. The air-exhaust ports 92c are provided outward in the radial direction of the electric motor 21 at substantially the same front-rear location as the front end of the stator 21b.

As shown in FIG. 27, a gear housing 93 is coupled to a front portion of the motor housing 92 in the extension direction of the motor shaft 21a. The gear housing 93 is also coupled to a right-side surface of the fixed cover 12. A first opening 93a, which is open toward the opposite-gear side in the motor-shaft direction, is provided in a rear portion of the gear housing 93 in the extension direction of the motor shaft 21a. The first opening 93a is tightly fixed to the motor housing 92 in a bell-and-spigot joint structure or a faucet/spigot-joint structure.

The outer ring of the first bearing 28a, which supports the rear end of the motor shaft 21a in a rotatable manner, is press fitted into a hole part 92f, which is recessed in a rear portion of the motor housing 92. The outer ring of the second bearing 28b, which supports the front end of the motor shaft 21a in a rotatable manner, is press fitted into a hole part 93b, which is recessed in the gear housing 93. An inner-circumferential, front-end surface 93e, which is located forward of the fan 22 and extends substantially orthogonally to the motor shaft 21a, is provided on the inner-circumference side of the gear housing 93.

As shown in FIG. 27, a projection part 93c, which projects outward in the radial direction, is provided at a front-end lower portion of the gear housing 93. A curved surface 93d, which is smoothly coupled with an outer-circumferential end of the inner-circumferential, front-end surface 93e in the radial direction, is provided on the inner-circumference side of the projection part 93c. The curved surface 93d extends rearward while curving arcuately outward in the radial direction of the gear housing 93. The rear end of the curved surface 93d is smoothly coupled with the inner-circumferential surface of the projection part 92b of the motor housing 92. Consequently, a ventilation path, which is smoothly coupled from the inner-circumferential, front-end surface 93e to the air-exhaust ports 92c, is formed.

FIG. 27 shows the flow of the cooling draft that cools the electric motor 21. As indicated by a black arrow in the figure, when the fan 22, which is mounted on a front portion of the motor shaft 21a, rotates, the cooling draft is introduced from the air-intake ports 92a into the motor housing 20. The cooling draft inside the motor housing 20 flows toward the fan 22, which is forward, along the extension direction of the motor shaft 21a. The cooling draft inside the gear housing 93 curves outward in the radial direction of the fan 22 and flows toward the inner-circumferential portion of the projection part 93c along the inner-circumferential, front-end surface 93e. The cooling draft flows toward the air-exhaust ports 92c, which are rearward, along the curved surface 93d and along the extension direction of the motor shaft 21a. The air-exhaust draft discharged from the air-exhaust ports 92c is discharged parallel to and in the reverse direction of the draft direction of the cooling draft inside the motor housing 92.

As shown in FIG. 28, ribs 92d, which extend in the up-down direction and partition the opening surface left and right, are provided at the air-exhaust ports 92c. The flow of the air-exhaust draft discharged from the air-exhaust ports 92c is straightened by the plurality of ribs 92d. Thereby, the draft (airflow) direction of the air-exhaust draft is aligned in a direction that heads rearward in parallel with the extension direction of the motor shaft 21a.

As shown in FIGS. 24 and 27, a boss 92g, which protrudes outward in the radial direction, is provided at a lower portion of the motor housing 92. A mating hole 92e, which passes through in the left-right direction and has a circular shape, is provided in the boss 92g. A mating pin 91b, which has a circular-column shape extending in the left-right direction, is provided on a right-side surface of the fixed cover 12. The mating pin 91b has a diameter such that it is insertable into the mating hole 92e with clearance. The mating pin 91b is provided at a location that is more distant from the center of rotation of the cutting tool 11 (refer to FIG. 13) than it is from the gear housing 93, which is screw-fastened to the fixed cover 12. When the motor housing 92 and the gear housing 93 are to be assembled onto the fixed cover 12, the mating pin 91b is inserted into the mating hole 92e. Thereby, the motor housing 92 is positioned relative to the fixed cover 12. By providing the mating pin 91b at a location that is spaced apart from the center of rotation of the cutting tool 11, rotation of the motor housing 92 in the up-down direction relative to the fixed cover 12 can be limited.

Figure 25:
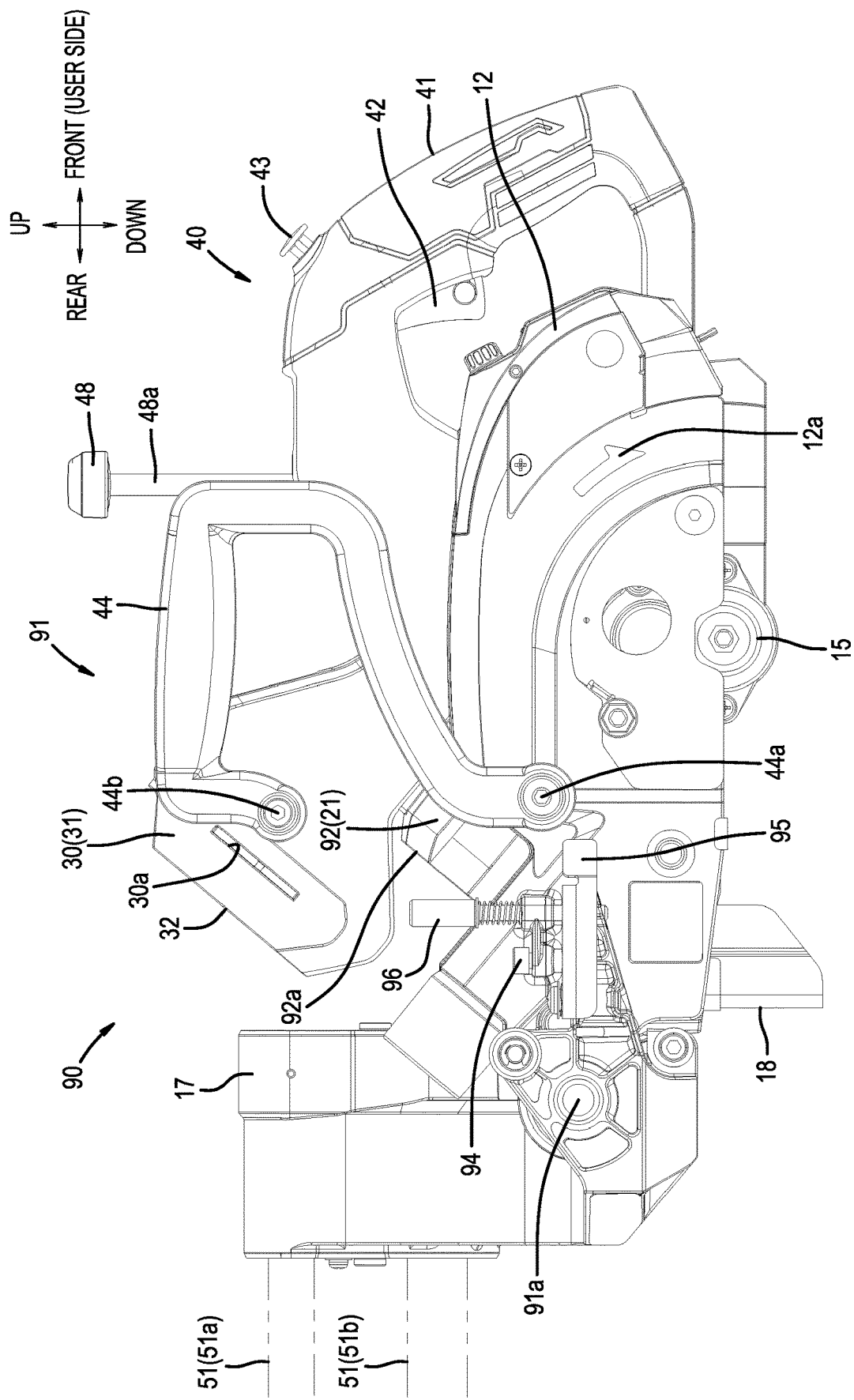
FIG. 25 is a left view that shows the state in which the cutting-machine main body is located at the bottom dead center.
Figure 26:
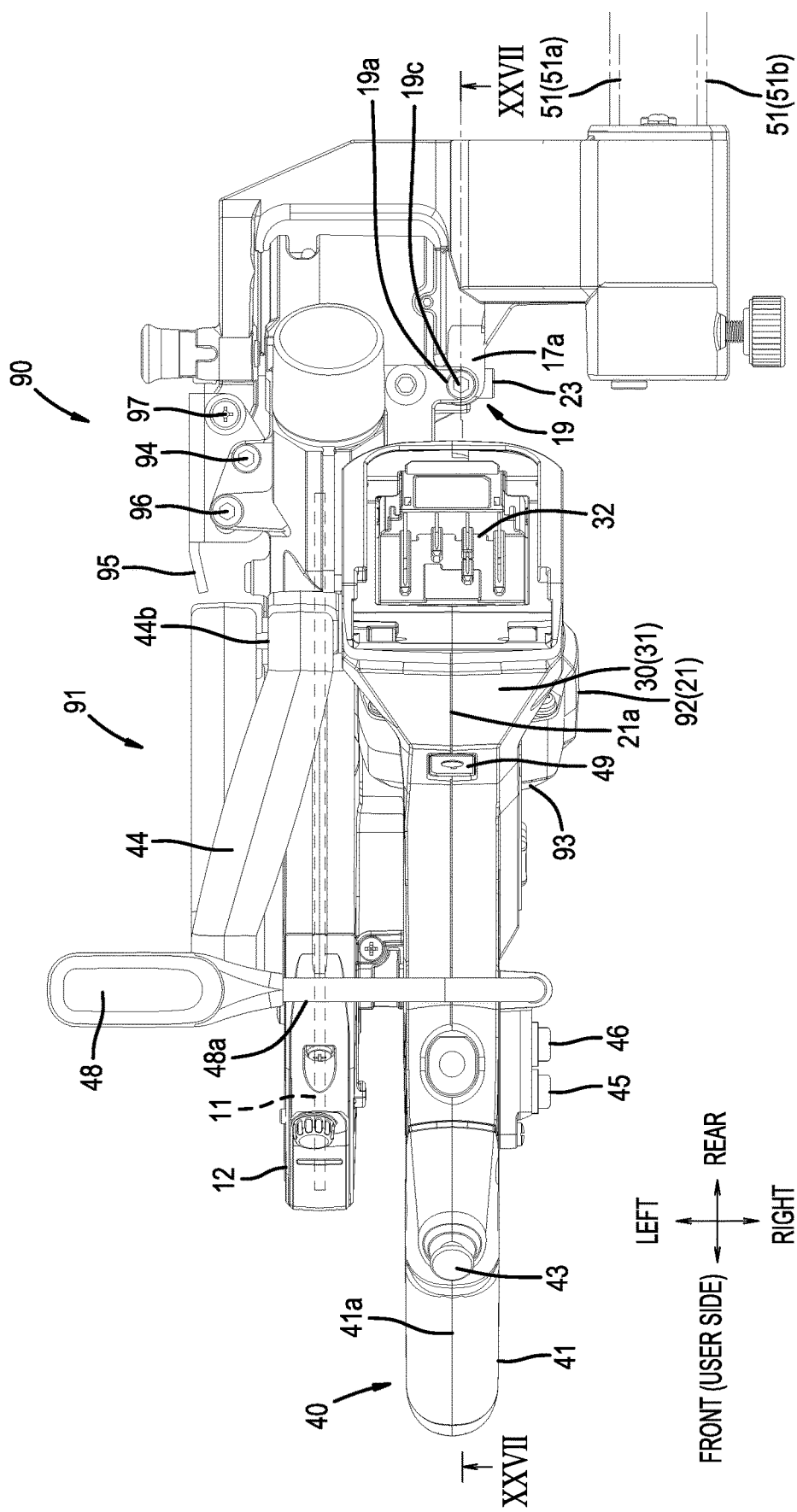
FIG. 26 is a plan view that shows the state in which the cutting-machine main body is located at the bottom dead center.

As shown in FIGS. 25 and 26, a second bottom-dead-center stopper 94 is provided on the left side of a rear portion of the fixed cover 12. The second bottom-dead-center stopper 94 is a hexagonal-socket bolt having a male-thread shape extending in the up-down direction and whose head portion is the upper side. A synthetic resin that impedes loosening of the stopper 94 is applied to the male-thread portion of the second bottom-dead-center stopper 94. The second bottom-dead-center stopper 94 prevents (blocks) downward movement of the cutting-machine main body 91 downward of (past, beyond) a second bottom dead center. The second bottom dead center is set to a location that is higher than the bottom dead center of the cutting-machine main body 91 set by the bottom-dead-center stopper 19. The second bottom dead center is set to a height at which the lower end of the cutting tool 11 coincides with the height of the table upper surface 4a or to a height at which the lower end of the cutting tool 11 is located slightly downward of (below) the table upper surface 4a. Consequently, when the cutting-machine main body 91 is moved downward to the second bottom dead center, the distance from the lower end of the outer flange 15 to the table upper surface 4a becomes long. Thereby, because the cutting depth to which the cutting tool 11 can cut into the workpiece can be made long, a workpiece having a large thickness can be cut using a batten. The height of the second bottom dead center can be adjusted by rotating the second bottom-dead-center stopper 94. The height adjustment of the second bottom dead center is performed principally in the product-manufacturing process. In the height adjustment of the second bottom dead center, it is necessary to rotate the second bottom-dead-center stopper 94 against the frictional force of the synthetic resin that impedes loosening of the stopper 94. Accordingly, because the torque is too large for the second bottom-dead-center stopper 94 to be manipulated by hand, the adjustment is performed using a hexagonal-rod spanner (hex (Allen) wrench).

As shown in FIGS. 25 and 26, the release lever 95, which is adjacent to the second bottom-dead-center stopper 94, is provided on the left side of a rear portion of the fixed cover 12. The release lever 95 is coupled to the slide base 17 such that it is tiltable in the left-right direction about its rear end. More specifically, the release lever 95 is tiltable about the tilting spindle 97 between an initial position, which extends in the front-rear direction following the fixed cover 12, and a released position, at which the front end is spaced apart leftward from the fixed cover 12. A first recessed part, into which the lower end of the second bottom-dead-center stopper 94 can enter, is provided in an upper surface of the release lever 95. The lower end of the second bottom-dead-center stopper 94 is capable of entering the first recessed part from above while the release lever 95 is located at the initial position. Consequently, while the release lever 95 is located at the initial position, the cutting-machine main body 91 can descend to the bottom dead center (refer to FIG. 19) at which the lower end of the second bottom-dead-center stopper 94 enters the first recessed part and the bottom-dead-center stopper 19 makes contact with the bottom-dead-center-stopper contact part 17a. On the other hand, while the release lever 95 is located at the released position, the lower end of the second bottom-dead-center stopper 94 makes contact with the upper surface of the release lever 95 and therefore cannot enter the first recessed part of the release lever 95. Consequently, while the release lever 95 is located at the released position, the bottom dead center of the cutting-machine main body 91 is set to the second bottom dead center, which is a location that is higher than the bottom dead center set by the bottom-dead-center stopper 19.

As shown in FIGS. 25 and 26, the groove-depth adjustment screw 96 is provided on the left side of a rear portion of the fixed cover 12. The groove-depth adjustment screw 96 is disposed forward of the second bottom-dead-center stopper 94. The groove-depth adjustment screw 96 has a male-thread shape that extends in the up-down direction. The groove-depth adjustment screw 96 is coupled to the fixed cover 12 by a screw structure such that the groove-depth adjustment screw 96 is movable in the up-down direction. By manually rotating the groove-depth adjustment screw 96, the height of the lower end of the groove-depth adjustment screw 96 moves up and down relative to the fixed cover 12. A second recessed part, into which the lower end of the groove-depth adjustment screw 96 can enter, is provided in an upper surface of the release lever 95. The lower end of the groove-depth adjustment screw 96 is capable of entering the second recessed part from above while the release lever 95 is located at the initial position, and is incapable of entering the second recessed part while the release lever 95 is located at the released position. Consequently, while the release lever 95 is located at the initial position, the cutting-machine main body 91 can descend to the bottom dead center (refer to FIG. 19) at which the lower end of the groove-depth adjustment screw 96 enters the second recessed part and the bottom-dead-center stopper 19 makes contact with the bottom-dead-center-stopper contact part 17a. On the other hand, while the release lever 95 is located at the released position, the bottom dead center of the cutting-machine main body 91 is a location that is higher than the bottom dead center set by the bottom-dead-center stopper 19 and becomes a prescribed height (a location higher than the second bottom dead center) set by the user manipulating (rotating) the groove-depth adjustment screw 96. For example, a knurl is formed on the head portion of the groove-depth adjustment screw 96. In addition, for example, no synthetic resin that impedes loosening is applied to the male-thread portion of the groove-depth adjustment screw 96. Consequently, the groove-depth adjustment screw 96 can be manually rotated using the force of one's hand. A hexagonal hole is formed in the end surface of the head portion of the groove-depth adjustment screw 96. Consequently, it is possible to rotate it also using a hexagonal-socket spanner (hex (Allen) wrench).

As shown in FIG. 27, the cutting-machine main body 91 as described above has the air-exhaust ports 92c, which are disposed at the same front-rear location as the electric motor 21 and open facing rearward. The air-exhaust draft, after it has cooled the electric motor 21, is discharged from the air-exhaust ports 92c. Accordingly, discharge of the air-exhaust draft toward the user, who is located forward of the sliding cutting machine 90, can be curtailed. Consequently, the scattering of chips, sawdust, etc. toward the user can be reduced. In addition, when the cutting-machine main body 91 is tilted in the left-right direction to perform a bevel cut, discharge of the air-exhaust draft toward the workpiece, which is located downward of the electric motor 21, can be reduced. Consequently, it is possible to reduce the likelihood that chips, sawdust, etc. will be blown onto the workpiece.

As shown in FIG. 27, the air-exhaust draft discharged from the air-exhaust ports 92c flows parallel to and in the reverse direction of the cooling draft (airflow) while the electric motor 21 is being cooled. Accordingly, the air-intake ports 92a are disposed rearward of the electric motor 21. Consequently, the intake of chips, etc. suspended in the vicinity of the air-intake ports into the air-intake ports 92a can be curtailed. Moreover, the air-exhaust draft flows along the extension direction of the motor shaft 21a of the electric motor 21 and flows parallel to and in the reverse direction of the cooling draft. Consequently, the air-exhaust draft is discharged such that it does not become spaced apart from the motor housing 92, which houses the electric motor 21, in the up-down direction or the left-right direction. Thereby, the scattering of chips, etc. onto the workpiece can be further curtailed.

Various modifications can be made to the cutting machine 1 according to the first embodiment as explained above. For example, in the first embodiment, the cutting-machine main body 10 is supported, in a manner movable in the front-rear direction, by the slide bar(s) 51, which is (are) mounted on the main-body support arm 50. Furthermore, the main-body support arm 50 is supported such that it is tiltable relative to the arm-support part 4b of the turntable 4. However, the main-body support arm 50 may instead be configured such that it is directly supported by the base 2, the placement surface, or the like. The present teachings can also be applied to a sliding cutting machine (e.g., a sliding compound miter saw) that does not have a left-right, tilt-angle (bevel-angle) adjusting mechanism that is tiltable in the left-right direction of the cutting-machine main body 10 and/or to a sliding cutting machine (e.g., a sliding compound miter saw) does not have a miter-angle adjusting mechanism in which the turntable 4 is rotatable in the horizontal direction (horizontal plane) relative to the base 2.

The arrangement of the cutting-machine main body 10 in the left-right direction, as described above, may be reversed. That is, the cutting tool 11 may instead be disposed on the right side, the slide bar(s) 51 may instead be disposed on the left side, and the electric motor 21, the battery-mount part 32, the handle part 40, etc. may be disposed between the cutting tool 11 and the slide bar(s) 51 in the left-right direction.

Although the slide bars 51, which comprise the two bars 51a, 51b, are given as an example, there may be one bar or there may be three or more bars provided in parallel. The slide bar(s) 51 may be non-parallel to the side surface of the cutting tool 11. The slide bar(s) 51 may be non-parallel to a horizontal line.

The arrangement of the controller 31 is not limited to the above-described exemplary embodiments; for example, the controller 31 may be disposed upward of the electric motor 21 with an attitude in which the longitudinal direction is beside the motor shaft 21*a* and an attitude in which the thickness direction is in the radial direction of the electric motor 21.

A configuration was given as an example in which, in the cutting machine 90, the air-exhaust ports 92*c* are provided outward in the radial direction of the electric motor 21 at substantially the same front-rear location as the front end of the stator 21*b*. Instead, for example, the air-exhaust ports 92*c* may be disposed forward of the stator 21*b* of the electric motor 21. For example, it may be configured such that the air-exhaust ports 92*c* of the cutting machine 90 are provided at the rear end of the projection part 93*c* of the gear housing 93 and such that the projection part 92*b* is not provided on the motor housing 92.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sliding cutting machines, including without limitation, sliding compound miter saws, and dual-bevel slide compound miter saws, sliding saws, etc.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Sliding cutting machine (benchtop cutting machine)
2 Base
2*a* Rotary spindle
2*b* Horizontal-plate part
3 Auxiliary table
4 Turntable
4*a* Table upper surface
4*b* Arm-support part
4*c* Tilt-stopper bolt
5 Table-extension part
5*a* Kerf board
5*b* Slot
6 Positioning fence
6*a* Positioning surface
7 Miter-scale plate
7*a* Fixing screw
7*b* Positioning recessed part
10 Cutting-machine main body
10*a* Up-down swing pivot
11 Cutting tool
12 Fixed cover
12*a* Arrow
12*b* Hole part
13 Movable cover
14 Fixing screw
15 Outer flange
16 Inner flange
17 Slide base
17*a* Bottom-dead-center-stopper contact part
17*b* Top-dead-center-stopper contact part
18 Dust-collecting guide
18*a* Dust-discharge port
19 Bottom-dead-center stopper
19*a* Protruding part
19*b* Bolt
19*c* Center
20 Motor housing
20*a* Air-suction port
20*b* Air-exhaust port
20*c* Hole part
21 Electric motor
21*a* Motor shaft
21*b* Stator
21*c* Rotor
21*d* Sensor board
21*e* Drive-side bevel gear
22 Fan
23 Top-dead-center stopper
25 Gear housing
25*a* First opening
25*b* Second opening
25*c*, 25*d* Hole parts
26 Intermediate shaft (power-transmission shaft)
26*a* Follower-side bevel gear
26*b* Reduction gear
26*c* Key
26*d* Washer
26*e* Rubber ring
26*f* Washer
26*g* Ring stop
27 Output shaft (power-transmission shaft)
27*a* Reduction gear
28*a* First bearing
28*b* Second bearing
28*c* Third bearing
28*d* Fourth bearing
28*e* Fifth bearing
28*f* Sixth bearing
29 Bearing box
29*a*, 29*b* Hole parts
30 Controller housing
30*a* Air-suction port
30*b* Communication opening
31 Controller
32 Battery-mount part
33 Battery 34 Rubber pin
35 Urethane washer
36 Rubber ring
37 Washer
38 Bottom-dead-center lock pin
40 Handle part
41 Manipulatable handle
41a Center
42 Switch lever
43 Lock-off button
44 Carrying handle
44a First coupling part
44b Second coupling part
45 Switch (for the laser-irradiating device)
46 Switch (for turning the illumination device ON)
47 Laser-irradiating device
48 Illumination device
48a Arm
49 Communication adapter
50 Main-body support arm
50a Left-right tilting pivot
51 Slide bar
51a First bar
51b Second bar
51c, 51d Centers
51e, 51f Diameters
51g Center-to-center distance
52 Maximum-tilt-angle changing lever
52a Lever shaft
52b Width-across-flats part
60 Turntable-fixing mechanism
61 Grip
62 Fixing rod
63 Sandwiching member
63a Rotary shaft
63b Sandwiching part
65 Positive-lock mechanism
66 Lock-release lever
66a Positioning pin
66b Engaging pin
66c Compression spring
67 Pin-support part
68 Adjustment bolt
70 Tilt-fixing mechanism
71 Tilt-fixing manipulatable part
72 Reduction-gear part
73 Transmission shaft
74 Thrust-needle bearing
75 Receiving part
76 Nut
80 Sliding cutting machine (benchtop cutting machine)
81 Controller housing
82 Controller
83 Bridging part
84 Battery-mount part
90 Sliding cutting machine (benchtop cutting machine)
91 Cutting-machine main body
91a Up-down swing pivot
91b Mating pin
92 Motor housing
92a Air-suction port
92b Projection part
92c Air-exhaust port
92d Rib
92e Mating hole
92f Hole part
92g Boss
93 Gear housing
93a First opening
93b Hole part
93c Projection part
93d Curved surface
93e Inner-circumferential, front-end surface
94 Second bottom-dead-center stopper
95 Release lever
96 Groove-depth adjustment screw
97 Tilting spindle
S1 First virtual plane
S2 Second virtual plane

The invention claimed is:

1. A sliding cutting machine comprising:
a turntable configured to support a workpiece while the workpiece is being cut;
a main body support arm that is pivotable relative to the turntable about a tilt pivot axis,
a first slide bar and a second slide bar extending from the main body support arm, the first and second slide bars having an elongated shape and a longitudinal axis spaced from and parallel to the tilt pivot axis, each of the longitudinal axes lying in a first virtual plane;
a slide base slidably mounted on the first and second slide bars; and
a cutting-machine main body mounted on the slide base such that the cutting-machine main body is movable in an up-down direction relative to the slide base and the first and second slide bars;
wherein the cutting-machine main body comprises:
an output shaft extending in an axial direction that is orthogonal to the first virtual plane;
a cutting tool mounted on the output shaft; and
an electric motor having a motor shaft, an entirety of the electric motor being disposed between the cutting tool and the first and second slide bars, as viewed along the longitudinal axes of the first and second slide bars while the cutting tool is vertical,
the first slide bar is arranged above the second slide bar in the up-down direction when the cutting tool is vertical,
the first and second slide bars and the main body support arm are tiltable about the tilt pivot axis relative to the turntable to change a bevel cut angle of the cutting tool, and
the cutting tool and the electric motor are entirely located on a same side of the first virtual plane.

2. The sliding cutting machine according to claim 1, wherein:
the electric motor comprises a motor shaft; and
the motor shaft extends parallel to a side surface of the cutting tool or is tilted by 10° or less relative to the side surface of the cutting tool, as viewed from a radial direction of the motor shaft, while the cutting tool is vertical.

3. The sliding cutting machine according to claim 1, wherein the center of the electric motor is disposed at a location that is 30%-50% of the distance from the cutting tool to the first and second slide bars in a surface-normal direction of the cutting tool, with the cutting tool as the starting point.

4. The sliding cutting machine according to claim 1, wherein:
at least one slide bar of the first and second slide bars is disposed such that it at least partially overlaps the electric motor, as viewed along the axial direction of the output shaft, when the cutting-machine main body is pivoted downward to a lower pivot limit.

5. The sliding cutting machine according to claim 4, wherein the at least one slide bar is the lowermost one of the first and second slide bars.

6. The sliding cutting machine according to claim 1, wherein:
the cutting-machine main body is configured to be slid in a travel direction relative to the first and second slide bars to cut a workpiece using the cutting tool;
the electric motor comprises a motor shaft; and
in a state in which the cutting-machine main body has been pivoted downward to a lower pivot limit, the motor shaft is oriented with a tilt angle that tilts upward as the motor shaft extends in the travel direction.

7. The sliding cutting machine according to claim 6, wherein the tilt angle of the motor shaft relative to a horizontal line is 30°-60°.

8. The sliding cutting machine according to claim 6, wherein in a state in which the cutting-machine main body has been pivoted upward to an upper pivot limit, the motor shaft extends parallel to a horizontal line or the tilt angle is 10° or less relative to the horizontal line.

9. The sliding cutting machine according to claim 1, further comprising:
a manipulatable handle configured to be grasped while moving the cutting-machine main body relative to the first and second slide bars;
wherein the center of the manipulatable handle is located either in a second virtual plane, which includes the cutting tool, or between the first and second slide bars and the cutting tool, as viewed along the longitudinal axes of the first and second slide bars, while the cutting tool is vertical.

10. The sliding cutting machine according to claim 9, wherein the center of the manipulatable handle is located at a location that is 30%-70% of the distance from the cutting tool to the first and second slide bars in a surface-normal direction of the cutting tool, with the cutting tool as the starting point.

11. The sliding cutting machine according to claim 1, further comprising:
a bottom-dead-center stopper configured to block pivoting movement of the cutting-machine main body downward beyond a lower pivot limit;
wherein the center of the bottom-dead-center stopper is disposed between the first and second slide bars and the cutting tool, as viewed along the longitudinal axes of the first and second slide bars, while the cutting tool is vertical.

12. The sliding cutting machine according to claim 11, wherein the center of the bottom-dead-center stopper is disposed at a location that is 30%-70% of the distance from the cutting tool to the first and second slide bars in a surface-normal direction of the cutting tool, with the cutting tool as the starting point.

13. The sliding cutting machine according to claim 1, further comprising:
a manipulatable handle configured to be grasped while moving the cutting-machine main body relative to the first and second slide bars;
a movable cover, which covers a portion of the cutting tool and is movable relative to the cutting-machine main body; and
a carrying handle configured to be grasped while carrying the sliding cutting machine, the carrying handle being separate from the manipulatable handle;
wherein the carrying handle extends such that the carrying handle spans a movable range of the movable cover.

14. The sliding cutting machine according to claim 1, further comprising:
a gear housing that houses: a power-transmission shaft, which extends in a direction that intersects a motor shaft of the electric motor and is disposed in a power-transmission path from the motor shaft to the cutting tool; and a gear, which is mounted on the motor shaft or on the power-transmission shaft;
wherein the gear housing has: a first opening, through which the motor shaft passes; and
a second opening, which is open such that the second opening faces a direction that intersects the opening direction of the first opening and through which the power-transmission shaft passes; and
the gear housing is configured as one integral component.

15. The sliding cutting machine according to claim 14, wherein:
the gear housing supports a set of gears that couple the motor shaft and the power-transmission shaft, and
the set of gears includes a bevel gear.

16. The sliding cutting machine according to claim 1, wherein:
the electric motor is disposed next to the cutting tool in a left-right direction perpendicular to the up-down direction;
the cutting-machine main body has an air-exhaust port disposed next to the electric motor or forward of the electric motor in a front-rear direction perpendicular to the up-down direction and the left-right direction; and
the cutting-machine main body is configured such that, after an air-exhaust draft has cooled the electric motor, the air-exhaust draft is discharged through the air-exhaust port.

17. The sliding cutting machine according to claim 16, wherein the cutting-machine main body is configured such that the air-exhaust draft, which is discharged through the air-exhaust port, flows parallel to and in the reverse direction of a cooling draft while the electric motor is being cooled.

18. The sliding cutting machine according to claim 1, further comprising:
a controller configured to control an output of the electric motor;
wherein in a state in which the cutting-machine main body has been pivoted downward to a lower pivot limit, the controller is located upward of the electric motor.

19. The sliding cutting machine according to claim 1, further comprising:
a controller configured to control an output of the electric motor;
wherein in a state in which the cutting-machine main body has been pivoted downward to a lower pivot limit, the controller overlaps the electric motor in a left-right direction.

20. The sliding cutting machine according to claim 1, further comprising:
a fan configured to be rotated by the electric motor to generate a draft that cools the electric motor; and
a controller configured to control an output of the electric motor;
wherein the cutting-machine main body is configured such that the controller is cooled by the draft generated by the fan.

21. The sliding cutting machine according to claim 1, wherein the tilt pivot axis intersects the cutting tool when the cutting-machine main body is pivoted downward to a lower pivot limit.

22. The sliding cutting machine according to claim 1, wherein, when the cutting tool is vertical and the cutting-machine main body is at a lower pivot limit, the entirety of the electric motor is disposed below the first slide bar and does not overlap the first slide bar when viewed in the axial direction of the output shaft.

23. The sliding cutting machine according to claim 1, wherein, when the cutting tool is vertical and the cutting-machine main body is at an upper pivot limit, an axis of rotation of the motor shaft is disposed between and does not intersect the first and second slide bars when viewed in the axial direction of the output shaft.

24. The sliding cutting machine according to claim 1, including a first bottom-dead-center stopper arranged on a first side of the cutting tool in the axial direction and a second bottom-dead-center stopper arranged on a second side of the cutting tool in the axial direction.

25. The sliding cutting machine according to claim 1, wherein:
the cutting-machine main body includes a battery-mount part,
a battery pack is removably mounted to the battery-mount part, and
an entirety of the battery pack is located between the cutting tool and the first and second slide bars when the battery pack is mounted on the battery-mount part.

26. A sliding cutting machine comprising:
a turntable configured to support a workpiece while the workpiece is being cut;
a main body support arm that is pivotable relative to the turntable about a tilt pivot axis,
a first slide bar and a second slide bar extending from the main body support arm, the first and second slide bars having an elongated shape and a longitudinal axis spaced from and parallel to the tilt pivot axis, each of the longitudinal axes lying in a first virtual plane;
a slide base slidably mounted on the first and second slide bars; and
a cutting-machine main body mounted on the slide base such that the cutting-machine main body is movable in an up-down direction relative to the slide base and the first and second slide bars;
wherein the cutting-machine main body comprises:
an output shaft extending in an axial direction that is orthogonal to the first virtual plane;
a cutting tool mounted on the output shaft; and
an electric motor having a motor shaft, an entirety of the electric motor being disposed between the cutting tool and the first and second slide bars, as viewed along the longitudinal axes of the first and second slide bars while the cutting tool is vertical,
the first slide bar is arranged above the second slide bar in the up-down direction when the cutting tool is vertical,
the first and second slide bars and the main body support arm are tiltable about the tilt pivot axis relative to the turntable to change a bevel cut angle of the cutting tool,
the cutting tool and the electric motor are entirely located on a same side of the first virtual plane,
at least one slide bar of the first and second slide bars is disposed such that it at least partially overlaps the electric motor, as viewed along the axial direction of the output shaft, when the cutting-machine main body is pivoted downward to a lower pivot limit,
the first slide bar is located most upward;
the second slide bar is located most downward;
the diameter of the first slide bar is given as a [mm], the diameter of the second slide bar is given as b [mm], the center-to-center distance between the first slide bar and the second slide bar is given as c [mm], and the diameter of the cutting tool is given as d [mm]; and
the following relation is satisfied:

$$(a/2 + b/2 + c) \times 2 < d < (a/2 + b/2 + c) \times 3.5.$$

* * * * *